(12) United States Patent
Winarski

(10) Patent No.: US 10,969,982 B1
(45) Date of Patent: Apr. 6, 2021

(54) DATA DEDUPLICATION WITH COLLISION RESISTANT HASH DIGEST PROCESSES

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 0 days.

(21) Appl. No.: 16/882,688

(22) Filed: May 25, 2020

Related U.S. Application Data

(60) Provisional application No. 62/908,610, filed on Oct. 1, 2019.

(51) Int. Cl.
*G06F 3/06* (2006.01)
*G06F 9/54* (2006.01)
*G06F 21/60* (2013.01)

(52) U.S. Cl.
CPC .......... *G06F 3/0641* (2013.01); *G06F 3/0614* (2013.01); *G06F 3/0652* (2013.01); *G06F 3/0673* (2013.01); *G06F 9/546* (2013.01); *G06F 21/602* (2013.01)

(58) Field of Classification Search
CPC .... G06F 3/0641; G06F 3/0614; G06F 3/0652; G06F 3/0673; G06F 9/546; G06F 21/602; G06F 16/215; G06F 16/2255; G06F 11/1453
See application file for complete search history.

(56) References Cited

U.S. PATENT DOCUMENTS

| | | | |
|---|---|---|---|
| 9,374,373 B1 | 6/2016 | Chan et al. | |
| 10,417,202 B2* | 9/2019 | Nazari | G06F 16/215 |
| 2010/0235332 A1* | 9/2010 | Haustein | G06F 16/221 |
| | | | 707/692 |
| 2013/0101118 A1 | 4/2013 | Seleznev et al. | |
| 2013/0339665 A1 | 12/2013 | Alexander et al. | |
| 2017/0180134 A1 | 6/2017 | King | |
| 2017/0206218 A1* | 7/2017 | Jai | H04L 67/1095 |

* cited by examiner

*Primary Examiner* — Idriss N Alrobaye
*Assistant Examiner* — Richard B Franklin
(74) *Attorney, Agent, or Firm* — The Winarski Firm, PLLC

(57) ABSTRACT

A data deduplication process for storage based on collision resistant hash digests is disclosed. The process accesses a first data message from a data storage appliance and accesses a second data message from the data storage appliance. The process then compares the hash digests of the first and second data messages. If the hash digests match, the process determines if the first and second data messages are the same message or if there is a collision between the compared hash digests by forming additional hash digests based on the first and second data messages by hashing the first and second data messages differently. If this new set of hash digests do not result in a collision, then the first and second data messages are different. If this new set of hash digests result in a collision, the first and second data messages are the same message.

19 Claims, 52 Drawing Sheets

| Descriptor 101 | Hexadecimal Value 102 |
|---|---|
| Message M1 (128-Bytes) 103 | d131dd02 c5e6eec4 693d9a06 98aff95c<br>2fcab587 12467eab 4004583e b8fb7f89<br>55ad3406 09f4b302 83e48883 2571415a<br>085125e8 f7cdc99f d91dbdf2 80373c5b<br>d8823e31 56348f5b ae6dacd4 36c919c6<br>dd53e2b4 87da03fd 02396306 d248cda0<br>e99f3342 0f577ee8 ce54b670 80a80d1e<br>c69821bc b6a88393 96f9652b 6ff72a70<br>104 |
| Message M2 (128-Bytes) 105 | d131dd02 c5e6eec4 693d9a06 98aff95c<br>2fcab507 12467eab 4004583e b8fb7f89<br>55ad3406 09f4b302 83e48883 25f1415a<br>085125e8 f7cdc99f d91dbd72 80373c5b<br>d8823e31 56348f5b ae6dacd4 36c919c6<br>dd53e234 87da03fd 02396306 d248cda0<br>e99f3342 0f577ee8 ce54b670 80280d1e<br>c69821bc b6a88393 96f965ab 6ff72a70<br>106 |
| MD5 Blockchain Hash Digest of M1 and M2 107 | 79054025 255FB1A2 6E4BC422 AEF54EB4<br>108 |

FIG. 1A (Prior Art)

| Descriptor 201 | Hexadecimal Value 202 |
|---|---|
| Message M1 (128-Bytes) 103 | d131dd02 c5e6eec4 693d9a06 98aff95c<br>2fcab587 12467eab 4004583e b8fb7f89<br>55ad3406 09f4b302 83e48883 2571415a<br>085125e8 f7cdc99f d91dbdf2 80373c5b<br>d8823e31 56348f5b ae6dacd4 36c919c6<br>dd53e2b4 87da03fd 02396306 d248cda0<br>e99f3342 0f577ee8 ce54b670 80a80d1e<br>c69821bc b6a88393 96f9652b 6ff72a70<br>104 |
| Blockchain MD5 Hash Digest M1 203 | 79054025 255FB1A2 6E4BC422 AEF54EB4<br>108 |
| M1R<br><br>Message M1 Hexadecimal Reverse (128-Bytes)<br><br>204 | 07a27ff6 b2569f69 39388a6b cb12896c<br>e1d08a08 076b45ec 8ee775f0 2433f99e<br>0adc842d 60369320 df30ad78 4b2e35dd<br>6c919c63 4dcad6ea b5f84365 13e3288d<br>b5c37308 2fdbd19d f99cdc7f 8e521580<br>a5141752 38884e38 203b4f90 6043da55<br>98f7bf8b e3854004 bae76421 785bacf2<br>c59ffa89 60a9d396 4cee6e5c 20dd131d<br>205 |
| Blockchain MD5 Hash Digest M1R 206 | 1FE11FD0 8C5AADC2 B70059FB 097C4433<br>207 |

| Descriptor 211 | Hexadecimal Value 212 |
|---|---|
| Message M2 (128-Bytes)<br><br>105 | d131dd02 c5e6eec4 693d9a06 98aff95c<br>2fcab507 12467eab 4004583e b8fb7f89<br>55ad3406 09f4b302 83e48883 25f1415a<br>085125e8 f7cdc99f d91dbd72 80373c5b<br>d8823e31 56348f5b ae6dacd4 36c919c6<br>dd53e234 87da03fd 02396306 d248cda0<br>e99f3342 0f577ee8 ce54b670 80280d1e<br>c69821bc b6a88393 96f965ab 6ff72a70<br>106 |
| Blockchain MD5 Hash Digest M2 213 | 79054025 255FB1A2 6E4BC422 AEF54EB4<br><br>108 |
| M2R<br><br>Message M2 Hexadecimal Reverse (128-Bytes)<br><br>214 | 07a27ff6 ba569f69 39388a6b cb12896c<br>e1d08208 076b45ec 8ee775f0 2433f99e<br>0adc842d 60369320 df30ad78 432e35dd<br>6c919c63 4dcad6ea b5f84365 13e3288d<br>b5c37308 27dbd19d f99cdc7f 8e521580<br>a5141f52 38884e38 203b4f90 6043da55<br>98f7bf8b e3854004 bae76421 705bacf2<br>c59ffa89 60a9d396 4cee6e5c 20dd131d<br>215 |
| Blockchain MD5 Hash Digest M2R 216 | 3573EA2B BB9AEF10 2E7C236A 66B8028D<br><br>217 |

```perl
#!/usr/bin/perl
open(my $out, '>:raw', 'M1.bin') or die "Unable to open: $!";
my $M1hex =
'd131dd02c5e6eec4693d9a0698aff95c2fcab58712467eab4004583eb8fb7f89' .
'55ad340609f4b30283e488832571415a085125e8f7cdc99fd91dbdf280373c5b' .
'd8823e3156348f5bae6dacd436c919c6dd53e2b487da03fd02396306d248cda0' .
'e99f33420f577ee8ce54b67080a80d1ec69821bcb6a8839396f9652b6ff72a70';
my ($hex) = pack( 'H*', $M1hex);
print $out "$hex";
close($out);
use Digest::MD5 qw(md5_hex);
$hash = md5_hex($hex);
printf ("md5_M1:%s\n",$hash);
#-----------------------------------------------------------------
open(my $out, '>:raw', 'M1R.bin') or die "Unable to open: $!";
my $M1Rhex = reverse $M1hex;
my ($hex) = pack( 'H*', $M1Rhex);
print $out "$hex";
close($out);
$hash = md5_hex($hex);
printf ("md5_M1R:%s\n",$hash);
#-----------------------------------------------------------------
open(my $out, '>:raw', 'M1B.bin') or die "Unable to open: $!";
my $M1Bhex =
'702af76f2b65f9969383a8b6bc2198c61e0da88070b654cee87e570f42339fe9' .
'a0cd48d206633902fd03da87b4e253ddc619c936d4ac6dae5b8f3456313e82d8' .
'5b3c3780f2bd1dd99fc9cdf7e82551085a4171258388e48302b3f4090634ad55' .
'897ffbb83e580440ab7e461287b5ca2f5cf9af98069a3d69c4eee6c502dd31d1';
my ($hex) = pack( 'H*', $M1Bhex);
print $out "$hex";
close($out);
$hash = md5_hex($hex);
printf ("md5_M1B:%s\n",$hash);
#-----------------------------------------------------------------
exit 0 ;
```

```perl
#!/usr/bin/perl
open(my $out, '>:raw', 'M2.bin') or die "Unable to open: $!";
my $M2hex =
'd131dd02c5e6eec4693d9a0698aff95c2fcab50712467eab4004583eb8fb7f89' .
'55ad340609f4b30283e4888325f1415a085125e8f7cdc99fd91dbd7280373c5b' .
'd8823e3156348f5bae6dacd436c919c6dd53e23487da03fd02396306d248cda0' .
'e99f33420f577ee8ce54b67080280d1ec69821bcb6a8839396f965ab6ff72a70';
my ($hex) = pack( 'H*', $M2hex);
print $out "$hex";
close($out);
use Digest::MD5 qw(md5_hex);
$hash = md5_hex($hex);
printf ("md5_M2:%s\n",$hash);
#------------------------------------------------------------
open(my $out, '>:raw', 'M2R.bin') or die "Unable to open: $!";
my $M2Rhex = reverse $M2hex;
my ($hex) = pack( 'H*', $M2Rhex);
print $out "$hex";
close($out);
$hash = md5_hex($hex);
printf ("md5_M2R:%s\n",$hash);
#------------------------------------------------------------
open(my $out, '>:raw', 'M2B.bin') or die "Unable to open: $!";
my $M2Bhex =
'702af76fab65f9969383a8b6bc2198c61e0d288070b654cee87e570f42339fe9' .
'a0cd48d206633902fd03da8734e253ddc619c936d4ac6dae5b8f3456313e82d8' .
'5b3c378072bd1dd99fc9cdf7e82551085a41f1258388e48302b3f4090634ad55' .
'897ffbb83e580440ab7e461207b5ca2f5cf9af98069a3d69c4eee6c502dd31d1';
my ($hex) = pack( 'H*', $M2Bhex);
print $out "$hex";
close($out);
$hash = md5_hex($hex);
printf ("md5_M2B:%s\n",$hash);
#------------------------------------------------------------
exit 0 ;
```

FIG. 3C

| Descriptor 521 | Hexadecimal Value 522 |
|---|---|
| Message M2 (128-Bytes)  105 | d131dd02 c5e6eec4 693d9a06 98aff95c<br>2fcab507 12467eab 4004583e b8fb7f89<br>55ad3406 09f4b302 83e48883 25f1415a<br>085125e8 f7cdc99f d91dbd72 80373c5b<br>d8823e31 56348f5b ae6dacd4 36c919c6<br>dd53e234 87da03fd 02396306 d248cda0<br>e99f3342 0f577ee8 ce54b670 80280d1e<br>c69821bc b6a88393 96f965ab 6ff72a70<br>106 |
| Blockchain MD5 Hash Digest M2  525 | 79054025 255FB1A2 6E4BC422 AEF54EB4<br>108 |
| M2B  Message M2 Bytes Reverse (128-Bytes)  527 | 702af76f ab65f996 9383a8b6 bc2198c6<br>1e0d2880 70b654ce e87e570f 42339fe9<br>a0cd48d2 06633902 fd03da87 34e253dd<br>c619c936 d4ac6dae 5b8f3456 313e82d8<br>5b3c3780 72bd1dd9 9fc9cdf7 e8255108<br>5a41f125 8388e483 02b3f409 0634ad55<br>897ffbb8 3e580440 ab7e4612 07b5ca2f<br>5cf9af98 069a3d69 c4eee6c5 02dd31d1<br>528 |
| Blockchain MD5 Hash Digest M2B  529 | BF5BF87F 65E79B98 AF798588 5F3E5EE0<br>530 |

FIG. 4B

| Blockchain Block Bytes 601 | Description 602 |
|---|---|
| Byte 0: 00h-FFh | 602A: Reverse Blockchain(s) Used<br>10h denotes Hexadecimal    11h denotes Byte<br>12h denotes Bit              13h denotes Sector<br>14h denotes Hexadecimal Forward-Reverse Multiplex<br>20h denotes Hexadecimal and Byte<br>21h denotes Byte and Bit<br>22h denotes Bit and Sector<br>23h denotes Hexadecimal and Bit<br>24h denotes Hexadecimal and Sector<br>25h denotes Hexadecimal and Hexadecimal Forward-Reverse Multiplex<br>30h denotes Hexadecimal and Byte and Bit<br>31h denotes Byte and Bit and Sector<br>32h denotes Hexadecimal and Byte and Hexadecimal Forward-Reverse Multiplex<br>40h denotes Hexadecimal and Byte and Bit and Sector<br>50h denotes Hexadecimal and Byte and Bit and Sector and Hexadecimal Forward-Reverse Multiplex |
| Bytes 1-4 | 602B: Date Stamp (year, month, day YYYY:MM:DD) |
| Bytes 5-7 | 602C: Time Stamp (hours, minutes, seconds HH:mm:SS) |
| Byte 8: 0h-FFh<br>00h<br>01h<br>02h<br>03h<br>04h<br>05h<br>06h | 602D: Blockchain Hash Algorithm identifier:<br>SHA-224 algorithm identifier<br>SHA-256 algorithm identifier<br>SHA-384 algorithm identifier<br>SHA-512 algorithm identifier<br>SHA-512/224 algorithm identifier<br>SHA-512/256 algorithm identifier<br>MD5 algorithm identifier |
| Bytes 9...<br>Bytes 9-36<br>Bytes 9-40<br>Bytes 9-56<br>Bytes 9-72<br>Bytes 9-24 | 602E: Forward Blockchain HASH digest:<br>SHA-224 and SHA-512/224 digests (224-bits or 28-Bytes)<br>SHA-256 and SHA-512/256 digests (256-bits or 32-Bytes)<br>SHA-384 digest (384-bits or 48-Bytes)<br>SHA-512 digest (512-bits or 64-Bytes)<br>MD-5 digest     (128-bits or 16-Bytes) |

| Blockchain Block Bytes 601 | Description 602 |
|---|---|
| Bytes 37-64<br>Bytes 41-72<br>Bytes 57-104<br>Bytes 73-136<br>Bytes 25-40 | 602F: Reverse Blockchain HASH digest:<br>SHA-224 and SHA-512/224 digests (224-bits or 28-Bytes)<br>SHA-256 and SHA-512/256 digests (256-bits or 32-Bytes)<br>SHA-384 digest (384-bits or 48-Bytes)<br>SHA-512 digest (512-bits or 64-Bytes)<br>MD-5 digest (128-bits or 16-Bytes) |
| Bytes xx - | 602G: Reverse Blockchain HASH digests for second, third, and fourth reverse blockchain hash digests has identified in Byte 0 |
| Bytes xx - | 602H: Collision resistant blockchain hash digest pair or set from previous collision resistant blockchain block |
| <br><br><br>65<br>73<br>105<br>137<br>41 | 602I: Logical-End-of-Blockchain-Block Byte, assuming only one reverse blockchain used and no preceding blockchain block (i.e. the genesis block). The Bytes on the left will change if multiple reverse blockchains are used.<br>BC(h) (1011 1100)<br><br>For SHA-224 and SHA-512/224 blockchain digests<br>For SHA-256 and SHA-512/256 blockchain digests<br>For SHA-384 blockchain digest<br>For SHA-512 blockchain digest<br>For MD-5 blockchain digest |

FIG. 5B

Message M1 (128-Bytes)
```
d131dd02  c5e6eec4  693d9a06  98aff95c
2fcab587  12467eab  4004583e  b8fb7f89
55ad3406  09f4b302  83e48883  25714l5a
085125e8  f7cdc99f  d91dbdf2  80373c5b
d8823e31  56348f5b  ae6dacd4  36c919c6
dd53e2b4  87da03fd  02396306  d248cda0
e99f3342  0f577ee8  ce54b670  80a80d1e
c69821bc  b6a88393  96f9652b  6ff72a70
```
104

600E

600

602A: 20h denotes hexadecimal-reverse blockchain digest and byte reverse blockchain digest.

602B: Date Stamp: YYYY:MM:DD

602C: Time Stamp: HH:mm:SS

602D: 06h (MD5 Algorithm)

602E-M1: Forward Blockchain HASH MD5 digest of message M1:
  79054025  255FB1A2  6E4BC422  AEF54EB4

602F-M1R: Hexadecimal-Reverse Blockchain HASH MD5 digest of message M1:
  1FE11FD0  8C5AADC2  B70059FB  097C4433

602F-M1B: Byte-Reverse Blockchain HASH MD5 digest of message M1:
  63692F88  2033B4E2  C13D437F  35E33271

602H: Collision Resistant Blockchain Hash Digest Set from Prior Block in the Collision Resistant Blockchain 602I: Logical-End-of-Blockchain-Block Byte: BC(h)

FIG. 5E

Message M2 (128-Bytes)
```
d131dd02  c5e6eec4  693d9a06  98aff95c
2fcab507  12467eab  4004583e  b8fb7f89
55ad3406  09f4b302  83e48883  25f1415a
085125e8  f7cdc99f  d91dbd72  80373c5b
d8823e31  56348f5b  ae6dacd4  36c919c6
dd53e234  87da03fd  02396306  d248cda0
e99f3342  0f577ee8  ce54b670  80280d1e
c69821bc  b6a88393  96f965ab  6ff72a70
```
106

600F

602A: 20h denotes hexadecimal-reverse blockchain digest and byte reverse blockchain digest.

602B: Date Stamp: YYYY:MM:DD

602C: Time Stamp: HH:mm:SS

602D: 06h (MD5 Algorithm)

602E-M2: Forward Blockchain HASH MD5 digest of message M2:
 79054025  255FB1A2  6E4BC422  AEF54EB4

602F-M2R: Hexadecimal-Reverse Blockchain HASH MD5 digest of message M2:
 3573EA2B  BB9AEF10  2E7C236A  66B8028D 602F-M2B: Byte-Reverse Blockchain HASH MD5 digest of message M2:
 BF5BF87F  65E79B98  AF798588  5F3E5EE0

602H: Collision Resistant Blockchain Hash Digest Set from Prior Block in the Collision Resistant Blockchain 602I: Logical-End-of-Blockchain-Block Byte: BC(h)

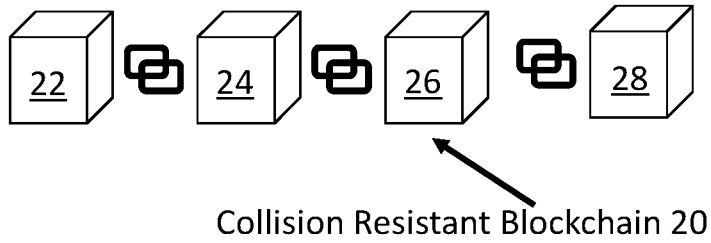

Collision Resistant Blockchain 20

| COLLISION RESISTANT BLOCKCHAIN BLOCK 22 | INFORMATION IN BLOCK:<br>*Blockchain Data: Message<br>*Blockchain Metadata: Metadata wrapper 600 (collision resistant blockchain hash digest set of block 22) |
|---|---|

| COLLISION RESISTANT BLOCKCHAIN BLOCK 24 | INFORMATION IN BLOCK:<br>*Blockchain Data: Message<br>*Blockchain Metadata: Metadata wrapper 600 (collision resistant blockchain hash digest set of block 22 [prior block] and collision resistant blockchain hash digest set of block 24 [current block]) |
|---|---|

| COLLISION RESISTANT BLOCKCHAIN BLOCK 26 | INFORMATION IN BLOCK:<br>*Blockchain Data: Message<br>*Blockchain Metadata: Metadata wrapper 600 (collision resistant blockchain hash digest set of block 24 [prior block] and collision resistant blockchain hash digest set of block 26 [current block]) |
|---|---|

| COLLISION RESISTANT BLOCKCHAIN BLOCK 28 | INFORMATION IN BLOCK:<br>*Blockchain Data: Message<br>*Blockchain Metadata: Metadata wrapper 600 (collision resistant blockchain hash digest set of block 26 [prior block] and collision resistant blockchain hash digest set of block 28 [current block]) |
|---|---|

| Descriptor 721 | Hexadecimal Value 722 |
|---|---|
| Message M3 (64-Bytes)<br><br>703 | 4dc968ff 0ee35c20 9572d477 7b721587<br>d36fa7b2 1bdc56b7 4a3dc078 3e7b9518<br>afbfa200 a8284bf3 6e8e4b55 b35f4275<br>93d84967 6da0d155 5d8360fb 5f07fea2<br>704 |
| MD5 Digest of M3<br>707 | 008EE33A 9D58B51C FEB425B0 959121C9<br>708 |
| M3R<br>Message M3 Hexadecimal Reverse<br>723 | 2aef70f5 bf0638d5 551d0ad6 76948d39<br>5724f53b 55b4e8e6 3fb4828a 002afbfa<br>8159b7e3 870cd3a4 7b65cdb1 2b7af63d<br>785127b7 774d2759 02c53ee0 ff869cd4<br>724 |
| MD5 Digest of M3R<br>725 | 3727C412 94872D67 6AA94C9D 7AF81BFC<br>726 |
| M3B<br>Message M3 Byte Reverse<br>727 | a2fe075f fb60835d 55d1a06d 6749d893<br>75425fb3 554b8e6e f34b28a8 00a2bfaf<br>18957b3e 78c03d4a b756dc1b b2a76fd3<br>8715727b 77d47295 205ce30e ff68c94d<br>728 |
| MD5 Digest of M3B<br>729 | 2058DE3D 4C8C4928 C530DDAD 2E1EB753<br>730 |

| Descriptor 741 | Hexadecimal Value 742 |
|---|---|
| Message M4 (64Bytes) 705 | 4dc968ff 0ee35c20 9572d477 7b721587<br>d36fa7b2 1bdc56b7 4a3dc078 3e7b9518<br>afbfa202 a8284bf3 6e8e4b55 b35f4275<br>93d84967 6da0d1d5 5d8360fb 5f07fea2<br>706 |
| MD5 Digest of M4 707 | 008EE33A 9D58B51C FEB425B0 959121C9<br>708 |
| M4R Message M4 Hexadecimal Reverse 743 | 2aef70f5 bf0638d5 5d1d0ad6 76948d39<br>5724f53b 55b4e8e6 3fb4828a 202afbfa<br>8159b7e3 870cd3a4 7b65cdb1 2b7af63d<br>785127b7 774d2759 02c53ee0 ff869cd4<br>744 |
| MD5 Digest of M4R 745 | 492D677A 1CD91F27 02422DD9 0B0B6622<br>746 |
| M4B Message M4 Byte Reverse 747 | a2fe075f fb60835d d5d1a06d 6749d893<br>75425fb3 554b8e6e f34b28a8 02a2bfaf<br>18957b3e 78c03d4a b756dc1b b2a76fd3<br>8715727b 77d47295 205ce30e ff68c94d<br>748 |
| MD5 Digest of M4B 749 | 67BB5250 7618FE4E E6B23577 270BD599<br>750 |

```perl
#!/usr/bin/perl
open(my $out, '>:raw', 'M3.bin') or die "Unable to open: $!";
my $M3hex =
'4dc968ff0ee35c209572d4777b721587d36fa7b21bdc56b74a3dc0783e7b9518' .
'afbfa200a8284bf36e8e4b55b35f427593d849676da0d1555d8360fb5f07fea2';
my ($hex) = pack( 'H*', $M3hex);
print $out "$hex";
close($out);
use Digest::MD5 qw(md5_hex);
$hash = md5_hex($hex);
printf ("md5_M3:%s\n",$hash);
#-------------------------------------------------------------
open(my $out, '>:raw', 'M3R.bin') or die "Unable to open: $!";
my $M3Rhex = reverse $M3hex;
my ($hex) = pack( 'H*', $M3Rhex);
print $out "$hex";
close($out);
$hash = md5_hex($hex);
printf ("md5_M3R:%s\n",$hash);
#-------------------------------------------------------------
open(my $out, '>:raw', 'M3B.bin') or die "Unable to open: $!";
my $M3Bhex =
'a2fe075ffb60835d55d1a06d6749d89375425fb3554b8e6ef34b28a800a2bfaf' .
'18957b3e78c03d4ab756dc1bb2a76fd38715727b77d47295205ce30eff68c94d';
my ($hex) = pack( 'H*', $M3Bhex);
print $out "$hex";
close($out);
$hash = md5_hex($hex);
printf ("md5_M3B:%s\n",$hash);
#-------------------------------------------------------------
exit 0 ;
```

```
#!/usr/bin/perl
open(my $out, '>:raw', 'M4.bin') or die "Unable to open: $!";
my $M4hex =
'4dc968ff0ee35c209572d4777b721587d36fa7b21bdc56b74a3dc0783e7b9518' .
'afbfa202a8284bf36e8e4b55b35f427593d849676da0d1d55d8360fb5f07fea2';
my ($hex) = pack( 'H*', $M4hex);
print $out "$hex";
close($out);
use Digest::MD5 qw(md5_hex);
$hash = md5_hex($hex);
printf ("md5_M4:%s\n",$hash);
#------------------------------------------------------------------
open(my $out, '>:raw', 'M4R.bin') or die "Unable to open: $!";
my $M4Rhex = reverse $M4hex;
my ($hex) = pack( 'H*', $M4Rhex);
print $out "$hex";
close($out);
$hash = md5_hex($hex);
printf ("md5_M4R:%s\n",$hash);
#------------------------------------------------------------------
open(my $out, '>:raw', 'M4B.bin') or die "Unable to open: $!";
my $M4Bhex =
'a2fe075ffb60835dd5d1a06d6749d89375425fb3554b8e6ef34b28a802a2bfaf' .
'18957b3e78c03d4ab756dc1bb2a76fd38715727b77d47295205ce30eff68c94d';
my ($hex) = pack( 'H*', $M4Bhex);
print $out "$hex";
close($out);
$hash = md5_hex($hex);
printf ("md5_M4B:%s\n",$hash);
#------------------------------------------------------------------
exit 0 ;
```

FIG. 6E

308Multiplex

```perl
#!/usr/bin/perl
my $M3Mhex =
'42dace9f6780fff50befe03653c82d059555712dd04a7d7677b67924185d8379' .
'd53762f4af75b32b15b5dbc45e68be7643af3bd4c802788a30e072ba9f5b1f8a';
my ($hex) = pack( 'H*', $M3Mhex);
use Digest::MD5 qw(md5_hex);
$hash = md5_hex($hex);
printf ("md5_M3Multiplex:%s\n",$hash);
#------------------------------------------------------------------------
my $M4Mhex =
'42dace9f6780fff50befe03653c82d05955d712dd04a7d7677b67924185d8379' .
'd53762f4af75b32b15b5dbc45e68be7643af3bd4c802788a32e072ba9f5b1f8a';
my ($hex) = pack( 'H*', $M4Mhex);
$hash = md5_hex($hex);
printf ("md5_M4Multiplex:%s\n",$hash);
exit 0 ;
```

FIG. 6I

| X.509 Certificate-1 Hexadecimal Contents (1301-Bytes) |
|---|
| 1201 |

```
30820511a0030201  020204010c000130  0d06092a864886f7  0d0101040500303d
311a301806035504  0313114861736820  436f6c6c6973696f  6e20434131123010
0603550407130945  696e64686f76656e  310b300906035504  0613024e4c301e17
0d30363031303130  30303030315a170d  3037313233313233  353935395a305431
19301706035504 03  131041726a656e20  4b2e204c656e7374  7261311630140603
55040a130d436f6c  6c6973696f6e6169  7273311230100603  550407130945696e
64686f76656e310b  3009060355040613  024e4c3082042230  0d06092a864886f7
0d01010105000382  040f003082040a02  82040100ee73e7d6  b3b34fbaa1393d02
a47425818dc84f86  736e907228bbe877  0203858d8cf1837a  ff5e6c2213036af3
d95c77e9c2237d60  8cc4a9fb97308bbf  9828612f1599e261  5bccdeda5930532f
b3dd117278e49440  1433630e7461c1dc  9b801b2e552015a5  13ff7ae7973ef44b
8352e4e04979b31e  b600654d51f4a381  cebe3f0bd099d130  d1456fabe04a3e98
85c8c4fb297b86b5  7752cd6419809fe3  7e6286f07732d1e0  69a5b4e56670b8bb
bae5c211742a131d  05711cf1fe32af93  3f1eef224762e3aa  dac17c40e448ca41
a879a03d3cf665f2  39c7f3fe82b384e8  35e7c9e8bdee30c2  68a2121284789df4
2f44906f19b79026  464436e1da65fa0c  53a377fa0d2b012b  7ddc2855dae5b551
51e28034112120b5  e79ec5f26a9f69da  85d74ef6a97a0b11  64efa25fb1ae26ba
451ccda7a2e78433  9c447d560549a60b  f0676294bf580c91  9ec457025d3c7860
b98296c0ab9fe5b1  d353882e26c1f721  b41899d972b5a1d5  050b684536448010
af8c7aff7ce8eacc  b9b1fbbdd129d4f5  d499fb812924df30  2cb3c45023386297
9396b3a46cd0ff7f  1426711c459297b6  5d1cef66c18751e0  94bf08f3b2981c5c
ce52d963d5a4259a  64557e4d1b9efe2d  9a516d1e6ec8bb37  066825aea6361660
2bd7d11625a06a90  739b4d0a06ea872a  3af9eba12629bed6  7940561bd9374a89
d60f0d722c9feb68  33ec53f0b0fd76aa  047b66c90fceb1d2  e22cc099b9a4b93e
0000000f54a89517  6e4c295a405faf54  cee82d043a45ce40  b155be34ebde7847
85a25b7f894d424f  a127b157a8a120f9  9fe53102c81fa90e  0b9bda1ba775df75
d9152a80257a1ed3  52dd49e57e068ff3  f02cabd4ac97dbbc  3fa0205a74302f65
c7f49a419e08fd54  bfafc14d78abaab3  0ddb3fc848e3df02  c5a40eda248c9ff4
7482850cfdfbdd9b  c55547b7404f5803  c1bb81632173127e  1a93b24afb6e7a80
450865db374676d5  76ba5296ccc6c130  82d1ab36521f1a8a  d945466b9ef06af4
3a02d70b7fb8b7dc  6d268c3dba6898f6  552fa3fbb33dcbfa  da7b33fa75d93afe
262bd37aff75995f  d0e9774ba5a26a7c  443ff34e461502a2  cb777e982d007375
14b88ed28d61f428  e88387df2bf02230  ad17a9d44ff36485  0a07db42a7826ac2
ee3899cac3ec2747  21d476d96658f537  16676587f8ff14db  8de6741afa2206db
a3b11828ba87c6e1  e88a022f1aa8ddd0  37eab049b5c7d305  3d0a63d7861dea07
b3d8b720de068cf4  7e657bb44450b85d  52f749d59572df0c  0e3433b47c9aa19a
856f1dc3cdadbafb  143035c85a53af57  22038f765c0d621b  66b69ffffd091d4a
661a453bf1daed1a  3a2341b37d7f623b  158f6ec02b49a253  64430fcb5861483e
1e9543ed2ee7e54a  4c108a6e64194098  0ee60d14aee559af  30037e75b2309ce0
21ffe3109bf20538  92ab0ae403516e2a  b58067f702030100  01a31a3018300906
03551d1304023000  300b0603551d0f04  04030205e0
```

FIG. 7A (Prior Art)

X.509 Certificate-2 Hexadecimal Contents (1301-Bytes)
1202

```
30820511a0030201 020204020c000130 0d06092a864886f7 0d0101040500303d
311a301806035504 0313114861736820 436f6c6c6973696f 6e20434131123010
0603550407130945 696e64686f76656e 310b300906035504 0613024e4c301e17
0d30363031303130 30303030315a170d 3037313233313233 353935395a305431
1530130603550403 130c4d6172632053 746576656e73311a 3018060355040a13
11436f6c6c697369 6f6e20466163746f 7279311230100603 550407130945696e
64686f76656e310b 3009060355040613 024e4c3082042230 0d06092a864886f7
0d01010105000382 040f003082040a02 820401001a09b4cb 40c7267aaf017f9b
a47425818dc84f86 736e907228bbe877 0203858d8cf1837a ff5e6c2213036af3
d95c77e9c2237d60 8cc4a9fb97307bbf 9828612f1599e261 5bccdeda5930532f
b3dd117278e49440 1433630e7461c1dc 9b801b2e552015a5 13ff7ae7973ef44b
8352e4e04979b31e b600654d51f4a481 cebe3f0bd099d130 d1456fabe04a3e98
85c8c4fb297b86b5 7752cd6419809fe3 7e6286f07732d1e0 69a5b4e56670b8bb
bae5c211742a131d 05711cf1fe22af93 3f1eef224762e3aa dac17c40e448ca41
a879a03d3cf665f2 39c7f3fe82b384e8 35e7c9e8bdee30c2 68a2121284789df4
2f44906f19b79026 464436e1da64fa0c 53a377fa0d2b012b 7ddc2855dae5b551
51e28034112120b5 e79ec5f26a9f69da 85d74ef6a97a0b11 64efa25fb1ae26ba
451ccda7a2e78433 9c447d562549a60b f0676294bf580c91 9ec457025d3c7860
b98296c0ab9fe5b1 d353882e26c1f721 b41899d972b5a1d5 050b684536448010
af8c7aff7ce8eacc b9b1fbbdc929d4f5 d499fb812924df30 2cb3c45023386297
9396b3a46cd0ff7f 1426711c459297b6 5d1cef66c18751e0 94bf08f3b2981c5c
ce52d963d5a4259a 64557e4d1b9efe0d 9a516d1e6ec8bb37 066825aea6361660
2bd7d11625a06a90 739b4d0a06ea872a 3af9eba12629bed6 7940561bd9374a89
d60f0d722c9feb68 33ec53f0b0fd76a2 047b66c90fceb1d2 e22cc099b9a4b93e
0000000f54a89517 6e4c295a405faf54 cee82d043a45ce40 b155be34ebde7847
85a25b7f894d424f a127b157a8a120f9 9fe53102c81fa90e 0b9bda1ba775df75
d9152a80257a1ed3 52dd49e57e068ff3 f02cabd4ac97dbbc 3fa0205a74302f65
c7f49a419e08fd54 bfafc14d78abaab3 0ddb3fc848e3df02 c5a40eda248c9ff4
7482850cfdfbdd9b c55547b7404f5803 c1bb81632173127e 1a93b24afb6e7a80
450865db374676d5 76ba5296ccc6c130 82d1ab36521f1a8a d945466b9ef06af4
3a02d70b7fb8b7dc 6d268c3dba6898f6 552fa3fbb33dcbfa da7b33fa75d93afe
262bd37aff75995f d0e9774ba5a26a7c 443ff34e461502a2 cb777e982d007375
14b88ed28d61f428 e88387df2bf02230 ad17a9d44ff36485 0a07db42a7826ac2
ee3899cac3ec2747 21d476d96658f537 16676587f8ff14db 8de6741afa2206db
a3b11828ba87c6e1 e88a022f1aa8ddd0 37eab049b5c7d305 3d0a63d7861dea07
b3d8b720de068cf4 7e657bb44450b85d 52f749d59572df0c 0e3433b47c9aa19a
856f1dc3cdadbafb 143035c85a53af57 22038f765c0d621b 66b69ffffd091d4a
661a453bf1daed1a 3a2341b37d7f623b 158f6ec02b49a253 64430fcb5861483e
1e9543ed2ee7e54a 4c108a6e64194098 0ee60d14aee559af 30037e75b2309ce0
21ffe3109bf20538 92ab0ae403516e2a b58067f702030100 01a31a3018300906
03551d1304023000 300b0603551d0f04 04030205e0
```

```perl
#!/usr/bin/perl
open(my $out, '>:raw', 'C1.bin') or die "Unable to open: $!";
my $C1hex =
'30820511a0030201020204010c0001300d06092a864886f70d0101040500303d311a3018060355040313114861736820436f6c6c6973696f6e20434131123010' .
'06035504071309456964686f76656e310b3009060355040613024e4c301e170d3036303130313030303030315a170d30373132333132333335393539305a305431' .
'193017060355040313104172a656e204b2e204c656e7374726131316301406035504 0a130d436f6c6c6973696f6e6169727331123010060355040713094569646 5' .
'64686f76656e310b3009060355040613024e4c30820422300d06092a864886f70d01010105000382040f003082040a0282040100ee73e7d6b3b34fbaa1393d02' .
'a47425818dc84f86736e907228bbe8770203858d8cf1837aff5e6c2213036af3d95c77e9c2237d608cc4a9fb97308bbf9828612f1599e2615bccdeda5930532f' .
'b3dd117278e494401433630e7461c1dc9b801b2e552015a513ff7ae7973ef44b8352e4e04979b31eb600654d51f4a381cebe3f0bd099d130d1456fabe04a3e98' .
'85c8c4fb297b86b57752cd6419809fe37e6286f07732d1e069a5b4e56670b8bbbae5c211742a131d05711cf1fe32af933f1eef224762e3aadac17c40e448ca41' .
'a879a03d3cf665f239c7f3fe82b384e835e7c9e8bdee30c268a2121284789df42f44906f19b79026464436e1da65fa0c53a377fa0d2b012b7ddc2855dae5b551' .
'51e28034112120b5e79ec5f26a9f69da85d74ef6a97a0b1164efa25fb1ae26ba451ccda7a2e784339c447d560549a60bf0676294bf580c919ec457025d3c7860' .
'b98296c0ab9fe5b1d353882e26c1f721b41899d972b5a1d5050b684536448010af8c7aff7ce8eaccb9b1fbbdd129d4f5d499fb812924df302cb3c45023386297' .
'9396b3a46cd0ff7f1426711c459297b65d1cef66c18751e094bf08f3b2981c5cce52d963d5a4259a64557e4d1b9efe2d9a516d1e6ec8bb37066825aea6361660' .
'2bd7d11625a06a90739b4d0a06ea872a3af9eba12629bed67940561bd9374a89d60f0d722c9feb6833ec53f0b0fd76aa047b66c90fceb1d2e22cc099b9a4b93e' .
'0000000f54a895176e4c295a405faf54cee82d043a45ce40b155be34ebde784785a25b7f894d424fa127b157a8a120f99fe53102c81fa90e0b9bda1ba775df75' .
'd9152a80257a1ed352dd49e57e068ff3f02cabd4ac97dbbc3fa0205a74302f65c7f49a419e08fd54bfafc14d78abaab30ddb3fc848e3df02c5a40eda248c9ff4' .
'7482850cfdfbdd9bc55547b7404f5803c1bb81632173127e1a93b24afb6e7a80450865db374676d576ba5296ccc6c13082d1ab36521f1a8ad945466b9ef06af4' .
'3a02d70b7fb8b7dc6d268c3dba6898f6552fa3fbb33dcbfada7b33fa75d93afe262bd37aff75995fd0e9774ba5a26a7c443ff34e461502a2cb777e982d007375' .
'14b88ed28d61f428e88387df2bf02230ad17a9d44ff364850a07db42a7826ac2ee3899cac3ec274721d476d96658f53716676587f8ff14db8de6741afa2206db' .
'a3b11828ba87c6e1e88a022f1aa8ddd037eab049b5c7d3053d0a63d7861dea07b3d8b720de068cf47e657bb44450b85d52f749d59572df0c0e3433b47c9aa19a' .
'856f1dc3cdadbafb143035c85a53af5722038f765c0d621b66b69ffffd091d4a661a453bf1daed1a3a2341b37d7f623b158f6ec02b49a25364430fcb5861483e' .
'1e9543ed2ee7e54a4c108a6e641940980ee60d14aee559af30037e75b2309ce021ffe3109bf2053892ab0ae403516e2ab58067f70203010001a31a3018300906' .
'03551d1304023000300b0603551d0f0404030205e0';
my ($hex) = pack( 'H*', $C1hex);
print $out "$hex";
close($out);
use Digest::MD5 qw(md5_hex);
$hash = md5_hex($hex);
printf ("md5_X509-C1:%s\n",$hash);
#-----------------------------------------------------------------
open(my $out, '>:raw', 'C1R.bin') or die "Unable to open: $!";
my $C1Rhex = reverse $C1hex;
my ($hex) = pack( 'H*', $C1Rhex);
print $out "$hex";
close($out);
$hash = md5_hex($hex);
printf ("md5_X509-C1R:%s\n",$hash);
#-----------------------------------------------------------------
exit 0 ;
```

```perl
#!/usr/bin/perl
open(my $out, '>:raw', 'C2.bin') or die "Unable to open: $!";
my $C2hex =
'30820511a0030201020204020c0001300d06092a864886f70d0101040500303d311a30180603550403131486173682
0436f6c6c6973696f6e20434131123010' .
'060355040713094569664686f76656e310b30090603550406130244e4c301e170d303630313031303030303030315a170
d303731323331323333353935395a305431' .
'15301306035504031304d6172632053746576656e73311a3018060355040a1311436f6c6c6973696f6e20466163746f
72793112301006035504071309456964' .
'64686f76656e310b30090603550406130244e4c30820422300d06092a864886f70d01010105000382040f003082040a02
820401001a09b4cb40c7267aaf017f9b' .
'a47425818dc84f86736e907228bbe8770203858d8cf1837aff5e6c2213036af3d95c77e9c2237d608cc4a9fb97307bbf982
8612f1599e2615bccdeda5930532f' .
'b3dd117278e494401433630e7461c1dc9b801b2e552015a513ff7ae7973ef44b8352e4e04979b31eb600654d51f4a481c
ebe3f0bd099d130d1456fabe04a3e98' .
'85c8c4fb297b86b57752cd6419809fe37e6286f07732d1e069a5b4e56670b8bbbae5c211742a131d05711cf1fe22af933f
1eef224762e3aadac17c40e448ca41' .
'a879a03d3cf665f239c7f3fe82b384e835e7c9e8bdee30c268a2121284789df42f44906f19b79026464436e1da64fa0c53a
377fa0d2b012b7ddc2855dae5b551' .
'51e28034112120b5e79ec5f26a9f69da85d74ef6a97a0b1164efa25fb1ae26ba451ccda7a2e784339c447d562549a60bf0
676294bf580c919ec457025d3c7860' .
'b98296c0ab9fe5b1d353882e26c1f721b41899d972b5a1d5050b684536448010af8c7aff7ce8eaccb9b1fbbdc929d4f5d49
9fb812924df302cb3c45023386297' .
'9396b3a46cd0ff7f1426711c459297b65d1cef66c18751e094bf08f3b2981c5cce52d963d5a4259a64557e4d1b9efe0d9a5
16d1e6ec8bb37066825aea6361660' .
'2bd7d11625a06a90739b4d0a06ea872a3af9eba12629bed67940561bd9374a89d60f0d722c9feb6833ec53f0b0fd76a20
47b66c90fceb1d2e22cc099b9a4b93e' .
'0000000f54a895176e4c295a405faf54cee82d043a45ce40b155be34ebde784785a25b7f894d424fa127b157a8a120f99f
e53102c81fa90e0b9bda1ba775df75' .
'd9152a80257a1ed352dd49e57e068ff3f02cabd4ac97dbbc3fa0205a74302f65c7f49a419e08fd54bfafc14d78abaab30dd
b3fc848e3df02c5a40eda248c9ff4' .
'7482850cfdfbdd9bc55547b7404f5803c1bb81632173127e1a93b24afb6e7a80450865db374676d576ba5296ccc6c1308
2d1ab36521f1a8ad945466b9ef06af4' .
'3a02d70b7fb8b7dc6d268c3dba6898f6552fa3fbb33dcbfada7b33fa75d93afe262bd37aff75995fd0e9774ba5a26a7c443ff
34e461502a2cb777e982d007375' .
'14b88ed28d61f428e88387df2bf02230ad17a9d44ff364850a07db42a7826ac2ee3899cac3ec274721d476d96658f53716
676587f8ff14db8de6741afa2206db' .
'a3b11828ba87c6e1e88a022f1aa8ddd037eab049b5c7d3053d0a63d7861dea07b3d8b720de068cf47e657bb44450b85d
52f749d59572df0c0e3433b47c9aa19a' .
'856f1dc3cdadbafb143035c85a53af5722038f765c0d621b66b69ffffd091d4a661a453bf1daed1a3a2341b37d7f623b158f
6ec02b49a25364430fcb5861483e' .
'1e9543ed2ee7e54a4c108a6e641940980ee60d14aee559af30037e75b2309ce021ffe3109bf2053892ab0ae403516e2ab
58067f70203010001a31a3018300906' .
'03551d1304023000300b0603551d0f0404030205e0';
my ($hex) = pack( 'H*', $C2hex);
print $out "$hex";
close($out);
use Digest::MD5 qw(md5_hex);
$hash = md5_hex($hex);
printf ("md5_X509-C2:%s\n",$hash);
#-----------------------------------------------------------------------------
open(my $out, '>:raw', 'C2R.bin') or die "Unable to open: $!";
my $C2Rhex = reverse $C2hex;
my ($hex) = pack( 'H*', $C2Rhex);
print $out "$hex";
close($out);
$hash = md5_hex($hex);
printf ("md5_X509-C2R:%s\n",$hash);
#-----------------------------------------------------------------------------
exit 0 ;
```

FIG. 7D

Today's Hash Digests
(Hashed Only Once, in the Forward Direction)

| Hash Algorithm<br><br>1501 | Digest Length "L" Bits (Bytes)<br>1502 | Preimage Attack $2^L$<br><br>1503 | Security Claim (Birthday Attack) $2^{L/2}$<br>1504 | Best Known Attack<br><br>1505 |
|---|---|---|---|---|
| MD5 | 128b (16B) | $2^{128}$ | $2^{64}$ | $2^{18}$ |
| SHA-1 | 160b (20B) | $2^{160}$ | $2^{80}$ | $2^{63.1}$ |
| SHA-256 | 256b (32B) | $2^{256}$ | $2^{128}$ | |
| SHA-512 | 512b (64B) | $2^{512}$ | $2^{256}$ | |

Improving the Preimage Attack and Security Claim By Using "R" Reverse Digests

| Hash Algorithm<br><br>1511 | Number of Reverse Digests "R" Each of Length "L"<br>1512 | Total Digest Length "(1+R)*L" Bits (Bytes)<br>1513 | Preimage Attack $2^{(1+R)*L}$<br><br>1514 | Security Claim $2^{(1+R)*L/2}$<br><br>1515 |
|---|---|---|---|---|
| MD5 | 0 | 128 (16) | $2^{128}$ | $2^{64}$ |
| MD5 | 1 | 256 (32) | $2^{256}$ | $2^{128}$ |
| MD5 | 2 | 384 (48) | $2^{384}$ | $2^{192}$ |
| MD5 | 3 | 512 (64) | $2^{512}$ | $2^{256}$ |
| MD5 | 4 | 640 (80) | $2^{640}$ | $2^{320}$ |
| SHA-1 | 0 | 160 (20) | $2^{160}$ | $2^{80}$ |
| SHA-1 | 1 | 320 (40) | $2^{320}$ | $2^{160}$ |
| SHA-1 | 2 | 480 (60) | $2^{480}$ | $2^{240}$ |
| SHA-1 | 3 | 640 (80) | $2^{640}$ | $2^{320}$ |
| SHA-1 | 4 | 800 (100) | $2^{800}$ | $2^{400}$ |
| SHA-256 | 0 | 256 (32) | $2^{256}$ | $2^{128}$ |
| SHA-256 | 1 | 512 (64) | $2^{512}$ | $2^{256}$ |
| SHA-256 | 2 | 768 (96) | $2^{768}$ | $2^{384}$ |
| SHA-256 | 3 | 1024 (128) | $2^{1024}$ | $2^{512}$ |
| SHA-256 | 4 | 1280 (160) | $2^{1280}$ | $2^{640}$ |
| SHA-512 | 0 | 512 (64) | $2^{512}$ | $2^{256}$ |
| SHA-512 | 1 | 1024 (128) | $2^{1024}$ | $2^{512}$ |
| SHA-512 | 2 | 1536 (192) | $2^{1536}$ | $2^{768}$ |
| SHA-512 | 3 | 2048 (256) | $2^{2048}$ | $2^{1024}$ |
| SHA-512 | 4 | 2560 (320) | $2^{2560}$ | $2^{1280}$ |

| Hash Digest 1121 | Stored Contents 1122 |
|---|---|
| M1 MD5 Forward Digest<br>79054025<br>255FB1A2<br>6E4BC422<br>AEF54EB4<br>Hex Reverse Digest<br>1FE11FD0<br>8C5AADC2<br>B70059FB<br>097C4433<br>1123 | Message M1 (128-Bytes)<br><br>d131dd02  c5e6eec4  693d9a06  98aff95c<br>2fcab587  12467eab  4004583e  b8fb7f89<br>55ad3406  09f4b302  83e48883  2571415a<br>085125e8  f7cdc99f  d91dbdf2  80373c5b<br>d8823e31  56348f5b  ae6dacd4  36c919c6<br>dd53e2b4  87da03fd  02396306  d248cda0<br>e99f3342  0f577ee8  ce54b670  80a80d1e<br>c69821bc  b6a88393  96f9652b  6ff72a70<br><br>104 |
| M2 MD5 Forward Digest<br>79054025<br>255FB1A2<br>6E4BC422<br>AEF54EB4<br>Hex Reverse Digest<br>3573EA2B<br>BB9AEF10<br>2E7C236A<br>66B8028D<br>1125 | Message M2 (128-Bytes)<br><br>d131dd02  c5e6eec4  693d9a06  98aff95c<br>2fcab507  12467eab  4004583e  b8fb7f89<br>55ad3406  09f4b302  83e48883  25f1415a<br>085125e8  f7cdc99f  d91dbd72  80373c5b<br>d8823e31  56348f5b  ae6dacd4  36c919c6<br>dd53e234  87da03fd  02396306  d248cda0<br>e99f3342  0f577ee8  ce54b670  80280d1e<br>c69821bc  b6a88393  96f965ab  6ff72a70<br><br>106 |

FIG. 11D

DATA DEDUPLICATION WITH COLLISION RESISTANT HASH DIGEST PROCESSES

FIELD OF THE INVENTION

The present invention relates to the field of data deduplication with collision resistant hash digest processes.

BACKGROUND

Blockchain technology is finding increasing use for insuring the error-free transfer of information. A key part of a blockchain is the hash digest. Hash algorithms take input data and converts it to, at a very high probability, a unique series of digits called a hash digest. The hash function demonstrates the avalanche effect, where a tiny change in the input, no matter how small, creates a significant change to the output digest. A variety of hashing algorithms are used to form hash digests for blockchains including MD5, SHA-1, SHA-224, SHA-512/224, SHA-256, SHA-512/256, SHA-384, SHA-512, and SHA-3. SHA stands for Secure Hash Algorithm. Hash algorithms and hash digest have a variety of uses for cryptography, a checksum to verify data integrity, and other non-cryptographic uses such as determining the partition for a key in a partitioned database. One basic requirement of any cryptographic hash function is that it should be computationally infeasible to find two distinct sets of data that produce the same hash digest when hashed. When two distinct sets of data do produce the same hash digest when hashed, the result is termed a "collision." The more digits in this hash digest, the less likely that there would be a collision, where different input had the same hash digest. MD5, for example, produces hash digests having a length of 128 bits. SHA-256, on the other hand, produces hash digests having a length of 256 bits. Collisions can be exploited by hackers to thwart cryptographic security, such as with the Flame malware in 2012. For example, the MD5 hash algorithm was initially designed to be used as a cryptographic hash function but has been found to suffer from extensive vulnerabilities due to collisions. Specifically, the MD5 blockchain hash digest algorithm has been proven to have weaknesses that allow for two different files, each the same length of bytes, to have the same MD5 hash digest, which is called a collision. MD5 and SHA-1 have both published techniques more efficient than brute force for finding collisions. SHA-256 is known to possess collisions. Every hash function with more inputs than outputs will necessarily have collisions. The objective for security applications is to generate hashing algorithms that are free of collisions to eliminate that potential vulnerability that can be exploited by others.

SUMMARY

The objective of this patent specification is to provide a specific implementation of blockchain technology that utilizes known hash algorithms to produce hash digests in a manner that avoids the occurrence of collisions, thereby producing a high security collision resistant blockchain. The idea of using hash algorithms to produce hash digests to secure data in blockchain technology is known. For example, all of the following algorithms have been used to produce hash digests for blockchains: MD5, SHA-1, SHA-224, SHA-512/224, SHA-256, SHA-512/256, SHA-384, SHA-512, and SHA-3. However, as discussed in the background, vulnerabilities exist in these hash algorithms that give bad actors the opportunity to thwart the security of blockchain technology. The present application produces a collision resistant blockchain by utilizing known hash algorithms in multiple different configurations. Specifically, the present application discloses a technological technique to create a collision resistant blockchain by hashing a digital data file in two directions, the first direction being from front-to-back as is done today, and the second direction is from back-to-front. This bidirectional approach as taught by the present application involves two hash digests, a forward blockchain hash digest and a reverse blockchain hash digest. The forward blockchain hash digest is one in which the data of a file is hashed with a hash algorithm in the front-to-back direction as is done today. The present application discloses the use of an additional hash digest, the reverse blockchain hash digest, that hashes the data file in the back-to-front direction. Both of these hash digests, the forward blockchain hash digest and the reverse blockchain has digest, are then incorporated together as a set within a block of the collision resistant blockchain. When two different data sets that have their data hashed front-to-back produce a collision, the same collision will not result when those same two different data sets have their data hashed back-to-front. This bidirectional approach is shown by the following specification to distinguish between published pairs of files having actual MD5 collisions. This bidirectional approach involves the parallel use of a first hash digest processor in the front-to-back "forward" direction and a second hash digest processor in the back-to-front "reverse" direction. Because a file may have multiple simultaneous read accesses, hashing-in-parallel means the bidirectional approach takes no additional time, while providing additional protection against collisions. This hashing-in-parallel by multiple processors may occur simultaneously to eliminate additional computing time. Each digital data file is then identified by multiple hash digests, specifically a front-to-back forward blockchain hash digest, which is today's method, and at least one back-to-front reverse blockchain hash digest Hashing the data for two different sets of data in both the front-to-back direction and the back-to-front direction to produce separate hash digests, forward hash digests and reverse hash digests, greatly reduces the occurrence of collisions in hashing the two different data sets. When using both a forward blockchain hash digest and a reverse blockchain hash digest to uniquely identify a set of data, a collision would only occur when both the forward blockchain hash digest and reverse blockchain hash digest of that data set match the forward blockchain hash digest and reverse blockchain hash digest of a different data set. The combination of a forward blockchain hash digest and a reverse blockchain hash digest form a collision resistant hash digest pair.

The present application discloses a collision resistant blockchain network that includes a network formed of a plurality of nodes and a collision resistant blockchain formed of a plurality of blocks redundantly stored across the nodes of the network. Each block of the collision resistant blockchain contains data. Each block also contains a forward blockchain hash digest formed from hashing the data front-to-back and a reverse blockchain hash digest formed from hashing the data back-to-front, whereby collisions that occur when two different sets of data are hashed front-to-back do not reoccur when those two different sets of data are also hashed back-to-front, thereby distinguishing the two different sets of data. The reverse blockchain hash digest is formed by reversing the data for hashing by hexadecimal-reverse, byte-reverse, bit-reverse, hard-disk-drive sector reverse, or forward-reverse multiplex. The network also includes Network Attached Storage that stores the data that is incorporated into the collision resistant blockchain. The network also a collision resistant blockchain appliance that includes a hashing system, wherein the collision resistant blockchain appliance accesses the data from the Network Attached Storage to generate the forward blockchain hash digest and the reverse blockchain hash digest. The hashing system includes a first hash processor configured to process the data from front-to-back and generate the forward blockchain hash digest, wherein the hashing system includes a second hash processor configured to process the data from back-to-front and generate the reverse blockchain hash digest. The forward blockchain hash digest and the reverse blockchain hash digest are formed from the data by the hashing system using a hash process selected from the group consisting of MD5, SHA-1, SHA-224, SHA-512/224, SHA-256, SHA-512/256, SHA-384, SHA-512, and SHA-3. The forward blockchain hash digest and the reverse blockchain hash digest combine to form a total digest that has double the number of bytes compared to just the length of a forward hash digest alone, thereby increasing the preimage attack strength of each of the above hash processes from $2^L$ to $2^{2L}$ where L is the hash digest length. The first and second hash processors generate the forward blockchain hash digest and the reverse blockchain hash digest in parallel and simultaneously. Each block may contain a pair of reverse blockchain hash digests. The forward blockchain hash digest and the pair of reverse blockchain hash digests combine to form a total digest that has triple the number of bytes compared to just the length of a forward hash digest alone, thereby increasing the preimage attack strength of each of the above hash processes from $2^L$ to $2^{3L}$ where L is the hash digest length. Each reverse blockchain hash digest of the pair is formed differently by reversing the data differently by hexadecimal-reverse, byte-reverse, bit-reverse, hard-disk-drive sector reverse, or forward-reverse multiplex, thereby further reducing the occurrence that collisions could result from two different sets of data. In this configuration, each data set is uniquely identified by three different hash digests, one forward blockchain hash digest, a first reverse blockchain hash digest using a hash based on reversing the data by hexadecimal-reverse, byte-reverse, bit-reverse, hard-disk-drive sector reverse, or forward-reverse multiplex, and a second reverse blockchain hash digest that uses a hash based on reversing the data using one of the data reversing techniques available for the first reverse blockchain hash digest that was not selected to produce the first reverse blockchain hash digest. With this triple-hash digest configuration, a collision would only occur when two sets of data produce the same forward hash digests, the same first reverse hash digests, and the same second reverse hash digests. As such, the occurrence of collisions is greatly reduced. The blocks of the collision resistant blockchain contain a metadata wrapper that includes hash metadata identifying the hash algorithm used to form the forward blockchain hash digest and the reverse blockchain hash digest. The metadata wrapper also includes reverse process metadata identifying whether the data was reversed by hexadecimal-reverse, byte-reverse, bit-reverse, hard-disk-drive sector reverse, or forward-reverse multiplex. The hash metadata and reverse process metadata are generated by the collision resistant blockchain appliance. The collision resistant blockchain forms a cryptocurrency, a security certificate, a smart contract, or supports data deduplication.

A non-transitory computer tangible medium containing instructions for executing a collision resistant blockchain process for data is disclosed by the present application. This process includes accessing a stored data file from a digital data storage device and generating a forward blockchain hash digest based on the stored file with a first processor by hashing the data front-to-back. The process also includes generating a reverse blockchain hash digest based on the stored file with a second processor by hashing the data back-to-front and storing both the forward blockchain hash digest and the reverse blockchain hash digest together with the data file in a block of a collision resistant blockchain. Collisions that occur when two different sets of data are hashed front-to-back do not reoccur when those two different sets of data are also hashed back-to-front, thereby distinguishing the two different sets of data. The reverse blockchain hash digest is formed by reversing the data for hashing by hexadecimal-reverse, byte-reverse, bit-reverse, hard-disk-drive sector reverse, or forward-reverse multiplex. The forward blockchain hash digest and reverse blockchain hash digest are formed simultaneously in parallel by the first and second processors. The forward blockchain hash digest and the reverse blockchain hash digest are formed from the data by the hashing system using a hash process selected from the group consisting of MD5, SHA-1, SHA-224, SHA-512/224, SHA-256, SHA-512/256, SHA-384, SHA-512, and SHA-3. The forward blockchain hash digest and the reverse blockchain hash digest combine to form a total digest that has double the number of bytes compared to just the length of a forward hash digest alone, thereby increasing the preimage attack strength of each of the above hash processes from $2^L$ to $2^{2L}$ where L is the hash digest length. The process also includes generating first metadata on the type of hash process used to generate the forward blockchain hash digest and generating second metadata on whether the data was reversed by hexadecimal-reverse, byte-reverse, bit-reverse, hard-disk-drive sector reverse, or forward-reverse multiplex. The process stores the first and second metadata in the block of the collision resistant blockchain. The collision resistant blockchain may form a cryptocurrency, a security certificate, a smart contract, or supports data deduplication.

The present application discloses a method of distributing a collision resistant blockchain across a distributed network. This method includes accessing a stored data file from a Network Attached Storage device and generating a forward blockchain hash digest based on the stored file with a first processor by hashing the data front-to-back. The method also includes generating a reverse blockchain hash digest based on the stored file with a second processor by hashing the data back-to-front and storing both the forward blockchain hash digest and the reverse blockchain hash digest together with the data file in a block of a collision resistant blockchain. Collisions that occur when two different sets of data are hashed front-to-back do not reoccur when those two different sets of data are also hashed back-to-front, thereby distinguishing the two different sets of data. The method also includes distributing copies of the collision resistant blockchain to a plurality of nodes of a distributed network for storage. The Network Attached Storage device is connected to the distributed network. The method also includes generating the forward blockchain hash digest and the reverse blockchain hash digest using a hash process such as MD5, SHA-1, SHA-224, SHA-512/224, SHA-256, SHA-512/256, SHA-384, SHA-512, and SHA-3. The forward blockchain hash digest and the reverse blockchain hash digest combine to form a total digest that has double the number of bytes compared to just the length of a forward hash digest alone, thereby increasing the preimage attack strength of each of the above hash processes from $2^L$ to $2^{2L}$ where L is the hash digest length. The method includes generating hash metadata on the type of hash process used to generate the forward blockchain hash digest and storing the hash metadata in the block of the collision resistant blockchain. The method also includes generating the reverse blockchain hash digest by reversing the data for hashing by hexadecimal-reverse, byte-reverse, bit-reverse, hard-disk-drive sector reverse, or forward-reverse multiplex. The forward blockchain hash digest and reverse blockchain hash digest are generated simultaneously in parallel by the first and second processors. The method also includes generating reverse process metadata on whether the data was reversed by hexadecimal-reverse, byte-reverse, bit-reverse, hard-disk-drive sector reverse, or forward-reverse multiplex and storing the reverse process metadata in the block of the collision resistant blockchain. The method may also include generating a second reverse blockchain hash digest based on the stored file. The reverse blockchain hash digest and second reverse blockchain hash digest select different processes to reverse the data in the stored file for hashing such as hexadecimal-reverse, byte-reverse, bit-reverse, hard-disk-drive sector reverse, or forward-reverse multiplex. The method then includes storing the second reverse blockchain hash digest in the block of the collision resistant blockchain. The collision resistant blockchain forms a cryptocurrency, a security certificate, a smart contract, or supports data deduplication.

To demonstrate the joint forward blockchain hash digest and reverse blockchain technology disclosed by this application, the present specification examines three pairs of files exhibiting MD5 collisions. The first pair of files, each 128-Bytes, exhibiting an MD5 collision was found in a laboratory exercise from the Computer Science Department of Boston University, which is incorporated by reference in its entirety, https://www.cs.bu.edu/~goldbe/teaching/CS558S17/Lab1.pdf. The second pair of files, each 64-Bytes, exhibiting an MD5 collision, was published in "Single-block collision attack on MD5," by Marc Stevens, Cryptology Group, CWI[SEP] P.O. Box 94079, NL-1090 GB Amsterdam, The Netherlands, Jan. 29, 2012, which is incorporated by reference in its entirety. The third pair of files exhibiting an MD5 X.509 certificate collision, each 1301-Bytes, was published in "Chosen-prefix Collisions for MD5 and Colliding X.509 Certificates for Different Identities," by Marc Stevens, Arjen Lenstra, and Benne de Weger. The actual contents of the colliding X.509 certificate files were found at https://www.win.tue.nl/hashclash/ChosenPrefixCollisions/ under the heading of "The Collision Example," which is hereby incorporated by reference in its entirety. Each of these three pairs of files herein was independently confirmed to have an MD5 hash digest collision in the front-to-back "forward" direction as shown in the following specification. Subsequently, this application discloses that each of these three pairs of "colliding" files is distinguished by non-identical MD5 hash digests in the back-to-front "reverse" direction. One set of back-to-front direction MD5 hash digests is calculated for all three pairs of files by reading each hexadecimal character in reverse. For the first two pairs of files, which are considerably shorter than the third pair of files, a second set of back-to-front direction MD5 hash digests is calculated by reading each byte, a pair hexadecimal characters, in reverse. A metadata wrapper is used to associate multiple hash digests with each file. This metadata wrapper is then stored in a block of the collision resistant blockchain. This bidirectional blockchain hash digest generation has utility for applications such as data deduplication, X.509 certificate security, smart contracts, cryptocurrencies, and the like.

This bidirectional blockchain hash digest technology is not limited to the MD5 hash algorithm, as a SHA-1 collision was reported in "The First Collision for full SHA-1," by Marc Stevens, Elie Bursztein, Pierre Karpman, Ange Albertini, and Yarik Markov, https://shatteredio. The MD5 hash algorithm was chosen for this patent application because there are multiple pairs of equal-length files having an MD5 collision in the forward-to-reverse direction and these colliding pairs of files are small in size, 128-bits, suitable for use in figures within this patent application. The improvements achieved for this bidirectional approach for MD5 may also be achieved by any blockchain hash algorithm, including but not limited to SHA-1, SHA-224 and SHA-512/224, SHA-256 and SHA-512/256, SHA-384, SHA-512, SHA-3, and the like.

The present specification also discloses a data deduplication process for storage based on collision resistant hash digests. The process accesses a first data message from a data storage appliance and accesses a second data message from the data storage appliance. The process then compares a forward hash digest of the first data message to a forward hash of the second data message. The forward hash digests are formed from hashing message data front-to-back. The process then compares a reverse hash digest of the first data message to a reverse hash of the second data message when there is a collision between the forward hash digests of the first and second data messages. The reverse hash digests are formed from hashing message data back-to-front. The process then replaces the second data message with a data pointer to the first data message and deletes the second data message from the storage appliance when there is a collision between the forward and reverse hash digests of the first and second data messages for deduplication. The second data message is not deduplicated when there is no collision between the forward hash digests of the first and second data messages, or when there is no collision between the reverse hash digests of the first and second data messages. The reverse hash digest is formed by reversing the hexidecimal data within a data message to form a new reverse message by a process such as hexadecimal-reverse, byte-reverse, bit-reverse, hard-disk-drive sector reverse, or forward-reverse multiplex and hashing the new reverse message with a hash algorithm. The hash algorithms include MD5, SHA-1, SHA-224, SHA-512/224, SHA-256, SHA-512/256, SHA-384, SHA-512, and SHA-3. The forward and reverse hash digests are computer simultaneously in parallel by a pair of hash core processors. The process may further include comparing a second reverse hash digest of the first data message to a second reverse hash of the second data message when there is a collision between the reverse hash digests of the first and second data messages. The second reverse hash digest is formed by a different method than the reverse hash digest. The process then replaces the second data message with a data pointer to the first data message and deletes the second data message from the storage appliance when there is a collision between the second reverse hash digests of the first and second data messages for deduplication.

The present specification also discloses a data deduplication process for file transmission based on collision resistant hash digests. The process includes accessing a data message from data storage appliance at a sender network node and accessing a forward hash digest of the data message. The process then determines whether the forward hash digest of the data message is contained within a ledger at a receiver network node. The process then accesses a reverse hash digest of the data message and determines whether the reverse hash digest of the data message is contained within the ledger at the receiver network node if the forward hash digest is contained within the ledger. Finally, the process then determines not to transmit the data message from the sender network node to the receiver network node when the receiver network node contains both the forward and reverse hash digests to prevent data duplication, where the sender and receiver network nodes are in communication with each other through a distributed network. The forward hash digest is formed from hashing the data message front-to-back. The reverse hash digest is formed from hashing the data message back-to-front. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and then hashing the new reverse message with a hash algorithm. The hash algorithm for the forward and reverse hash digests is one of MD5, SHA-1, SHA-224, SHA-512/224, SHA-256, SHA-512/256, SHA-384, SHA-512, and SHA-3.

The present specification also discloses a data deduplication process for data backup and restore based on collision resistant hash digests. The process accesses a data message from data storage appliance at a network node for data backup at a data backup storage system. The process then accesses a forward hash digest of the data message and determines whether the forward hash digest of the data message is contained within a ledger at the data backup storage system. The system then accesses a reverse hash digest of the data message and determines whether the reverse hash digest of the data message is contained within the ledger at the data backup storage system if the forward hash digest is contained within the ledger. The process then determines not to transmit the data message from the network node to the data backup storage system when the data backup storage system contains both the forward and reverse hash digests to prevent data duplication. The network node and the data backup storage system are in communication with each other through a distributed network. The forward hash digest is formed from hashing the data message front-to-back. The reverse hash digest is formed from hashing the data message back-to-front. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and hashing the new reverse message with a hash algorithm. The hash algorithm for the forward and reverse hash digests is one of MD5, SHA-1, SHA-224, SHA-512/224, SHA-256, SHA-512/256, SHA-384, SHA-512, and SHA-3. Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIGS. 1-5 demonstrate a first collision between two different 128-byte messages with MD5 hashing the message front-to-back and how no corresponding collision occurs when those two different messages are hashed with MD5 back-to-front along with blockchaining the data using a collision resistant blockchain pair formed of a forward blockchain hash digest and a reverse blockchain hash digest that form a collision resistant blockchain;

FIG. 1A illustrates first and second 128-Byte messages with identical MD5 blockchain hash digests that demonstrate a collision when hashed from front-to-back that is known in the prior art;

FIG. 2A illustrates two MD5 blockchain hash digests for a first 128-Byte message, one front-to-back (forward) and one back-to-front (reverse) by hexadecimal number;

FIG. 2C illustrates two MD5 blockchain hash digests for a second 128-Byte message, one front-to-back (forward) and one back-to-front (reverse) by hexadecimal number;

FIGS. 3A-D demonstrate software executable on a non-transitory computer tangible medium for generating forward blockchain hash digests and reverse blockchain hash digests in accordance with collision resistant blockchain technology;

FIG. 3A illustrates a flowchart for creating a workspace to create a PERL program on an iMAC computer;

FIG. 3B illustrates a PERL program for converting ASCII characters to hexadecimal and then to binary and then calculating MD5 hash digests for a first 128-Byte message: once front-to-back (forward), once back-to-front (reverse) by hexadecimal number, and once back-to-front (reverse) by byte;

FIG. 3C illustrates a PERL program for converting ASCII characters to hexadecimal and then to binary and then calculating MD5 hash digests for a second 128-Byte message: once front-to-back (forward), once back-to-front (reverse) by hexadecimal number, and once back-to-front (reverse) by byte;

FIG. 3D illustrates a flowchart for a terminal session on an iMAC computer for running a Perl program;

FIG. 4B further illustrates two MD5 blockchain hash digests for a second 128-Byte message, one front-to-back (forward) and one back-to-front (reverse) by byte;

FIGS. 5A-5H illustrate the blockchaining of data using pairs of hash digests, a forward blockchain hash digest and reverse blockchain hash digest, which form a collision resistant blockchain pair, for a collision resistant blockchain;

FIGS. 5A and 5B illustrate a metadata wrapper for forward and reverse blockchain hash digests that form a collision resistant blockchain hash digest pair;

FIG. 5C illustrates an exemplary blockchain block data structure that includes message data and a metadata wrapper for a first 128-Byte message with a forward blockchain hash MD5 digest and a hexadecimal-reverse blockchain hash digest;

FIG. 5D illustrates an exemplary blockchain block data structure that includes message data and a metadata wrapper for a second 128-Byte message with a forward blockchain hash MD5 digest and a hexadecimal-reverse blockchain hash digest;

FIG. 5E illustrates an exemplary blockchain block data structure that includes message data and a metadata wrapper for a first 128-Byte message with a forward blockchain hash MD5 digest and two reverse blockchain hash digests, one a hexadecimal-reverse and the other a byte-reverse;

FIG. 5F illustrates an exemplary data structure for a blockchain block that includes message data and a metadata wrapper for a second 128-Byte message with a forward blockchain hash MD5 digest and two reverse blockchain hash digests, one a hexadecimal-reverse and the other a byte-reverse;

FIG. 5G illustrates a collision resistant blockchain where each block in the collision resistant blockchain is chained together by a collision resistant blockchain hash digest pair as shown in FIGS. 5C and 5D;

FIG. 5H illustrates a collision resistant blockchain where each block in the collision resistant blockchain is chained together by a collision resistant blockchain hash digest set as shown in FIGS. 5E and 5F.

FIGS. 6A-J demonstrates a second collision between two different 64-byte messages with MD5 hashing the message front-to-back and how no corresponding collision occurs when those two different messages are hashed with MD5 back-to-front;

FIG. 6A illustrates prior art first and second 64-Byte messages with identical MD5 blockchain hash digests;

FIG. 6B illustrates three MD5 blockchain hash digests for a first 64-Byte message, one front-to-back (forward), one back-to-front (reverse) by hexadecimal number, and one back-to-front (reverse) by byte;

FIG. 6C illustrates three MD5 blockchain hash digests for a second 64-Byte message, one front-to-back (forward), one back-to-front (reverse) by hexadecimal number, and one back-to-front (reverse) by byte;

FIG. 6D illustrates a PERL program for converting ASCII characters to hexadecimal and then to binary and then calculating MD5 hash digests for a first 64-Byte message: once front-to-back (forward), once back-to-front (reverse) by hexadecimal number, and once back-to-front (reverse) by byte;

FIG. 6E illustrates a PERL program for converting ASCII characters to hexadecimal and then to binary and then calculating MD5 hash digests for a second 64-Byte message: once front-to-back (forward), once back-to-front (reverse) by hexadecimal number, and once back-to-front (reverse) by byte;

FIG. 6F illustrates an exemplary data structure for a blockchain block that includes message data and a metadata wrapper for a first 64-Byte message with a forward blockchain hash MD5 digest and a hexadecimal-reverse blockchain hash digest;

FIG. 6G illustrates an exemplary data structure for a blockchain block that includes message data and a metadata wrapper for a second 64-Byte message with a forward blockchain hash MD5 digest and a hexadecimal-reverse blockchain hash digest;

FIGS. 6H-6K illustrate the creation of reverse blockchain hash digests made using a hexadecimal forward-reverse multiplex operation;

FIG. 6H depicts a flow chart illustrating the generation of a hash digest using a hexadecimal forward-reverse-multiplex process;

FIG. 6I illustrates a PERL program for creating a hash digest by a hexadecimal forward-reverse-multiplex process;

FIG. 6J depicts an exemplary data structure for a blockchain block that includes message data and a metadata wrapper for a first 64-Byte message with a forward blockchain hash MD5 digest and a hexadecimal forward-reverse-multiplex blockchain hash digest;

FIG. 6K illustrates an exemplary data structure for a blockchain block that includes message data and a metadata wrapper for a second 64-Byte message with a forward blockchain hash MD5 digest and a hexadecimal forward-reverse-multiplex blockchain hash digest;

FIGS. 7A-F demonstrates a third collision between two different 1301-Byte messages, a pair of X.509 certificates, with MD5 hashing the message front-to-back and how no corresponding collision occurs when those two different messages are hashed with MD5 back-to-front;

FIG. 7A illustrates a prior art first 1301-Byte message, an X.509 certificate, with an identical MD5 blockchain hash digest with a second 1301-Byte message;

FIG. 7B illustrates a prior art second 1301-Byte message, an X.509 certificate, with an identical MD5 blockchain hash digest with a first 1301-Byte message;

FIG. 7C illustrates a PERL program for converting ASCII characters to hexadecimal and then to binary and then calculating MD5 hash digests for a first 1301-Byte message: once front-to-back (forward), and once back-to-front (reverse) by hexadecimal number;

FIG. 7D illustrates a PERL program for converting ASCII characters to hexadecimal and then to binary and then calculating MD5 hash digests for a second 1301-Byte message: once front-to-back (forward), and once back-to-front (reverse) by hexadecimal number;

FIG. 7E illustrates an exemplary data structure for a blockchain block that includes message data and a metadata wrapper for a first 1301-Byte message with a forward blockchain hash MD5 digest and a hexadecimal-reverse blockchain hash digest; and FIG. 7F illustrates an exemplary data structure for a blockchain block that includes message data and a metadata wrapper for a second 1301-Byte message with a forward blockchain hash MD5 digest and a hexadecimal reverse blockchain hash digest.

FIG. 9A illustrates the preimage attack and security claim (birthday attack) for MD5, SHA-1, SHA-256, and SHA-512;

FIG. 9B illustrates the improvements on preimage attack for MD5, SHA-1, SHA-256, and SHA-512 when they are used with R reverse hash digests;

FIG. 10A illustrates a block diagram of a collision resistant blockchain appliance in communication with a cache-tier, a disk-tier, and a tape-tier;

FIG. 10B illustrates a software block diagram of a collision resistant blockchain appliance;

FIG. 10C illustrates an exemplary distributed network for a collision resistant blockchain including Network Attached Storage (NAS), a network connected collision resistant blockchain appliance, and a network connected terminal that can all communicate with each other via satellite communications links, wireless terrestrial communications links, and communications links provided by the distributed network;

FIG. 10D illustrates a prior-art diagram of the Helion Fast Hash Core Application Specific Integrated Circuit (ASIC);

FIGS. 11A-11D illustrate the application of pairs of hash digests formed of forward blockchain hash digests and reverse blockchain hash digests to data deduplication;

FIG. 11A illustrates a process for data deduplication using collision resistant hash digests;

FIG. 11B illustrates a process for data deduplication for storage using collision resistant hash digests;

FIG. 11C illustrates the loss of information that can occur during data deduplication when hash digest collisions exist for both a pair of 128-Byte and a pair of 64-Byte messages;

FIG. 11D illustrates how information is preserved during data deduplication for a pair 128-Byte messages when a forward blockchain hash digest and a hexadecimal-reverse blockchain hash digest are used in combination;

DETAILED DESCRIPTION

Figure 1B:
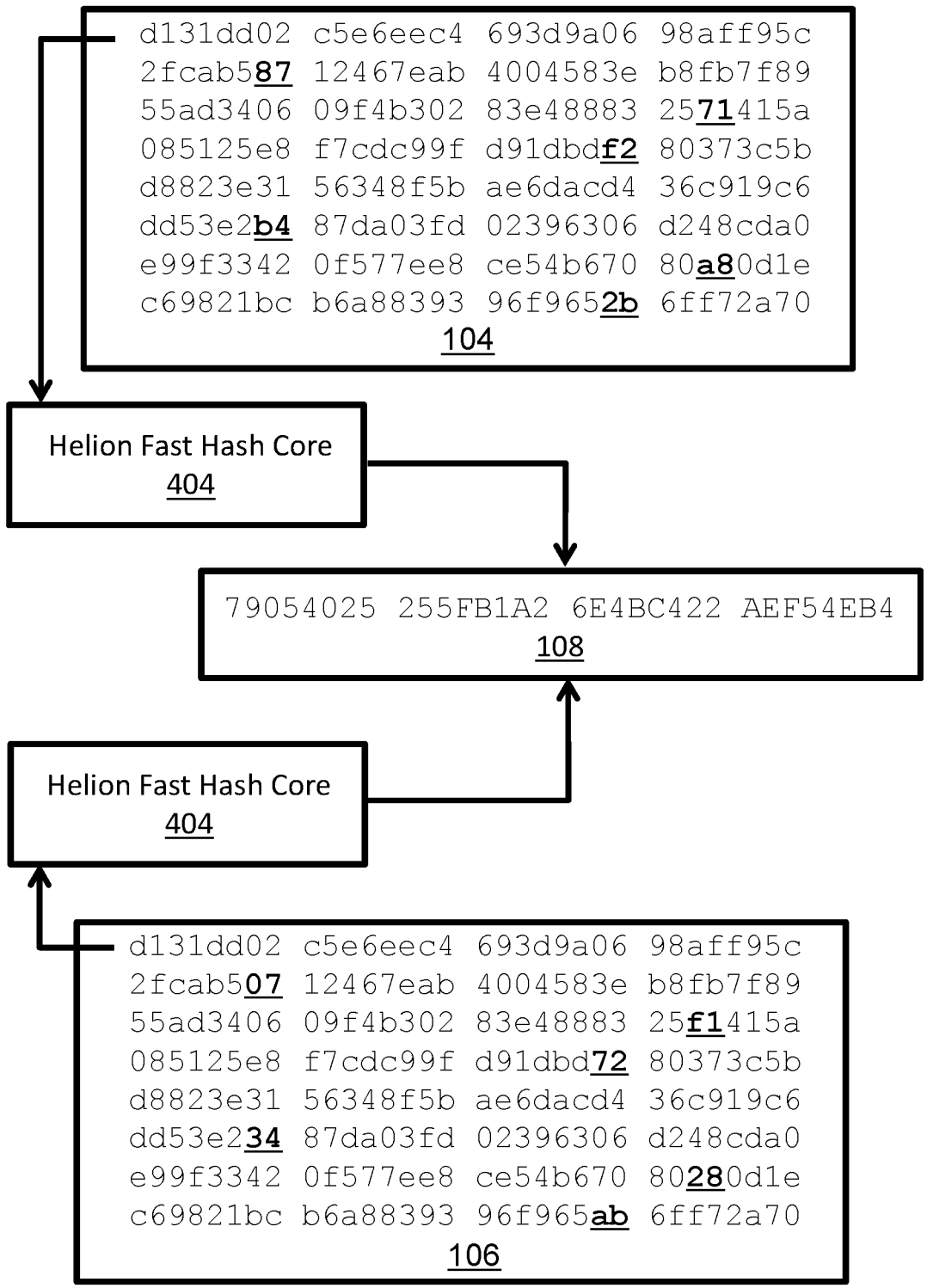
FIG. 1B further illustrates these first and second 128-Byte messages with identical MD5 blockchain hash digests that demonstrate a collision when hashed from front-to-back with hash core processors.

While the invention has been shown and described with reference to a particular embodiment thereof, it will be understood to those skilled in the art, that various changes in form and details may be made therein without departing from the spirit and scope ofthe invention. FIGS. 1-5 demonstrate a first collision between two different 128-byte messages with MD5 hashing the message front-to-back and how no corresponding collision occurs when those two different messages are hashed with MD5 back-to-front along with blockchaining data using pairs of hash digests formed of a forward blockchain hash digest and a reverse blockchain hash digest for a collision resistant blockchain. These messages may be any form of digital data such as computer code, spread sheets, multi-dimensional spread sheets, digital records, blockchain blocks, blockchains, financial transactions, medical records, financial records, legal records, smart documents, smart contracts, and the like.

FIG. 1A illustrates first and second 128-Byte messages (103 and 105) with identical MD5 blockchain hash digests 107 that demonstrate a collision when hashed from front-to-back that is known in the prior art. FIG. 1A shows table 100, with descriptor column 101 and hexadecimal column 102. Table 100 shows a first 128-Byte message M1 103 with hexadecimal contents 104 and a second 128-Byte message M2 105 with hexadecimal contents 106, and each message has the same MD5 blockchain hash digest 107 as shown in the hexadecimal contents 108. The bytes that are different between message M1 and M2 are highlighted in bold and underlined, to aid in seeing the different content of the two messages. There are only 6 bytes different in each message. Messages M1 and M2 are attributed to Xiaoyun Wang, Dengguo Feng, Xuejia Lai, and Hongbo Yu, Aug. 17, 2004, within the laboratory exercise from the Computer Science Department of Boston University, https://www.cs.bu.edut-~goldbe/teaching/CS558S17/Lab1.pdf. When two messages with different content have the same hash digest, this is called a collision. Collisions, as discussed mean that a hash digest is unable to distinguish between two sets of data in that hashing both sets of data with a particular hash algorithm result in the same hash digest. The presence of collisions represents a serious security flaw in a hash algorithm that undermines its value for cryptographic applications. In FIG. 1A, each byte is composed of two hexadecimal numbers and each individual hexadecimal number is referred to as a nibble. In FIG. 1A, it is the first nibble of each of the changed bytes that is different; however, it is easier to see the changes between M1 and M2 by highlighting the entire byte. In FIG. 1A, and all similar figures, the data comprising a message is shown in lower case hexadecimal numbers, and the blockchain hash digest of that message is shown in upper case hexadecimal numbers, to make the table easier to understand.

FIG. 1B further illustrates these first and second 128-Byte messages 103 and 105 with identical MD5 blockchain hash digests 107 that demonstrate a collision when hashed from front-to-back with hash core processors. FIG. 1B is a process diagram to further explain FIG. 1A. The contents "104" of Message M1 are processed by a first hash core 404, such as a Helion Fast Hash Core 404, FIG. 10. The contents "106" of Message M2 are processed by a second hash core 404. The contents 108 of the resulting blockchain hash digests are identical, thereby showing a collision. FIGS. 1A and 1B show a weakness in the MD5 blockchain hash digest algorithm as applied today, namely by only hashing data in the front-to-back "forward" direction. This same "collision" weakness has been also shown for the SHA-1 algorithm. SHA-256 is known to possess collisions. Every hash function with more inputs than outputs will necessarily have collisions.

FIG. 2A illustrates two MD5 blockchain hash digests 203 and 206 for a first 128-Byte message 103, one front-to-back (forward) 203 and one back-to-front (reverse) 206 by hexadecimal number. FIG. 2A shows table 200, with descriptor column 201 and hexadecimal column 202. This first message M1 103 is the same message illustrated in FIG. 1A. Table 200 shows Message M1 103 and its hexadecimal contents 104 and its blockchain hash digest in the front-to-back "forward" direction "203" with hexadecimal contents 108. However, Message M1 is then reversed to create message M1R 204 by reading hexadecimal digits 104 from back-to-front and storing these hexadecimal-reversed contents as 205. The back-to-front "reverse" blockchain MD5 hash digest 206 of M1R 205 has hexadecimal contents 207, which is numerically different from the front-to-back "forward" blockchain MD5 hash digest 108. In summary, the direction in which the data is hashed results in a different hash digest. In this example, message M1R is the hexadecimal-reverse of message M1. Message M1R and M1 are both hashed using the same MD5 algorithm. The hash digests resulting from the MD5 hash of messages M1R and M1 are different from each other.

Figure 2B:
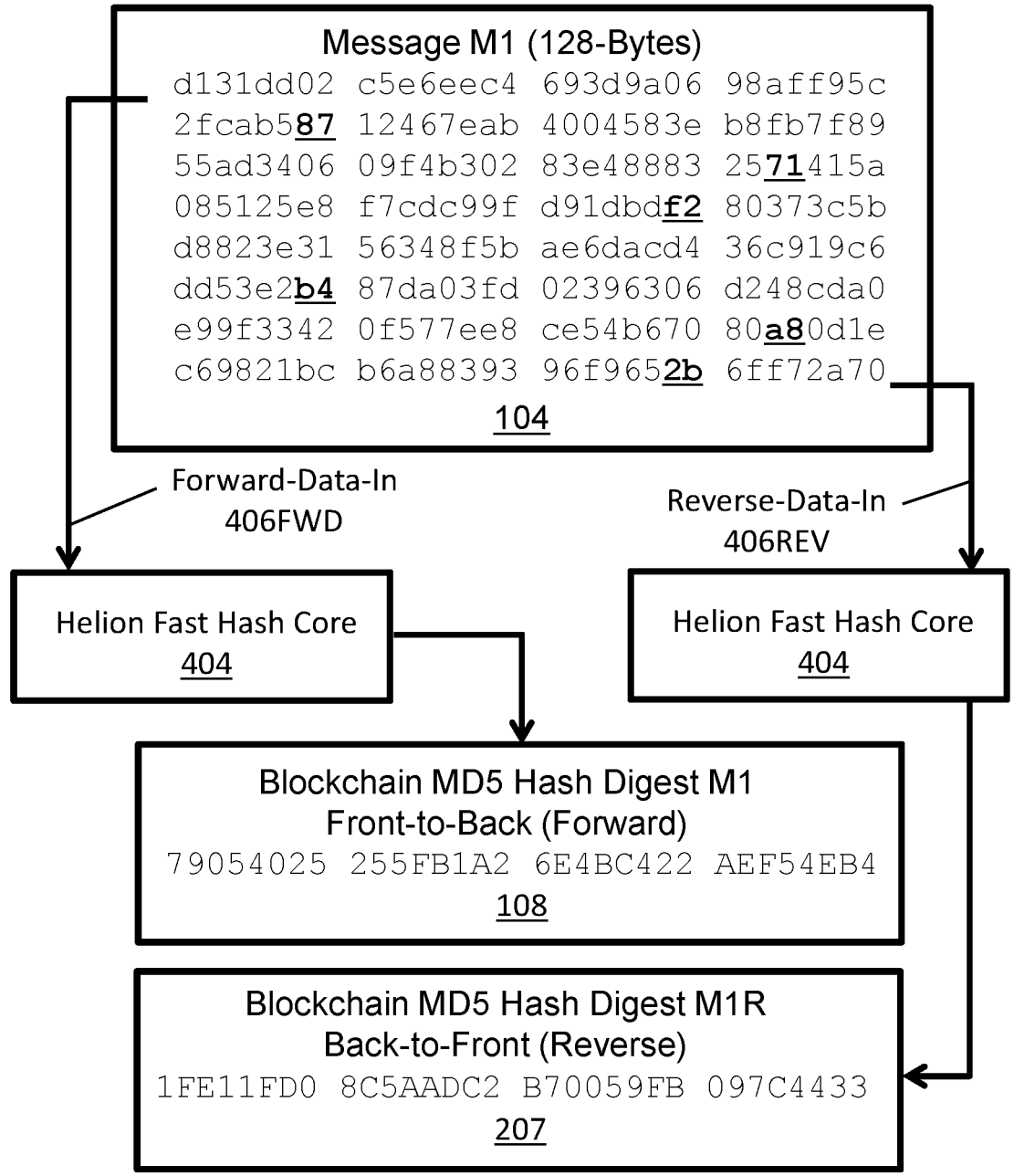
FIG. 2B further illustrates two MD5 blockchain hash digests for a first 128-Byte message, one front-to-back (forward) and one back-to-front (reverse) by hexadecimal number with hash core processors.

FIG. 2B further illustrates two MD5 blockchain hash digests 203 and 205 for a first 128-Byte message 103, one front-to-back (forward) 203 and one back-to-front (reverse) 205 by hexadecimal number with hash core processors 404. The contents of Message M1 104 is read from front-to-back to create Forward-Data-In 406FWD that is transmitted to a first fast hash core 404 for processing to generate a forward blockchain hash digest 108. In parallel, the same contents of Message M1 104 is read from back-to-front by hexadecimal number to create Reverse-Data-In 406REV that is transmitted to a second fast hash core 404 for processing to generate a reverse blockchain hash digest 207. The front-to-back "forward" hash digest output 108 from the first fast hash core is different from the back-to-front "reverse" hash digest output 207 from the second hash core.

FIG. 2C illustrates two MD5 blockchain hash digests 213 and 216 for a second 128-Byte message 105, one front-to-back (forward) 213 and one back-to-front (reverse) 216 by hexadecimal number. This second message 105 is the same message shown in FIG. 1A. FIG. 2C shows table 210, with descriptor column 211 and hexadecimal column 212. Table 210 shows Message M2 105, the contents of Message M2 106, and its blockchain hash digest 213 in the front-to-back "forward" direction 108. The contents of Message M2 is then reversed to create message M2R 214 by reading the hexadecimal digits of M2 106 from back-to-front 215. The back-to-front "reverse" blockchain MD5 hash digest 216 of M2R 215 has contents 217, which is different from the front-to-back "forward" blockchain MD5 hash digest 108. The blockchain hash digests of message M2 105 are different depending on whether the data is hashed front-to-back or back-to-front.

Figure 2D:
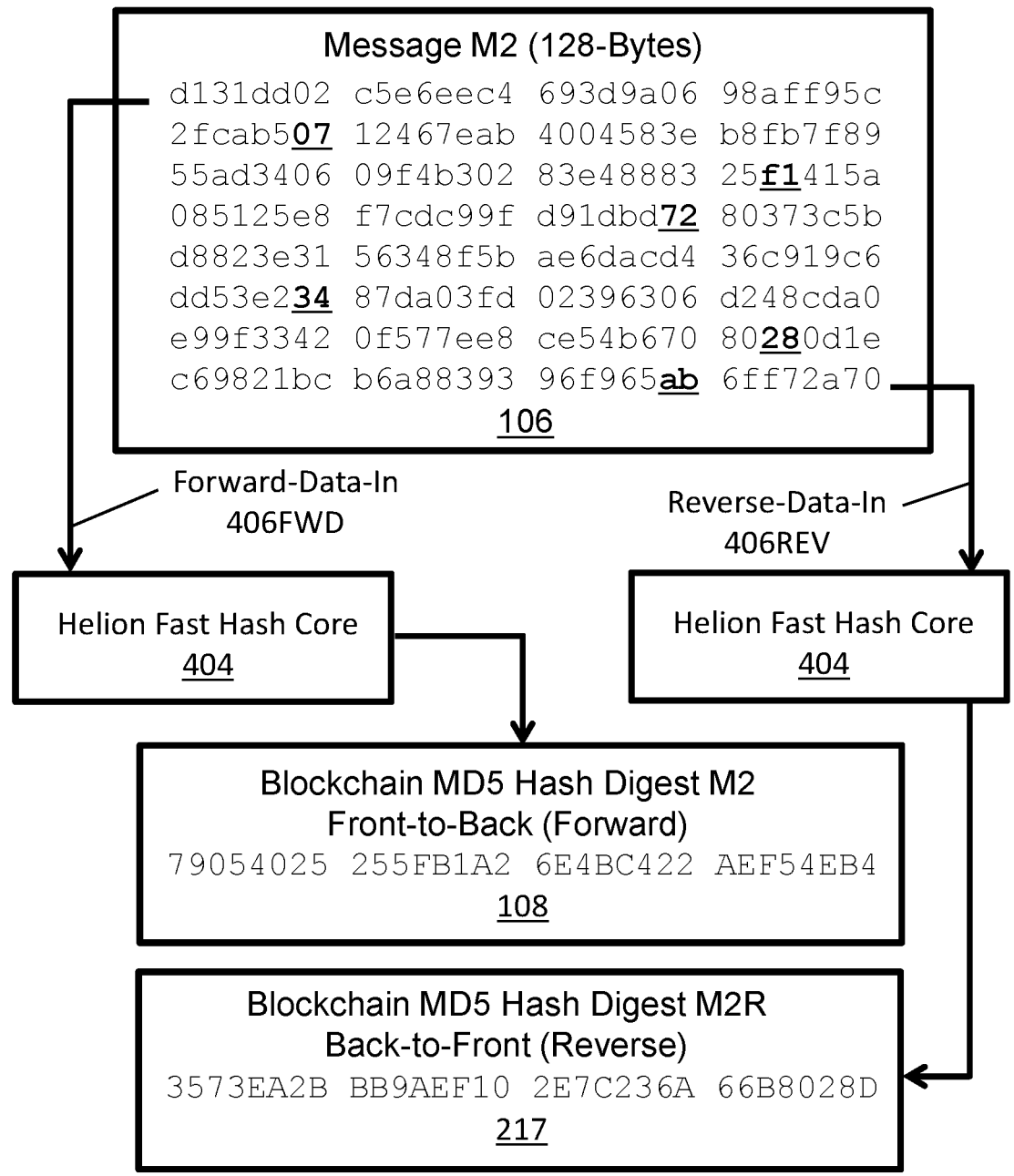
FIG. 2D further illustrates two MD5 blockchain hash digests for a second 128-Byte message, one front-to-back (forward) and one back-to-front (reverse) by hexadecimal number with hash core processors.

FIG. 2D further illustrates two MD5 blockchain hash digests 213 and 216 for a second 128-Byte message 105, one front-to-back (forward) 213 and one back-to-front (reverse) 216 by hexadecimal number with hash core processors 404. The contents of Message M2 106 is read from front-to-back to create Forward-Data-In 406FWD that is transmitted into a first fast hash core 404 for processing to generate forward blockchain hash digest 108. In parallel, the same contents of message M2 106 is read from back-to-front by hexadecimal number to create Reverse-Data-In 406REV that is transmitted into a second fast hash core 404 to generate reverse blockchain hash digest 217. The front-to-back "forward" hash digest output 108 from the first fast hash core 404 is different from the back-to-front "reverse" hash digest output 217 from the second hash core 404. The pair of hash cores 404 may process these forward and reverse blockchain hash digest simultaneously in parallel to reduce computing time to generate the hash digests 108 and 217.

Figure 3A:
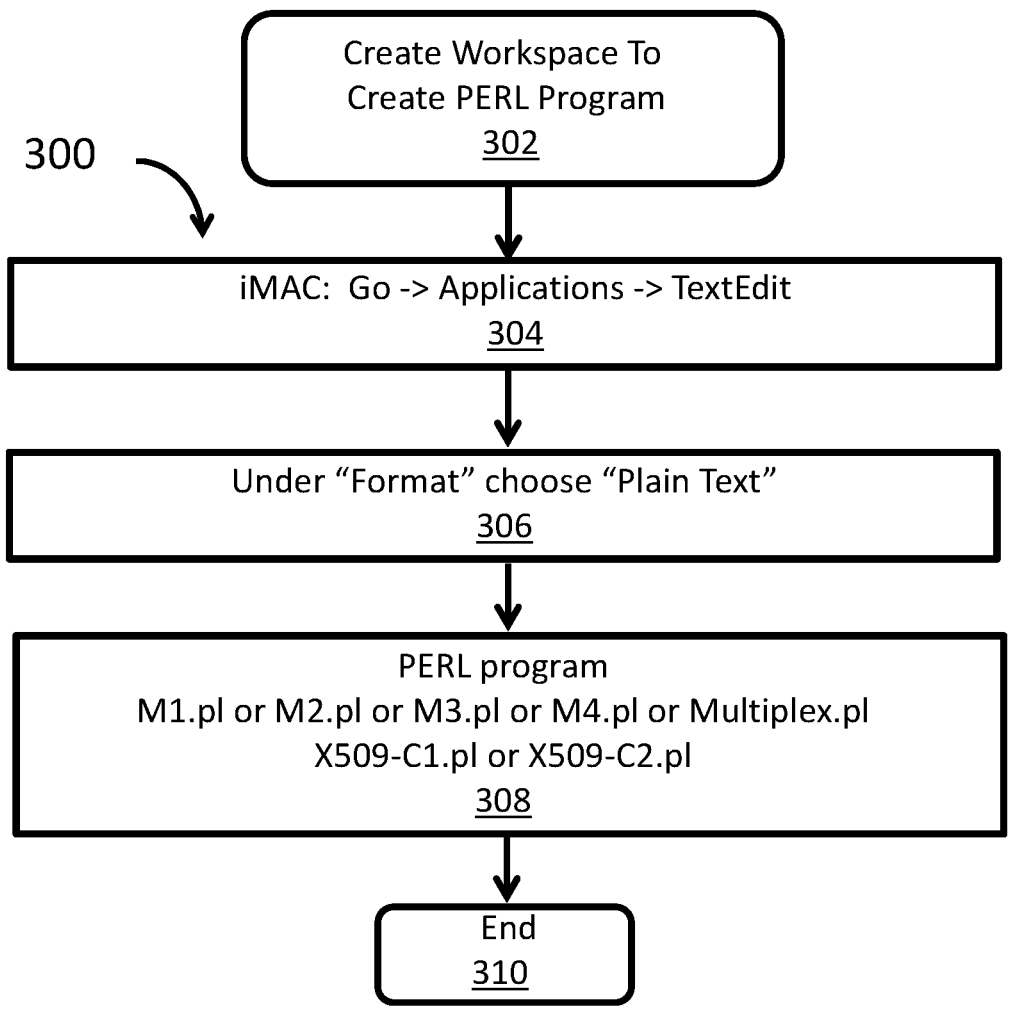

FIGS. 3A-D demonstrate software executable on a non-transitory computer tangible medium for generating forward blockchain hash digests and reverse blockchain hash digests in accordance with collision resistant blockchain technology as described in this specification. FIG. 3A illustrates a flowchart 300, which begins on step 302, to create a workspace on an iMAC computer to create a program in the PERL computing language. In step 304, the iMAC programmer selects GO from the tool bar, then selects APPLICATIONS, then selects TextEdit. In step 306, under FORMAT on the top tool bar, the programmer selects PLAIN TEXT. Then in step 308, the PERL program is created, such as for M1.pl for creating binary files and hash digests for messages M1 "104" (FIG. 1A), M1R "205" (FIG. 2A), and M1B "508" (FIG. 4A). The file type *.pl denotes programs which use the PERL programming language. Step 308 also applies to PERL programs M2.pl for Message 2, M3.pl for Message 3, M4.pl for Message 4, Multiplex.pl multiplexing Message M4, for X509-C1 for certificate C1, and X509-C2 for certificate C2.

FIG. 3B illustrates a PERL 308M1 program for converting ASCII characters to hexadecimal and then to binary and then calculating MD5 hash digests for a first 128-Byte message 103: once front-to-back (forward) 108, once back-to-front (reverse) by hexadecimal number 207, and once back-to-front (reverse) by byte 510 of FIG. 4A. FIG. 3B is the program M1.pl referred to in step 308 of FIG. 3A shown in PERL code 308M1 for messages M1 104, M1R 205, and M1B 508, as all this program is simply too big to fit into FIG. 3A. The first line in any PERL program is the statement #!/usr/bin/perl, as shown in the first line of 308M1 (FIG. 3B). Then, in FIG. 3B, three sets of instructions are used to create binary files for original message M1, hexadecimal-reversed message M1R, and byte-reversed message M1B. These instructions are necessary because FF in a word processor is a pair of ASCII characters which may be read by a human to be a pair of hexadecimal numbers, but a word processor would read FF as 4646 in ASCII, which is to be avoided in hash calculations as it would give the wrong digest. FIG. 3B then opens a binary file or dies (kills the process) if it cannot. Then the contents of 128-Byte message M1 contents 104 are copy-pasted into the program 308M1 (FIG. 3B) and each content is enclosed in 'single quotes.' These contents are read as hexadecimal numbers, not ASCII characters, and stored as output in binary form, in files such as M1.bin, M1R.bin, M1B.bin.

FIG. 3C illustrates a PERL program 308M2 for converting ASCII characters to hexadecimal and then to binary and then calculating MD5 hash digests for a second 128-Byte message 106: once front-to-back (forward) 108, once back-to-front (reverse) by hexadecimal number 215, and once back-to-front (reverse) by byte 530 of FIG. 4B. FIG. 3C is the program M2.pl referred to in step 308 of FIG. 3A shown in PERL code 308M2 for messages M2 106, M2R 215, and M2B 528, as all this program is simply too big to fit into FIG. 3A. The first line in any PERL program is the statement #!/usr/bin/perl, as shown in the first line of 308M2 (FIG. 3C). Then, in FIG. 3C, three sets of instructions are used to create binary files for original message M2, hexadecimal-reversed message 21R, and byte-reversed message M2B. These instructions are necessary because FF in a word processor is a pair of ASCII characters which may be read by a human to be a pair of hexadecimal numbers, but a word processor would read FF as 4646 in ASCII, which is to be avoided in hash calculations as it would give the wrong digest. FIG. 3C then opens a binary file or dies (kills the process) if it cannot. Then the contents of 128-Byte message M2 contents 106 are copy-pasted into the program 308M2 (FIG. 3C) and each content is enclosed in 'single quotes.' These contents are read as hexadecimal numbers, not ASCII characters, and stored as output in binary form, in files such as M2.bin, M2R.bin, M2B.bin.

At this point in FIGS. 3B and 3C, the hash digest may be calculated two ways, as a check. One way is to use the binary files M1.bin, M1R.bin, M1B.bin, as well as M2.bin, M2R.bin, and M2B.bin as manual input to http://onlinemd5.com to calculate the desired MD5 hash digests. A second way is the PERL statement, use Digest::MD5 qw(md5_hex), to initialize the MD5 hash process, $hash=md5_hex($hex), to calculate the hash digests of the contents of message M1 in hexadecimal form (not ASCII), then printf ("md5_M1:% s\n",$hash), to print the MD5 hash digest, M1 in this case, to the PERL workspace.

Figure 3D:
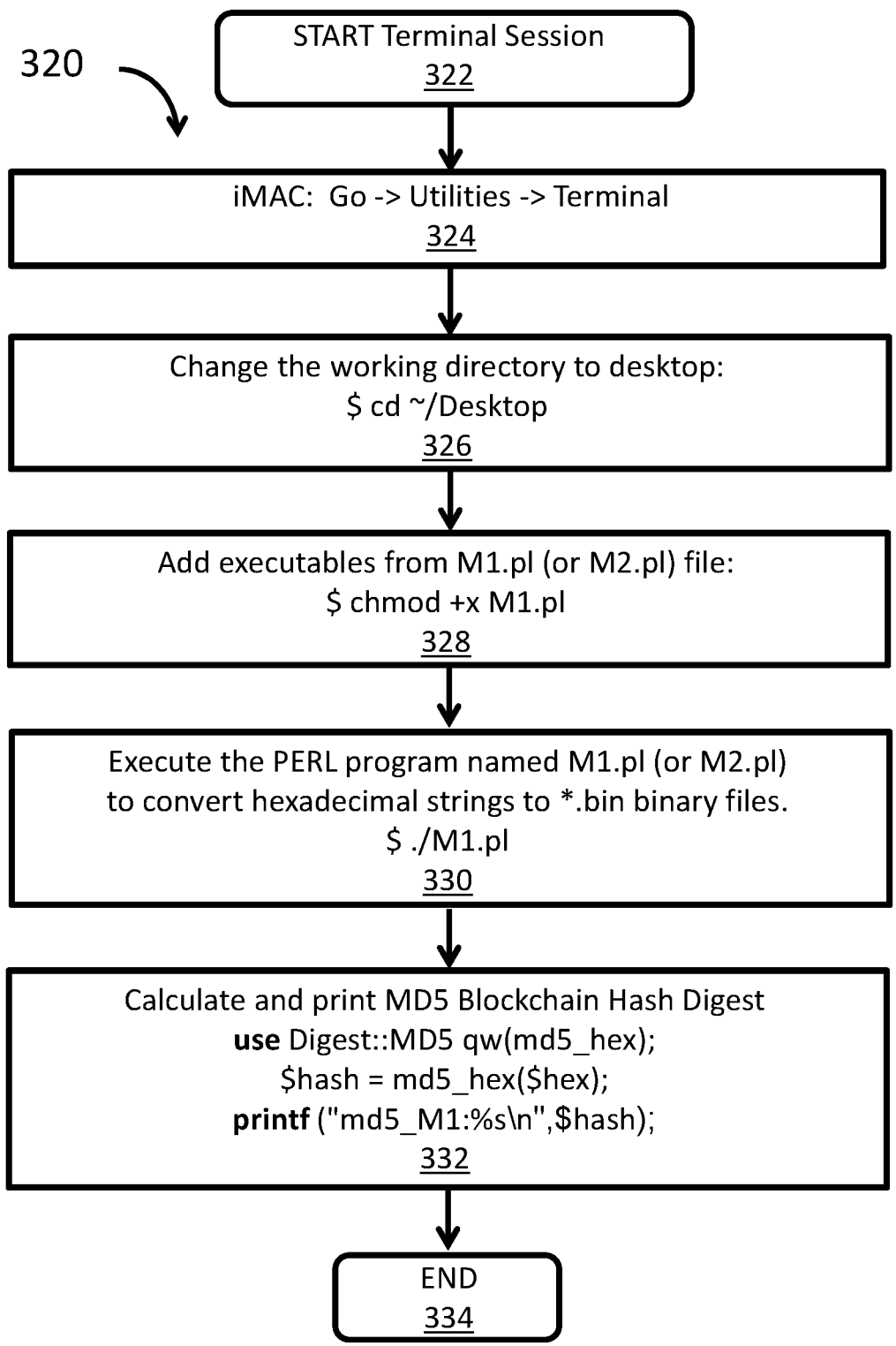
Figure 4A:
FIG. 4A illustrates two MD5 blockchain hash digests for a first 128-Byte message, one front-to-back (forward) and one back-to-front (reverse) by byte.

FIG. 3D illustrates a flowchart 320 of running a terminal session on an iMAC for PERL program 308M1 and 308M2 shown in FIGS. 3B and 3C. The process begins at step 322. The programmer then selects GO on the top toolbar, then selects UTILITIES, and then selects TERMINAL, in step 324. In step 326, the programmer executes $ cd ~/Desktop to change the working directory to the desktop screen. In step 328, the programmer executes $ chmod +x M1.pl to add executables from the M1.pl PERL program 308M1. In step 330, the programmer executes the PERL program M1.pl 308 to convert hexadecimal strings into *.bin files by entering $ ./M1.pl. Finally, in step 332, calculate the MD5 blockchain hash digest. Calculation of MD5 blockchains of the *.bin was done two ways. One via http://onlinemd5.com by manually pointing to the desired *.bin file calculated by PERL program 308 and the corresponding MD5 hash digest is calculated for each *.bin file which have been exported to the desktop of the iMAC computer by the M1.pl and M2.pl PERL programs for FIGS. 1A, 1B, 2A, 2B, 2C, and 2D. The second way, shown in step 332, was via use Digest::MD5 qw(md5_hex), to initialize the MD5 hash process, $hash=md5_hex($hex), to calculate the hash digests of the contents of message M1 in hexadecimal form (not ASCII), then printf("md5_M1:% s\n",$hash), to print the hash digest to the PERL workspace. Both of the above methods were used to serve as an accuracy check. The contents of M1R and M2R, hexadecimal-reverse of M1 and M2, respectively, were calculated two ways. One way was to manually reverse the hexadecimal contents of M1 and M2, since both messages were short. The other way was to use the PERL reverse command, such as my $M1Rhex=reverse $M1hex, to reverse the hexadecimal content of M1 and store it as M1R. Both hexadecimal-reverse methods produced the same MD5 hash digests, which served as an accuracy check.

FIG. 4A illustrates two MD5 blockchain hash digests for a first 128-Byte message 104, one front-to-back (forward) 108 and one back-to-front (reverse) by byte 510. FIG. 4B further illustrates two MD5 blockchain hash digests for a second 128-Byte message 106, one front-to-back (forward) 108 and one back-to-front (reverse) by byte 530. FIGS. 4A and 4B depict tables 500 and 520, respectively, showing the byte-reverse generation of blockchain hash digests for Messages M1 104 and M2 106. FIG. 4A shows table 500, with descriptor column 501 and hexadecimal column 502. Table 500 shows Message M1 103 and its hexadecimal contents 104 and its blockchain hash digest in the front-to-back "forward" direction "505" with hexadecimal contents 108. However, Message M1 is then reversed to create M1B 507 by reading the bytes (pairs of hexadecimal digits) of Message M1 from back-to-front to create content 508. The back-to-front "byte-reverse" blockchain MD5 hash digest of M1B 509 is the string of hexadecimal digits 510, which is different from the front-to-back "forward" blockchain MD5 hash digest 108 of M1 and different from the hexadecimal-reverse blockchain MD5 hash digest 207 of M1R (FIG. 2A). FIG. 4B shows table 520, with descriptor column 521 and hexadecimal column 522. Table 520 shows Message M2 105 and its hexadecimal contents 106 and its blockchain hash digest in the front-to-back "forward" direction "525" with hexadecimal contents 108. However, Message M2 is then reversed to create M2B 527 by reading the bytes (pairs of hexadecimal digits) of Message M2 from back-to-front with contents 528. The back-to-front "byte-reverse" blockchain MD5 hash digest of M2B 529 is the string of hexadecimal digits 530, which is different from the front-to-back "forward" blockchain MD5 hash digest of "108" of M2 and different from the hexadecimal-reverse blockchain MD5 hash digest 217 of M2R (FIG. 2C). Thus, there is more than one way to calculate reverse blockchain hash digests, and these ways are further discussed in FIGS. 5A-5F.

Figure 5C:
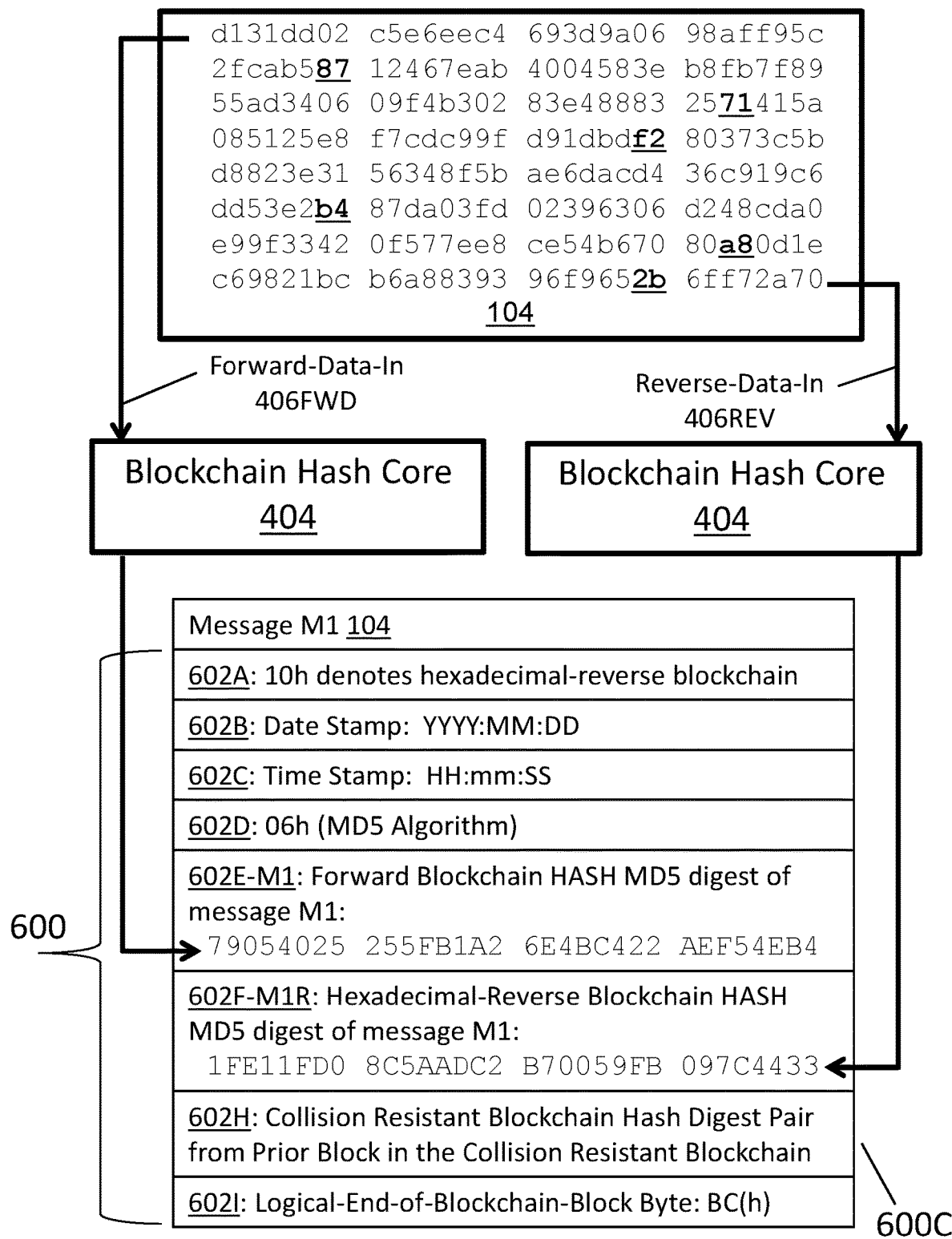

FIGS. 5A-5G illustrate the blockchaining of data using pairs of hash digests, a forward blockchain hash digest and reverse blockchain hash digest, for a collision resistant blockchain. FIGS. 1-4 demonstrate the ability to utilize combinations of forward blockchain hash digests and reverse blockchain hash digests to function as a collision avoidance pair. The combination of a forward blockchain hash digest and a reverse blockchain hash digest forms a collision resistant hash digest pair. FIGS. 5A-5G show the application of collision resistant hash digest pairs to blockchain technology to build a collision resistant blockchain that has a higher degree of security due to the collision resistance of the pairs of forward and reverse blockchain hash digests that are used to chain the blocks together. FIGS. 5A and 5B illustrate a metadata wrapper 600 for forward and reverse blockchain hash digests that form a collision resistant blockchain hash digest pair. Metadata wrapper 600 is incorporated and stored within each block of a collision resistant blockchain. Metadata wrapper 600 contains metadata regarding the forward and reverse blockchain hash digests that form a collision resistant blockchain hash digest pair along with the associated message (data object). In column 601 are the bytes used in the collision resistant blockchain block and column 602 gives the description. Byte-0 (602A) gives the type of reverse blockchain hash digest used along with the number of reverse blockchain hash digests used: with 1×h (hex) denoting one reverse blockchain hash digest being used, 2×h denoting two different reverse blockchain hash digests being used, 3×h denoting three different reverse blockchain hash digests being used, and 4×h denoting four different reverse blockchain hash digests being used. 5×h denotes five different reverse blockchain hash digests being used as shown in FIG. 5A. The type of reverse blockchain hash digest refers to the manner in which the message (data object) has its data reversed for computation of the hash digest. For example, the message may be reversed by hexadecimal, by bit, by byte, or by sector. Specifically, 10$h$ denotes a hexadecimal-reverse blockchain hash digest, 11$h$ denotes a byte-reverse blockchain hash digest, 12$h$ denotes a bit-reverse blockchain hash digest, 13$h$ denotes a sector-reverse blockchain hash digest, such as in a series of HDD (hard disk drive) sectors, and 14$h$ denotes a hexadecimal forward-reverse multiplex hash digest. 20$h$ denotes a reverse blockchain hash digest pair formed with a hexadecimal-reverse hash digest and a byte-reverse hash digest. 21$h$ denotes a reverse blockchain hash digest pair formed with a byte-reverse hash digest and a bit-reverse hash digest. 22$h$ denotes a reverse blockchain hash digest pair formed with a bit-reverse hash digest and a sector-reverse hash digest. 23$h$ denotes a reverse blockchain hash digest pair formed with a hexadecimal-reverse hash digest and a bit-reverse hash digest. 24$h$ denotes a reverse blockchain hash digest pair formed with a hexadecimal-reverse hash digest and a sector-reverse hash digest. 25$h$ denotes a reverse blockchain hash digest pair formed with a hexadecimal-reverse hash digest and a hexadecimal forward-reverse hash digest. 30$h$ denotes a reverse blockchain hash digest set formed with a hexadecimal-reverse hash digest, a byte-reverse hash digest, and a bit-reverse hash digest. 31$h$ denotes a reverse blockchain hash digest set formed with a byte-reverse hash digest, a bit-reverse hash digest, and a sector-reverse hash digest. 32$h$ denotes a reverse blockchain hash digest set formed with a hexadecimal-reverse hash digest, a byte-reverse hash digest, and a hexadecimal forward-reverse multiplex hash digest. 40$h$ denotes a reverse blockchain hash digest set formed with a hexadecimal-reverse hash digest, a byte-reverse hash digest, a bit-reverse hash digest, and a sector-reverse hash digest. 50$h$ denotes a reverse blockchain hash digest set formed with a hexadecimal-reverse hash digest, a byte-reverse hash digest, a bit-reverse hash digest, a sector-reverse hash digest, and a hexadecimal forward-reverse multiplex hash digest. Bytes 1-4 (602B) are a date stamp comprising year, month, and day in the form YYYY:MM:DD. Bytes 5-7 are a time stamp (602C), comprising hours, minutes, and seconds in the form HH:mm:SS. In one embodiment, the hours, minutes, and seconds are in Greenwich Mean Time. In an alternate embodiment, two bytes could be added to denote the local time zone of the time stamp. In an alternate embodiment, additional bytes could be used to denote fractions of seconds, especially for objects stored in cache.

Continuing with the description of metadata wrapper 600, Byte-8 (602D) defines the hash algorithm used. For example, the SHA-224 algorithm identifier is ooh, the SHA-256 algorithm identifier is 01h, the SHA-384 algorithm identifier is 02h, the SHA-512 algorithm identifier is 03h, the SHA-512/224 algorithm identifier is 04h, the SHA-512/256 algorithm identifier is 05h, and the MD5 algorithm identifier is 06h. Beginning with Byte-9 (602E), the actual forward blockchain hash digest is enclosed. For example, for SHA-224 and SHA-512/224 digests (224-bits or 28-Bytes) use Bytes 9-36 (when Byte-8 equals 00h or 04h), SHA-256 and SHA-512/256 digests (256-bits or 32-Bytes) use Bytes 9-40 (when Byte-8 equals 01h or 05h), SHA-384 digest (384-bits or 48-Bytes) uses Bytes 9-56 (when Byte-8 equals 02h), SHA-512 digest (512-bits or 64-Bytes) uses Bytes 9-72 (when Byte-8 equals 03h), and MD-5 digest (128-bits or 16-Bytes) uses Bytes 9-24 (when Byte-8 equals 06h). These digests may be calculated by a first hash core 404. Referring to 602F in FIG. 5B, the first reverse blockchain hash digest is enclosed within metadata wrapper 600. For example, for SHA-224 and SHA-512/224 digests (224-bits or 28-Bytes) use Bytes 37-64 (when Byte-8 equals 00h or 04h), SHA-256 and SHA-512/256 digests (256-bits or 32-Bytes) use Bytes 41-72 (when Byte-8 equals 01h or 05h), SHA-384 digest (384-bits or 48-Bytes) uses Bytes 57-104 (when Byte-8 equals 02h), SHA-512 digest (512-bits or 64-Bytes) uses Bytes 73-136 (when Byte-8 equals 03h), and MD-5 digest (128-bits or 16-Bytes) uses Bytes 25-40 (when Byte-8 equals 06h). These digests may be calculated by a second hash core 404. In 602G, metadata wrapper 600 may include the reverse blockchain hash digests for additional reverse blockchain hash digests that are formed by different techniques of reversing the data within the message as designated in byte-0 602A. In 602H, metadata wrapper 600 includes the collision resistant blockchain pair or set from the previous collision resistant blockchain block if the metadata wrapper is not for the genesis collision resistant blockchain block. If the collision resistant blockchain uses just a collision resistant blockchain hash digest pair, then only one reverse blockchain hash digest is used. If the collision resistant blockchain uses a collision resistant blockchain hash digest set, then two or more reverse blockchain hash digests are used. The inclusion of the collision resistant blockchain hash digest pair or set from the prior block of the collision resistant blockchain forms that hash digest chain that links the blocks together within the collision resistant blockchain. A Logical-End-of-B-Block Byte (601I) may follow the above information. An exemplary Logical-End-of-B-block Byte is the hexadecimal number "BC" (1011 1100), where "BC" denotes blockchain. Assuming that only one 602F reverse blockchain is used, this Logical-End-of-B-Block byte is byte-65 for SHA-224 and SHA-512/224 (when Byte-8=00h or 04h), byte-73 for SHA-256 and SHA-512/256 (when Byte-8=01 h or 05h), byte-105 for SHA-384 digest (when Byte-8=02h), byte-137 for SHA-512 digest (when Byte-8=03h), and byte-41 for MD-5 digest (when Byte-8=06h). Metadata wrapper 600 illustrates a metadata wrapper for a collision resistant blockchain hash digest pair formed of one forward blockchain hash digest and one reverse blockchain hash digest. As noted above with respect to byte-0, the message may be reversed by various techniques of hexadecimal-reverse, bit-reverse, byte-reverse, and sector-reverse. A block of a collision resistant blockchain will include at least one reverse blockchain hash digest. A block of a collision resistant blockchain may include more than one reverse blockchain hash digest where the multiple reverse blockchain hash digests hash the message each using a different technique for reversing the data, thereby producing different reverse blockchain hash digests. A collision will only occur in a collision resistant blockchain pair when there is a simultaneous collision with both the forward blockchain hash digests and the reverse blockchain hash digests for two different sets of data. While collision may occur between two different sets of data when hashed in the front-to-back direction, the likelihood that a corresponding collision will also occur when the same two different sets of data are hashed in the back-to-front direction is fundamentally reduced compared to using just the forward blockchain hash digest, thereby forming the foundation for a collision resistant blockchain. Collision resistant blockchain hash digest sets are formed of a forward blockchain hash digest and two or more reverse blockchain hash digests. For a collision to occur in a collision resistant blockchain hash digest set, there must be a simultaneous collision with the forward blockchain hash digest and the two or more reverse blockchain hash digests between two different sets of data. The likelihood that two different sets of data will produce a collision when hashed front-to-back as well as simultaneously producing a collision when hashed back-to-front using two or more different techniques for reversing the data is fundamentally reduced compared to using just the forward blockchain hash digest, thereby forming the foundation for a collision resistant blockchain.

FIG. 5C illustrates an exemplary blockchain block data structure 600C that includes message data 104 and a metadata wrapper 600 for a first 128-Byte message 104 with a forward blockchain hash MD5 digest 108 and a hexadecimal-reverse blockchain hash digest 207. Data structure 600C is for a single block in a collision resistant blockchain. Data structure 600C is shown being constructed from a message 104 that is being processed by a pair of parallel blockchain hash cores 404. The contents of Message M1 104 are provided first in data structure 600C of the blockchain block, followed by the metadata wrapper 600 discussed in FIGS. 4A and 4B. The metadata wrapper includes metadata 602A, with a value of 10h, indicating the use of a single reverse blockchain, namely the hexadecimal-reverse blockchain. Next, metadata 602B, the Date Stamp YYYY:MM:DD and the metadata 602C Time Stamp FIH:mm:SS follow. Metadata 602D has a value of 06h to denote the use of the MD5 hash algorithm. The contents of Message M1 "104" are shown at the top of FIG. 5C, where Forward-Data-In Forward-Data-In "406FWD," Message M1 is read from front-to-back into blockchain hash core 404 to produce the forward blockchain hash digest shown in 602E of metadata wrapper 600 of data structure 600C. In Reverse-Data-In "406REV," Message M1 is read from back-to-front into blockchain hash core 404 to produce the reverse blockchain hash digest shown in 602F of metadata wrapper 600 of data structure 600C. Blockchain hash cores 404 may perform the 406FWD and 406REV operations simultaneously in parallel. The forward blockchain hash MD5 digest of the Forward-Data-In of Message M1 104 is stored as 602E-M1. The hexadecimal-reverse blockchain hash MD5 digest of M1R is stored in 602F-M1R. Blockchain block data structure 600C includes metadata 602H on the collision resistant blockchain digest pair from the previous blockchain block in the collision resistant blockchain, thereby linking these two blocks together in a blockchain. Block data structure 600C concludes with logical-end-of-blockchain byte BC(h), 602I. Note that data structure 600C is depicted as having a collision resistant blockchain hash digest pair, which is formed of a forward blockchain hash digest and a reverse blockchain hash digest.

Figure 5D:
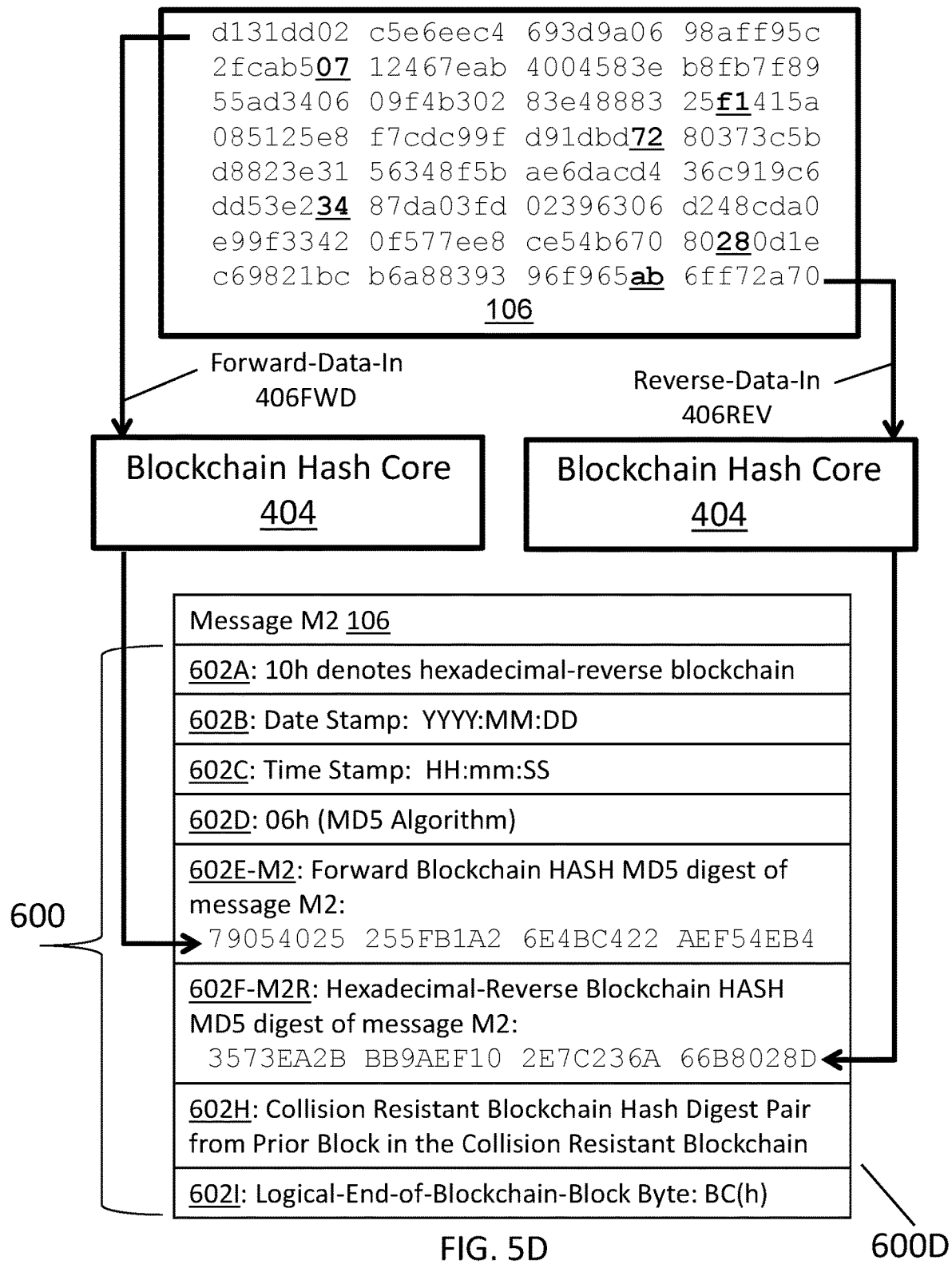

FIG. 5D illustrates an exemplary blockchain block data structure 600D that includes message data 106 and a metadata wrapper 600 for a second 128-Byte message 105 with a forward blockchain hash MD5 digest 213 and a hexadecimal-reverse blockchain hash digest 216. Data structure 600D is for a single block in a collision resistant blockchain Data structure 600D is shown being constructed from a message 106 that is being processed by a pair of parallel blockchain hash cores 404. Message M2 106 is included first the blockchain block data structure 600D followed by metadata wrapper 600. Within metadata wrapper 600, metadata 602A is provided first with a value of 10h, indicating the use of a single reverse blockchain, namely the hexadecimal-reverse blockchain. In metadata 602B, the Date Stamp YYYY:MM:DD and the metadata 602C Time Stamp HH:mm:SS follow. Metadata 602D has a value of 06h to denote the use of the MD5 hash algorithm. The contents of Message M2 "106" are shown at the top of FIG. 5D being hashed by two separate blockchain hash cores operating simultaneously in parallel. With Forward-Data-In "406FWD," Message M2 is read from front-to-back of into blockchain hash core 404 to produce forward blockchain hash digest 213 listed in 602E. With Reverse-Data-In "406REV," Message M2 is read from back-to-front into blockchain hash core 404 to produce reverse blockchain hash digest 216 included as metadata 602F. 406FWD is input to one blockchain hash core 404 and, in parallel, 406REV is input to a second blockchain hash core 404. These two parallel hash cores 404 may operate simultaneously to reduce processing time. The forward blockchain hash MD5 digest of the Forward-Data-In of Message M2 is stored as 602E-M2. The hexadecimal-reverse blockchain hash MD5 digest of M2R is stored in 602F-M2R. In metadata 600H, the metadata wrapper stores the collision resistant blockchain hash digest pair from the previous block in the blockchain to interlink the two blockchain blocks together. Metadata wrapper 600 concludes with logical-end-of-blockchain byte BC(h), 602I. Note that data structure 600D is depicted as having a collision resistant blockchain hash digest pair, which is formed of a forward blockchain hash digest and a reverse blockchain hash digest.

Comparing blockchain block data structures 600C and 600D indicates that Messages M1 and M2 are now distinguished from one another due to the hexadecimal-reverse blockchain hash digests 602F-M1R and 602F-M2R. These hexadecimal-reverse blockchain hash digests do not replace forward blockchain hash digests 602E-M1 and 602E-M2. Instead, the hexadecimal-reverse blockchain hash digests 602F-M1R and 602F-M2R act in combination with forward blockchain hash digests 602E-M1 and 602E-M2 to distinguish messages M1 and M2 from one another, thus avoiding the collision identified in FIG. 1A. While there is a collision between messages M1 and M2 when the forward hash digests are compared, there is not a similar collision between messages M1 and M2 when the reverse hash digests are compared. As there is not a simultaneous collision between both the forward reverse hash digest and the reverse hash digest of the collision resistant hash digest pair, there is not a collision in the collision resistant hash digest pair and the collision resistant hash digest pair is capable of distinguishing between the messages M1 and M2 using the MD5 algorithm, whereas usage of just the forward blockchain hash digest is incapable of avoiding the collision.

FIG. 5E shows a blockchain block data structure 600E. Blockchain block data structure 600E is a data structure for a single blockchain block. Blockchain data structures 600C and 600D each are provided with a blockchain hash digest pair. Blockchain block data structure 600E is provided with a pair of reverse blockchain hash digests, one formed by hexadecimal-reverse and one by byte-reverse. This pair of reverse blockchain hash digests, combined with the forward blockchain hash digest, forms a collision resistant blockchain hash digest set. The contents of Message M1 104 are included within blockchain block data structure 600E first. Next metadata wrapper 600 is appended to Message M1 104. Metadata wrapper 600 includes metadata 602A, which is shown having a value of 20h, indicating the use of two reverse blockchains, namely the hexadecimal-reverse blockchain hash and the byte-reverse hash. Metadata 602B, the Date Stamp YYYY:MM:DD and metadata 602C Time Stamp HH:mm:SS follow within metadata wrapper 600. Metadata 602D has a value of 06h to denote the use of the MD5 hash algorithm. The forward blockchain hash MD5 digest of the Forward-Data-In of Message M1 is stored as 602E-M1. The hexadecimal-reverse blockchain hash MD5 digest of M1R is stored in 602F-M1R. The byte-reverse blockchain hash MD5 digest of M1B is stored in 602F-M1B. Metadata 602H includes the collision resistant blockchain hash digest set from the previous block in the blockchain to interlink this block with the prior block. Metadata wrapper 600 concludes with logical-end-of-blockchain byte BC(h), 602I.

FIG. 5F shows blockchain block data structure 600F. Blockchain block data structure 600F is a data structure for a single blockchain block. Blockchain data structures 600C and 600D each are provided with a blockchain hash digest pair. Blockchain block data structure 600F is provided with a pair of reverse blockchain hash digests, one formed by hexadecimal-reverse and one by byte-reverse. This pair of reverse blockchain hash digests, combined with the forward blockchain hash digest, forms a collision resistant blockchain hash digest set. The contents of Message M2 106 is first included within blockchain block data structure 600F. Next, metadata wrapper 600 is included within blockchain block data structure 600F. Metadata wrapper 600 includes metadata 602A having a value of 20h, indicating the use of two reverse blockchains, namely the hexadecimal-reverse blockchain hash and the byte-reverse hash. Metadata 602B, the Date Stamp YYYY:MM:DD and metadata 602C Time Stamp HH:mm:SS follow. Metadata 602D has a value of 06h to denote the use of the MD5 hash algorithm. The forward blockchain hash MD5 digest of the Forward-Data-In of Message M2 is stored as 602E-M2. The hexadecimal-reverse blockchain hash MD5 digest of M2R is stored in 602F-M2R. The byte-reverse blockchain hash MD5 digest of M2B is stored in 602F-M2B. Metadata 602H includes the collision resistant blockchain hash digest set from the previous block in the blockchain to interlink this block with the prior block. Metadata wrapper 600 concludes with logical-end-of-blockchain byte BC(h), 602I.

Comparing wrappers 600E and 600F indicates that Messages M1 and M2 are now further distinguished from one another due to the hexadecimal-reverse blockchains hash digests 602F-M1R and 602F-M2R as well as the byte-reverse blockchain hash digests 602F-M1B and 602F-M2B. These hexadecimal-reverse and byte-reverse blockchain hash digests do not replace forward blockchain hash digests 602E-M1 and 602E-M2. Instead, the hexadecimal-reverse blockchain hash digests 602F-M1R and 602F-M2R and byte-reverse blockchain hash digests 602F-M1B and 602F-M2B act in combination with forward blockchains 602E-M1 and 602E-M2 to further distinguish messages M1 and M2 from one another, thus avoiding the collision identified in FIG. 1A. When a forward blockchain hash digest is combined with a reverse blockchain hash digest, the combination is referred to as a collision resistant blockchain hash digest pair. For a collision to occur between two different files each possessing a collision resistant blockchain hash digest pair, there must be a simultaneous collision between both of the forward blockchain hash digests and the reverse blockchain hash digests. When a forward blockchain hash digest is combined with two or more reverse blockchain hash digests that are formed by different methods for reversing the message data, like hexadecimal-reverse and byte-reverse, that combination is referred to as a collision resistant blockchain hash digest set. Blockchain block data structure 600E is a data structure for a single blockchain block. Blockchain block data structure 600F is a data structure for a single blockchain block. Metadata 602H contains collision resistant blockchain hash digests from prior blockchain blocks in the collision resistant blockchain that link the blocks together into a blockchain. Blockchain block data structures 600E and 600F are shown as having a pair of reverse blockchain hash digests, one that is formed by hexadecimal-reverse and byte-reverse. Together with the forward blockchain hash digest, this pair of reverse blockchain hash digests form a collision resistant blockchain hash digest set. For a collision to occur between messages 104 and 106 with a collision resistant blockchain hash digest set, there must be simultaneous collisions between both of the forward hash digests, both of the hexadecimal-reverse hash digests, and both of the byte-reverse hash digests. The inclusion of the additional reverse hash digest in 600E and 600F further limits the number collisions that can occur using MD5 when compared to just using a forward blockchain hash digest.

Figure 5G:
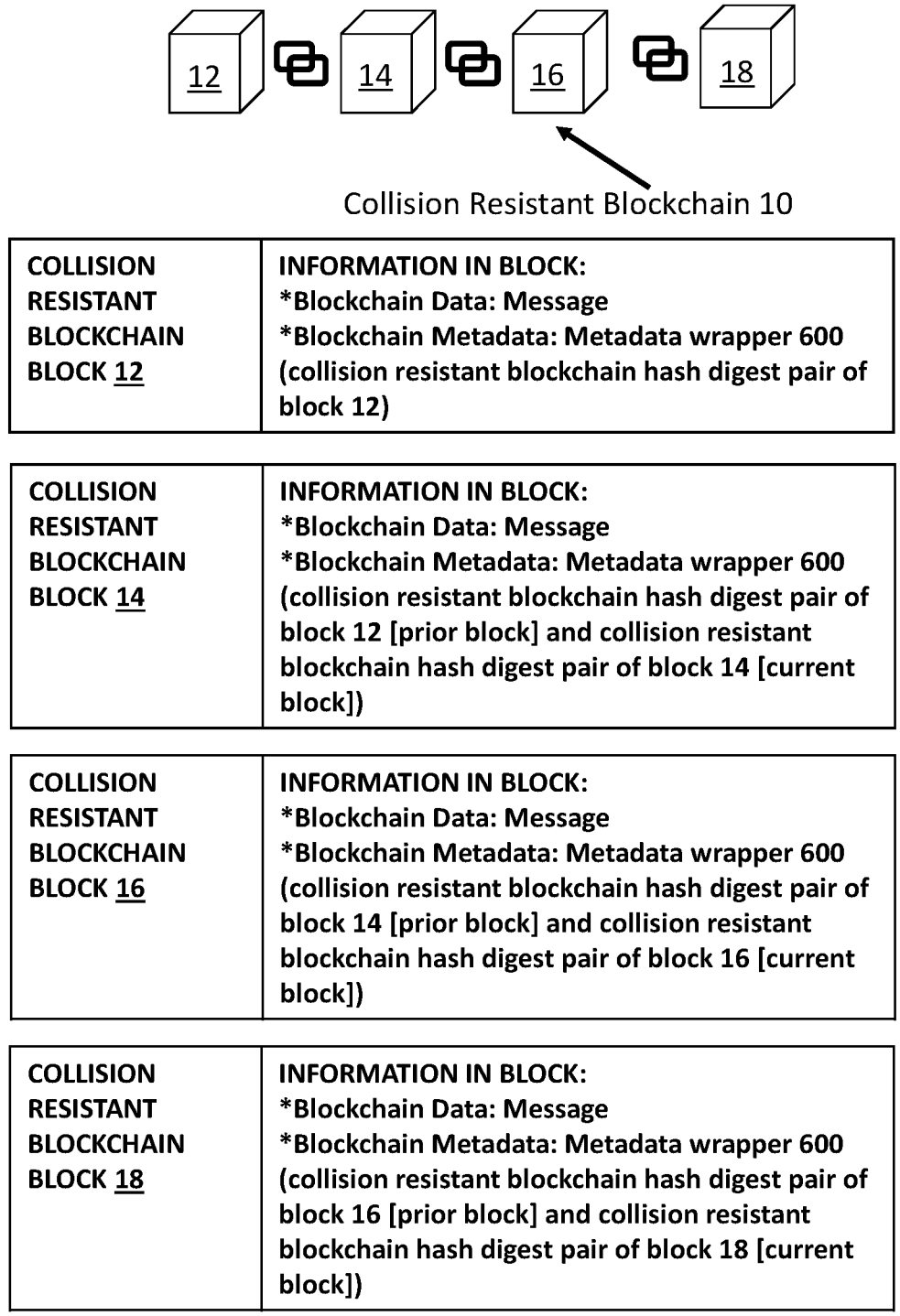

FIG. 5G illustrates a collision resistant blockchain 10 where each block 12, 14, 16, and 18 in the collision resistant blockchain is chained together by a collision resistant blockchain hash digest pair as shown in FIGS. 5C and 5D. In this exemplary depiction, collision resistant blockchain 10 includes four collision resistant blockchain blocks 12, 14, 16, and 18, commonly referred to as blocks. Block 12 is depicted as being the genesis block, the first block in blockchain 10. Blocks, 12, 14, 16, and 18 are interlinked by collision blockchain hash digest pairs forming them into collision resistant blockchain 10. Collision resistant blockchain block 12 includes a blockchain data structure 600C or 600D as shown in FIGS. 5C and 5D. Collision resistant blockchain block 12 includes a digital message as blockchained data. Blockchained metadata includes metadata wrapper 600. As block 12 is the genesis block, block 12 has a collision resistant blockchain hash digest pair based on block 12. However, for block 12, there is no collision resistant blockchain hash digest pair carried over from the previous block as there is no previous block due to block 12 being the genesis block. Thus, for block 12, metadata 602H is empty. Collision resistant blockchain block 14 includes a blockchain data structure 600C or 600D as shown in FIGS. 5C and 5D. Collision resistant blockchain block 14 includes a digital message as blockchained data. Blockchained metadata includes metadata wrapper 600. For block 14, metadata wrapper 600 includes a collision resistant blockchain hash digest pair based on block 14 as well as the collision resistant blockchain hash digest pair carried over from the previous block, block 12. Collision resistant blockchain block 16 includes a blockchain data structure 600C or 600D as shown in FIGS. 5C and 5D. Collision resistant blockchain block 16 includes a digital message as blockchained data. Blockchained metadata includes metadata wrapper 600. For block 16, metadata wrapper 600 includes a collision resistant blockchain hash digest pair based on block 16 as well as the collision resistant blockchain hash digest pair carried over from the previous block, block 14. Collision resistant blockchain block 18 includes a blockchain data structure 600C or 600D as shown in FIGS. 5C and 5D. Collision resistant blockchain block 18 includes a digital message as blockchained data. Blockchained metadata includes metadata wrapper 600. For block 18, metadata wrapper 600 includes a collision resistant blockchain hash digest pair based on block 18 as well as the collision resistant blockchain hash digest pair carried over from the previous block, block 16. Thus, blocks 12, 14, 16, and 18 form collision resistant blockchain 10. As collision resistant blockchain 10 has each block include a collision resistant blockchain hash digest pair formed of a forward blockchain hash digest and a reverse blockchain hash digest, collision resistant blockchain 10 is less susceptible to collisions that may occur with MD5 when using forward blockchain hash digests only.

FIG. 5H illustrates a collision resistant blockchain 20 where each block 22, 24, 26, and 28 in the collision resistant blockchain 20 is chained together by a collision resistant blockchain hash digest set as shown in FIGS. 5E and 5F. In this exemplary depiction, collision resistant blockchain 20 includes four collision resistant blockchain blocks 22, 24, 26, and 28, commonly referred to as blocks. Block 22 is depicted as being the genesis block, the first block in blockchain 20. Blocks, 22, 24, 26, and 28 are interlinked by collision blockchain hash digest sets forming them into collision resistant blockchain 20. Collision resistant blockchain block 22 includes a blockchain data structure 600E or 600F as shown in FIGS. 5E and 5F. Collision resistant blockchain block 22 includes a digital message as blockchained data. Blockchained metadata includes metadata wrapper 600. As block 22 is the genesis block, block 22 has a collision resistant blockchain hash digest set based on block 22. However, for block 22, there is no collision resistant blockchain hash digest set carried over from the previous block as there is no previous block due to block 22 being the genesis block. Thus, for block 22, metadata 602H is empty. Collision resistant blockchain block 24 includes a blockchain data structure 600E or 600F as shown in FIGS. 5E and 5F. Collision resistant blockchain block 24 includes a digital message as blockchained data. Blockchained metadata includes metadata wrapper 600. For block 24, metadata wrapper 600 includes a collision resistant blockchain hash digest set based on block 24 as well as the collision resistant blockchain hash digest set carried over from the previous block, block 22. Collision resistant blockchain block 26 includes a blockchain data structure 600E or 600F as shown in FIGS. 5E and 5F. Collision resistant blockchain block 26 includes a digital message as blockchained data. Blockchained metadata includes metadata wrapper 600. For block 26, metadata wrapper 600 includes a collision resistant blockchain hash digest set based on block 26 as well as the collision resistant blockchain hash digest set carried over from the previous block, block 24. Collision resistant blockchain block 28 includes a blockchain data structure 600E or 600F as shown in FIGS. 5E and 5F. Collision resistant blockchain block 28 includes a digital message as blockchained data. Blockchained metadata includes metadata wrapper 600. For block 28, metadata wrapper 600 includes a collision resistant blockchain hash digest set based on block 28 as well as the collision resistant blockchain hash digest set carried over from the previous block, block 26. Thus, blocks 22, 24, 26, and 28 form collision resistant blockchain 20. As collision resistant blockchain 20 has each block include a collision resistant blockchain hash digest set formed of a forward blockchain hash digest and a pair of reverse blockchain hash digests formed with different data reversal techniques, collision resistant blockchain 20 is less susceptible to collisions that may occur with MD5 when using forward blockchain hash digests only.

Figure 6A:
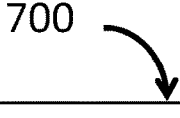

FIGS. 6A-G demonstrates a second collision between two different 64-byte messages with MD5 hashing the message front-to-back and how no corresponding collision occurs when those two different messages are hashed with MD5 back-to-front. FIG. 6A illustrates prior art first and second 64-Byte messages with identical MD5 blockchain hash digests, thereby providing a second example of a hash digest collision. Prior art FIG. 6A shows table 700, with descriptor column 701 and hexadecimal column 702. Table 700 shows a first 64-Byte message M3 "703" with contents 704 and a second 64-Byte message M4 "705" with contents 706, and each message has the same MD5 blockchain hash digest 707 with contents 708. Thus, we have a second example of a collision. Note that messages 704 and 706 are different. The bytes that are different between message M3 and M4 are highlighted in bold and underlined, to aid in seeing the different content of the two messages. There are only 2 bytes different in each message, and although only one nibble is different in each byte, it is easier to see the entire byte than only the changed nibble. Messages M3 and M4 were published in "Single-block collision attack on MD5," by Marc Stevens, Cryptology Group, CWI[SEP] P.O. Box 94079, NL-1090 GB Amsterdam, The Netherlands, Jan. 29, 2012. Thus, we have a second prior art example of a collision where two messages with different content have the same MD5 hash digest. The first prior art example was in FIG. 1A.

FIG. 6B illustrates three MD5 blockchain hash digests for a first 64-Byte message, one front-to-back (forward), one back-to-front (reverse) by hexadecimal number, and one back-to-front (reverse) by byte. FIG. 6B shows table 720, with descriptor column 721 and hexadecimal column 722. Table 720 shows first 64-Byte Message M3 703 with contents 704 which has MD5 blockchain hash digest 707 with contents 708. Digest 707 is the forward blockchain hash digest of message 703. Table 720 also has the hexadecimal-reverse of Message M3, called M3R 723, which has the contents shown in 724. The blockchain MD5 hash digest of M3R is 725 with contents 726, which the hexadecimal-reverse blockchain hash digest of message M3 703. Table 720 also has the byte-reverse of Message M3, called M3B 727, which has the contents shown in 728. The blockchain MD5 hash digest of M3B is 729 with contents 730, which is byte-reverse blockchain hash digest of message M3 703. It is valuable to note that the forward blockchain hash digest 708, hexadecimal-reverse blockchain hash digest 726, and byte-reverse blockchain hash digest 730 all have different values.

FIG. 6C illustrates three MD5 blockchain hash digests for a second 64-Byte message, one front-to-back (forward), one back-to-front (reverse) by hexadecimal number, and one back-to-front (reverse) by byte. FIG. 6C shows table 740, with descriptor column 741 and hexadecimal column 742. Table 740 shows second 64-Byte Message M4 "705" with contents 706, which has MD5 blockchain hash digest 707 with contents 708, which is the forward blockchain hash digest. Table 740 also has the hexadecimal-reverse of Message M4, called M4R "743," which has the contents shown in 744. The blockchain MD5 hash digest of M4R is "745" with content 746, which is the hexadecimal reverse blockchain hash digest. Table 740 also has the byte-reverse of Message M4, called M4B "747," which has the contents shown in 748. The blockchain MD5 hash digest of M4B is "749" with contents 750, which is the byte-reverse blockchain hash digest. It is valuable to note that forward blockchain hash digest 708, hexadecimal-reverse blockchain hash digest 746, and byte-reverse blockchain hash digest 750 all have different values.

FIG. 6D illustrates a PERL program for converting ASCII characters to hexadecimal and then to binary and then calculating MD5 hash digests for a first 64-Byte message: once front-to-back (forward), once back-to-front (reverse) by hexadecimal number, and once back-to-front (reverse) by byte. FIG. 6E illustrates a PERL program for converting ASCII characters to hexadecimal and then to binary and then calculating MD5 hash digests for a second 64-Byte message: once front-to-back (forward), once back-to-front (reverse) by hexadecimal number, and once back-to-front (reverse) by byte. FIG. 6D is the program M3.pl referred to in step 308 of FIG. 3A, expanded to 308M3, for messages M3, M3R, and M3B from FIG. 6B. FIG. 6E is the program M4.pl, also referred to in step 308 of FIG. 3A, expanded to 308M4, for messages M4, M4R, and M4B. In FIG. 6D, three sets of instructions are used to create binary files for message M3, hexadecimal-reversed message M3R, and byte-reversed message M3B, namely M3.bin, M3R.bin, M3B.bin. Also, in FIG. 6E, three sets of instructions are used to create binary files for message M4, hexadecimal-reversed message M4R, and byte-reversed message M4B, namely M4.bin, M4R.bin, and M4B.bin. At this point in FIGS. 6D and 6E, the hash digest may be calculated two ways, as a check. One way is to use the binary files M3.bin, M3R.bin, M3B.bin, as well as M4.bin, M4R.bin, and M4B.bin as manual input to http://onlinemd5.com to calculate the desired hash digests. A second way is the PERL statement, use Digest::MD5 qw(md5_hex), to initialize the MD5 hash process, $hash=md5_hex($hex), to calculate the hash digests of the contents of message M3 in hexadecimal form (not ASCII), then printf ("md5_M3:% s\ n",$hash), to print the hash digest, M3 in this case, to the PERL workspace.

Figure 6F:
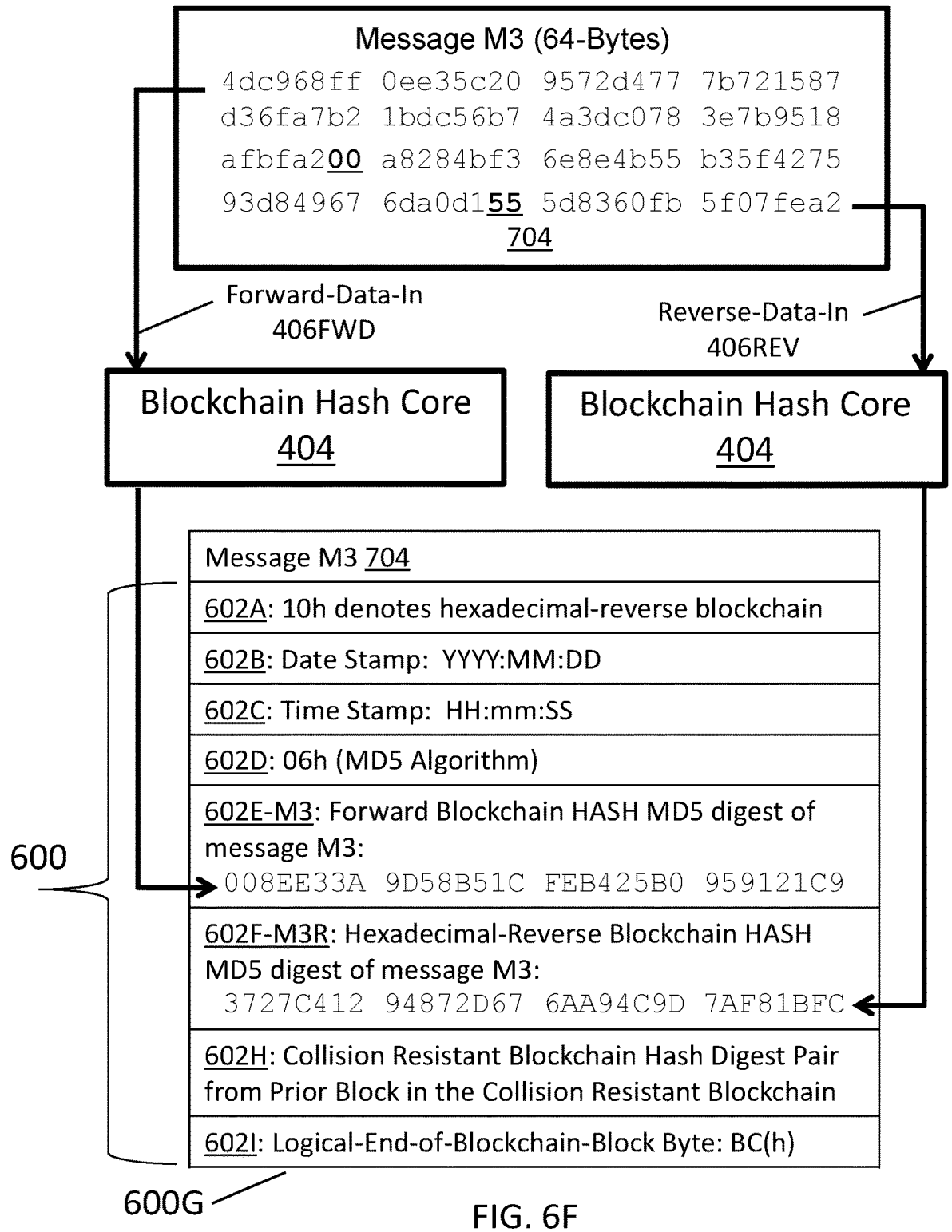

FIG. 6F illustrates an exemplary data structure 600G for a blockchain block that includes message data 704 and a metadata wrapper 600 for a first 64-Byte message 704 with a forward blockchain hash MD5 digest 602E-M3 and a hexadecimal-reverse blockchain hash digest 602F-M3R. Message 704 is showing being processed by a pair of blockchain hash cores 404, which operate in parallel. Blockchain hash core 404 on the left gets input Forward-Data-In "406FWD" where Message M3 704 is read from front-to-back. Blockchain hash core 404 on the right gets input Reverse-Data-In "406REV" where Message M3 is read from back-to-front. 406FWD is input to one blockchain hash core 404 and, in parallel, 406REV is input to a second blockchain hash core 404. The forward blockchain hash MD5 digest of the Forward-Data-In of Message M3 is stored as 602E-M3. The hexadecimal-reverse blockchain hash MD5 digest of MD3 is stored in 602F-M3R. In this manner using multiple hash cores 404 in parallel simultaneously, it is possible to generate the forward and hexadecimal-reverse blockchain hash digests without additional computational time. Data structure 600G provides an exemplary blockchain data structure for an individual blockchain block of a collision resistant blockchain. Data structure 600G begins with Message M3 704 as data. Next, data structure 600G includes metadata wrapper 600. In metadata wrapper 600, the hexadecimal contents of Message M3 704 are provided first. Next, metadata 602A is provided with a value of 10h, indicating the use of a single reverse blockchain, namely the hexadecimal-reverse blockchain. Metadata 602B provides the Date Stamp YYYY:MM:DD and metadata 602C provides the Time Stamp HH:mm:SS follow. Metadata 602D has a value of 06h to denote the use of the MD5 hash algorithm. The forward blockchain hash MD5 digest of the Forward-Data-In of Message M3 is stored as 602E-M3. The hexadecimal-reverse blockchain hash MD5 digest of MD3 is stored in 602F-M3R. Metadata 602H provides the collision resistant blockchain hash digest pair from the prior block in the collision resistant blockchain to chain the two blocks together. Metadata wrapper 600 and block data structure 600G concludes with logical-end-of-blockchain byte BC(h), 602I.

Figure 6G:
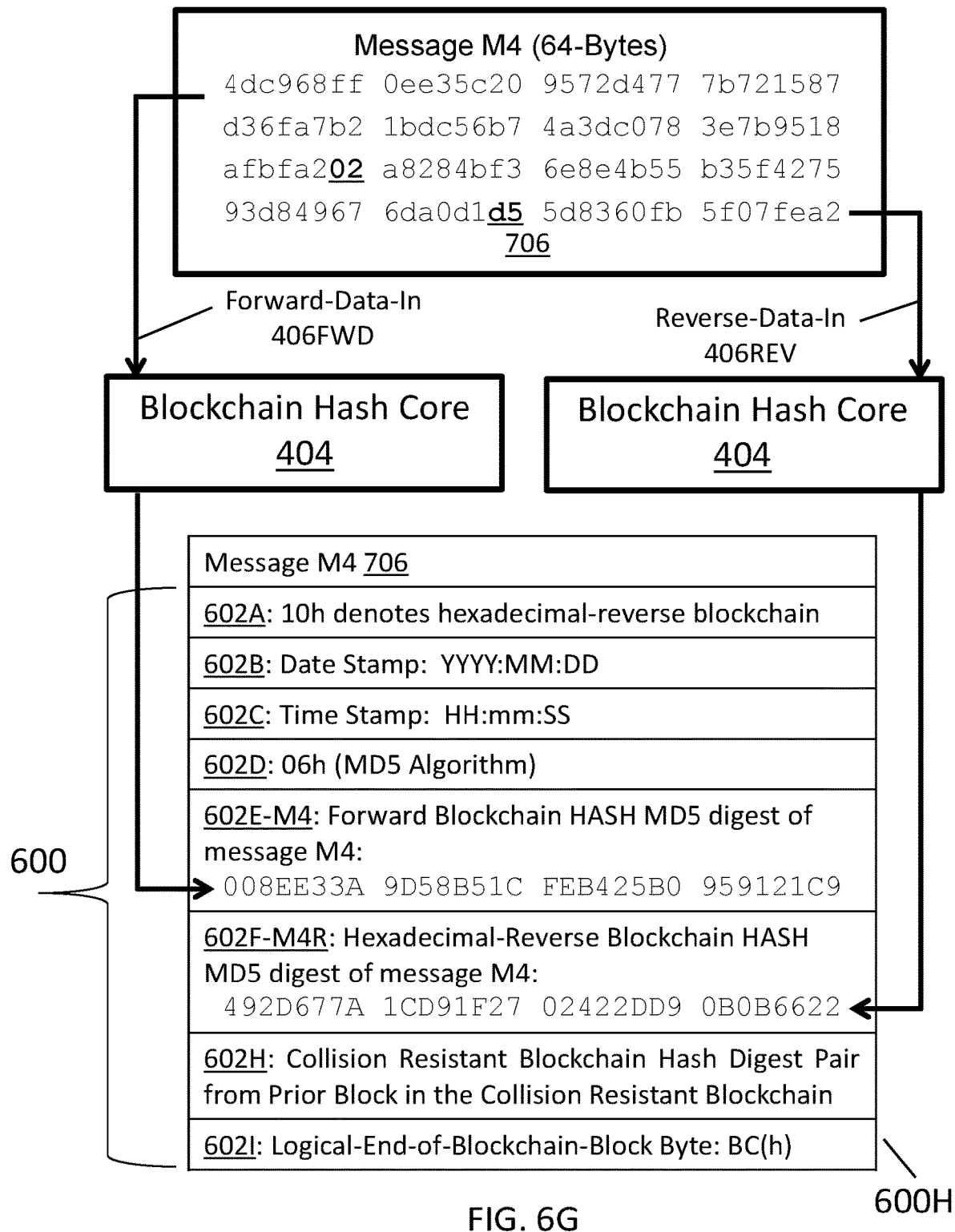

FIG. 6G illustrates an exemplary data structure 600H for a blockchain block that includes message data 706 and a metadata wrapper 600 for a second 64-Byte message with a forward blockchain hash MD5 digest 602E-M4 and a hexadecimal-reverse blockchain hash digest 602F-M4R. Data structure 600H is shown being constructed from a message 706 that is being processed by a pair of parallel blockchain hash cores 404. Blockchain hash core 404 on the left gets input Forward-Data-In "406FWD" where Message M4 706 is read from front-to-back. Blockchain hash core 404 on the right gets input Reverse-Data-In "406REV" where Message M4 706 is read from back-to-front. 406FWD is input to one blockchain hash core 404 and, in parallel, 406REV is input to a second blockchain hash core 404. The forward blockchain hash MD5 digest of the Forward-Data-In of Message M6 is stored as 602E-M4. The hexadecimal-reverse blockchain hash MD5 digest of MD4 is stored in 602F-M4R. In this manner using multiple hash cores 404 in parallel simultaneously, it is possible to generate the forward and hexadecimal-reverse blockchain hash digests without additional computational time. Data structure 600G provides an exemplary blockchain data structure for an individual blockchain block of a collision resistant blockchain Data structure 600G begins with the hexadecimal contents of Message M4 706. Metadata wrapper 600 is then appended to message data 706. Metadata wrapper 600 includes metadata 602A, which has a value of 10h, indicating the use of a single reverse blockchain, namely the hexadecimal-reverse blockchain. Metadata 602B, the Date Stamp YYYY:MM:DD and metadata 602C Time Stamp HH:mm:SS follow next in metadata wrapper 600. Metadata 602D is then provided and has a value of 06h to denote the use of the MD5 hash algorithm. Metadata 602H provides the collision resistant blockchain hash digest pair from the prior block in the collision resistant blockchain to chain the two blocks together. Data structure 600G concludes with logical-end-of-blockchain byte BC(h), 602I.

Comparing wrappers 600G and 600H indicates that Messages M3 and M4 are now distinguished from one another due to the hexadecimal-reverse blockchain hash digests 602F-M3R and 602F-M4R. These hexadecimal-reverse blockchain hash digests do not replace forward blockchain hash digests 602E-M3 and 602E-M4. Instead, the hexadecimal-reverse blockchain hash digests 602F-M3R and 602F-M4R act in combination with forward blockchain hash digests 602E-M3 and 602E-M4 to distinguish messages M3 and M4 from one another, thus avoiding the collision identified in FIG. 7A. Forward blockchain hash digests 602E-M3 and hexadecimal-reverse blockchain hash digest 602F-M3R form a collision resistant blockchain hash digest pair. Forward blockchain hash digests 602E-M4 and hexadecimal-reverse blockchain hash digest 602F-M4R form another collision resistant blockchain hash digest pair. Together, there is not collision between the collision resistant blockchain hash digest pairs for M3 and M4 because there is not a simultaneous collision between both the forward hash digest and the hexidecimal-reverse hash digest of the collision resistant blockchain hash digest pair. A collision only occurs with collision resistant blockchain hash digest pairs when there is a simultaneous collision between both the forward hash digest and the hexidecimal-reverse hash digest. In this case, while there is a collision between the forward hash digests of M3 and M4, there is not a corresponding simultaneously collision between the hexidecimal-reverse hash digests of M3 and M4. Thus, the use of the collision resistant blockchain hash digest pair avoided the collision while still making use of the MD5 hash digest algorithm.

Figure 6H:
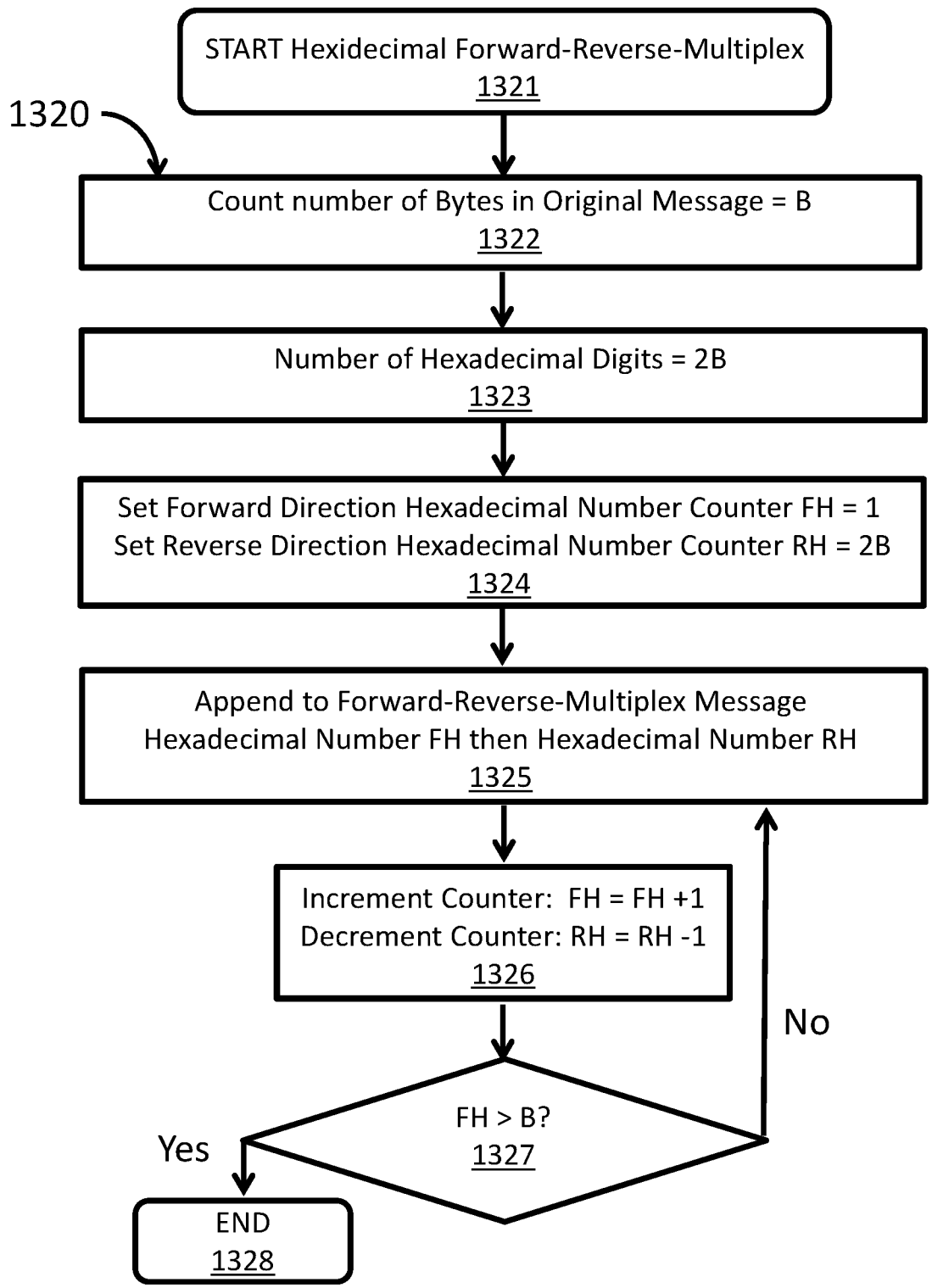

FIGS. 6H-6K illustrate the creation of reverse blockchain hash digests made using a hexadecimal forward-reverse multiplex operation. FIG. 6H depicts a flow chart 1320 illustrating the generation of a reverse hash digest using a hexadecimal forward-reverse-multiplex process. A hexadecimal forward-reverse-multiplex hash digest is a hash digest that is formed by multiplexing the front and back hexadecimal numbers of a message to generate a forward-reverse-multiplex version of the message that is then processed with a hash algorithm to generate the hexadecimal forward-reverse-multiplex hash digest. In essence, it is possible to create hash digests on a message to avoid collisions by rearranging the message in different known configurations to generate alternative hash digests that compliment a conventional forward hash digest to compare two messages and avoid collisions. Rearranging the message by a multiplex process shown in process 1320 is another such way of creating an alternative hash digest that compliments that forward hash digest, analogous to bit-reverse, byte-reverse, sector reverse, and hexadecimal reverse. The process for creating a hexadecimal forward-reverse-multiplex hash digest is started in step 1321. In step 1322, the process counts the number of bytes B in the original message. In step 1323, the process computes the number of hexadecimal digits to the message as being 2B, twice the number of bytes. In step 1324, the process sets the forward direction hexadecimal counter FH to 1 and sets the reverse direction hexadecimal country RH to 2B. In step 1326, the process forms a new version of the original message, a forward-reverse-multiplex message, by a hexadecimal forward-reverse multiplex operation by first appending hexadecimal number FH to the new version and then appending hexadecimal number RH to the new version. In step 1326, the process increments counter FH to FH+1 and decrements counter RH to RH−1. In step 1327, the process determines if FH is greater than B, denoting that the end of the hexadecimal forward-reverse multiplex operation. If FH is not greater than B, then the process returns to step 1325 to continue performing the hexadecimal forward-reverse multiplex operation. If the process has reached a point here FH is greater than B, the the hexadecimal forward-reverse multiplex operation ENDS in step 1328.

Figure 6J:
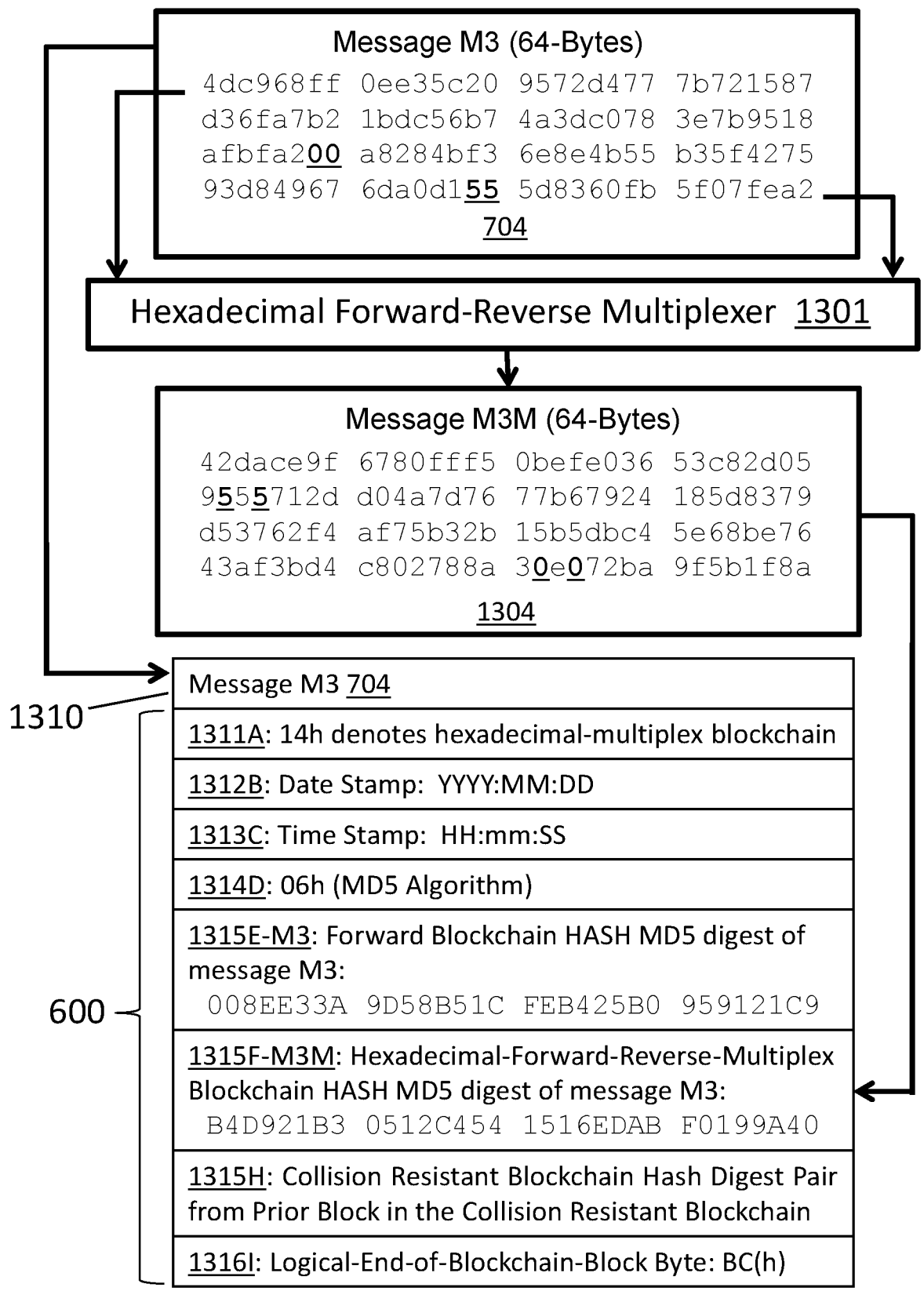
Figure 6K:
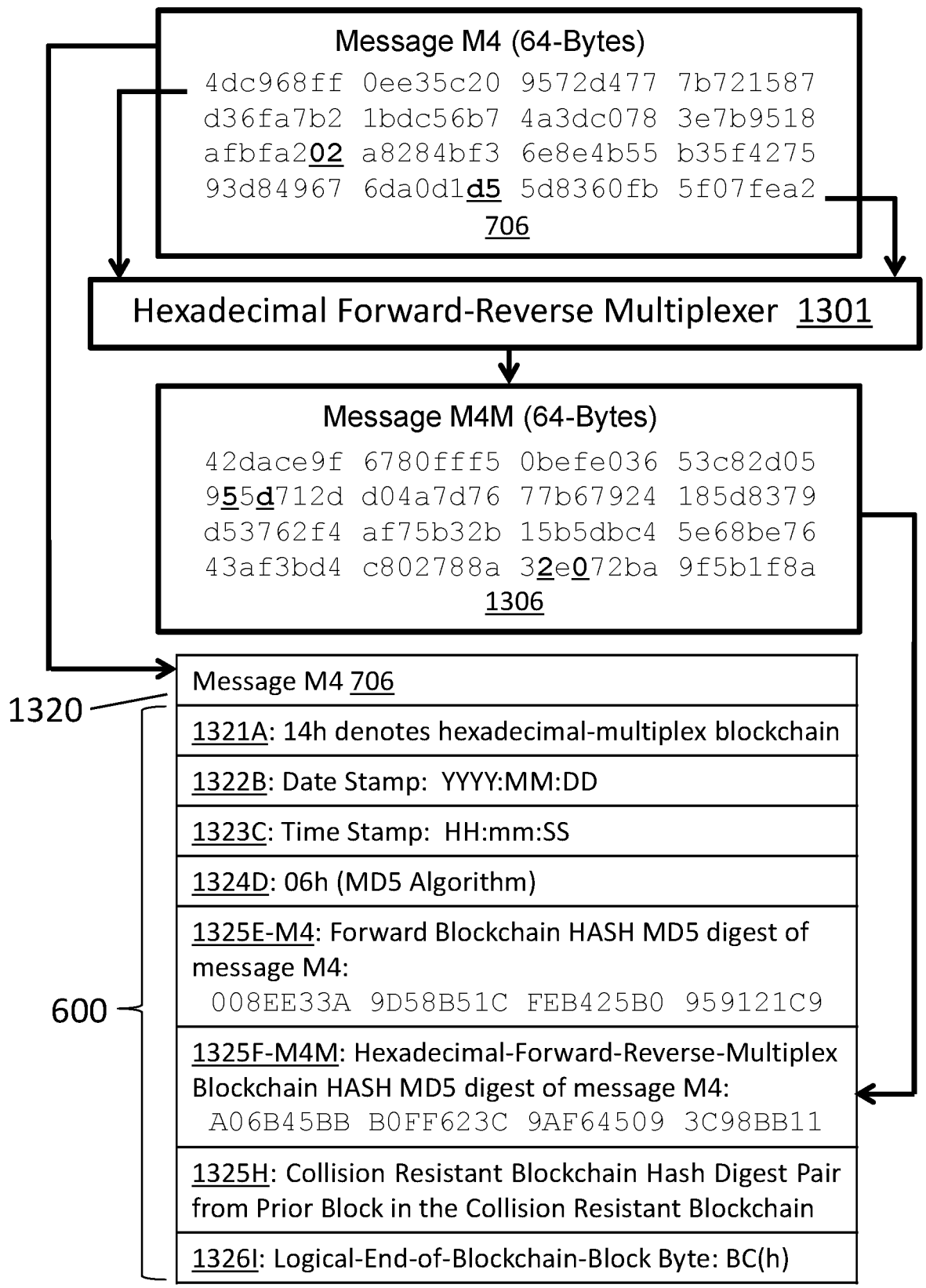

FIG. 6I illustrates a PERL program Multiplex.pl 308Multiplex for creating a hash digest by a hexadecimal forward-reverse-multiplex process shown in flowchart 1320. Multiplex.pl 308Multiplex is the program shown in step 308 of FIG. 3A depicting the generation of hash digests. In program 308Multiplex, the hexadecimal forward-reverse multiplex hash digests above are calculated only one way, for brevity, and these digests are shown in FIGS. 6J and 6K as 1315F-M3M and 1325F-M4M respectively. This program 308Multiplex shows that the previous calculations of the *.bin files was unnecessary, although these previous *.bin files served as a useful check of the hash digest (by calculating the digests two ways, once like above and once by using the *.bin files and http://onlinemd5.com). Program 308Multiplex multiplex.pl was used to calculate the hexadecimal forward-reverse multiplex hash digests for messages M3 704 and M4 706 shown in FIGS. 6J and 6K.

FIG. 6J depicts an exemplary data structure 1310 for a blockchain block that includes message data M3 704 and a metadata wrapper 600 for a first 64-Byte message M3 704 with a forward blockchain hash MD5 digest 1315E-M3 and a hexadecimal forward-reverse-multiplex blockchain hash digest 1315F-M3M. Message M3 704 is processed using an MD5 hash algorithm to generate forward blockchain hash MD5 digest 1315E-M3. Message M3 704 is then also rearranged by a hexadecimal forward-reverse multiplex operation depicted in flowchart 1320 to generate the hexadecimal forward-reverse-multiplex message M3M 1304. Message M3M 1304 is then processed with an MD5 hash algorithm to generate hexadecimal forward-reverse-multiplex blockchain hash digest 1315F-M3M. Exemplary data structure 1310 for a blockchain block is formed by first appending the original hexadecimal message M3 704. Exemplary data structure 1310 for a blockchain block is further formed by appending metadata wrapper 600 to the original message M3 704. Metadata wrapper 600 includes metadata 1311A with the value of 14h denoting the use of a hexadecimal forward-reverse-multiplex blockchain hash digest. Metadata 1312B includes the data stamp. Metadata 1313C includes the time stamp. Metadata 1314D includes the value of 06h to designate the use of the MD5 hash algorithm. Metadata 1315E-M3 is the forward blockchain hash MD5 digest of message M3 704. Metadata 1315F-M3M is the hexadecimal forward-reverse-multiplex blockchain hash digest of message M3M 1304. The blockchain block 1310 concludes with logical end of blockchain block byte 1316I having the value of BC(h).

FIG. 6K illustrates an exemplary data structure 1320 for a blockchain block that includes message data M4 706 and a metadata wrapper 600 for a second 64-Byte message M4 706 with a forward blockchain hash MD5 digest 1325E-M4 and a hexadecimal forward-reverse-multiplex blockchain hash digest 1325F-M4M. Message M4 706 is processed using an MD5 hash algorithm to generate forward blockchain hash MD5 digest 1325E-M4. Message M4 706 is then also rearranged by a hexadecimal forward-reverse multiplex operation depicted in flowchart 1320 to generate the hexadecimal forward-reverse-multiplex message M4M 1306. Message M4M 1306 is then processed with an MD5 hash algorithm to generate hexadecimal forward-reverse-multiplex blockchain hash digest 1325F-M4M. Exemplary data structure 1320 for a blockchain block is formed by first appending the original hexadecimal message M4 706. Exemplary data structure 1320 for a blockchain block is further formed by appending metadata wrapper 600 to the original message M4 706. Metadata wrapper 600 includes metadata 1321A with the value of 14h denoting the use of a hexadecimal forward-reverse-multiplex blockchain hash digest. Metadata 1322B includes the data stamp. Metadata 1323C includes the time stamp. Metadata 1324D includes the value of 06h to designate the use of the MD5 hash algorithm. Metadata 1325E-M4 is the forward blockchain hash MD5 digest of message M4 706. Metadata 1325F-M4M is the hexadecimal forward-reverse-multiplex blockchain hash digest of message M4M 1306. The blockchain block 1310 concludes with logical end of blockchain block byte 1326I having the value of BC(h).

Figure 7E:
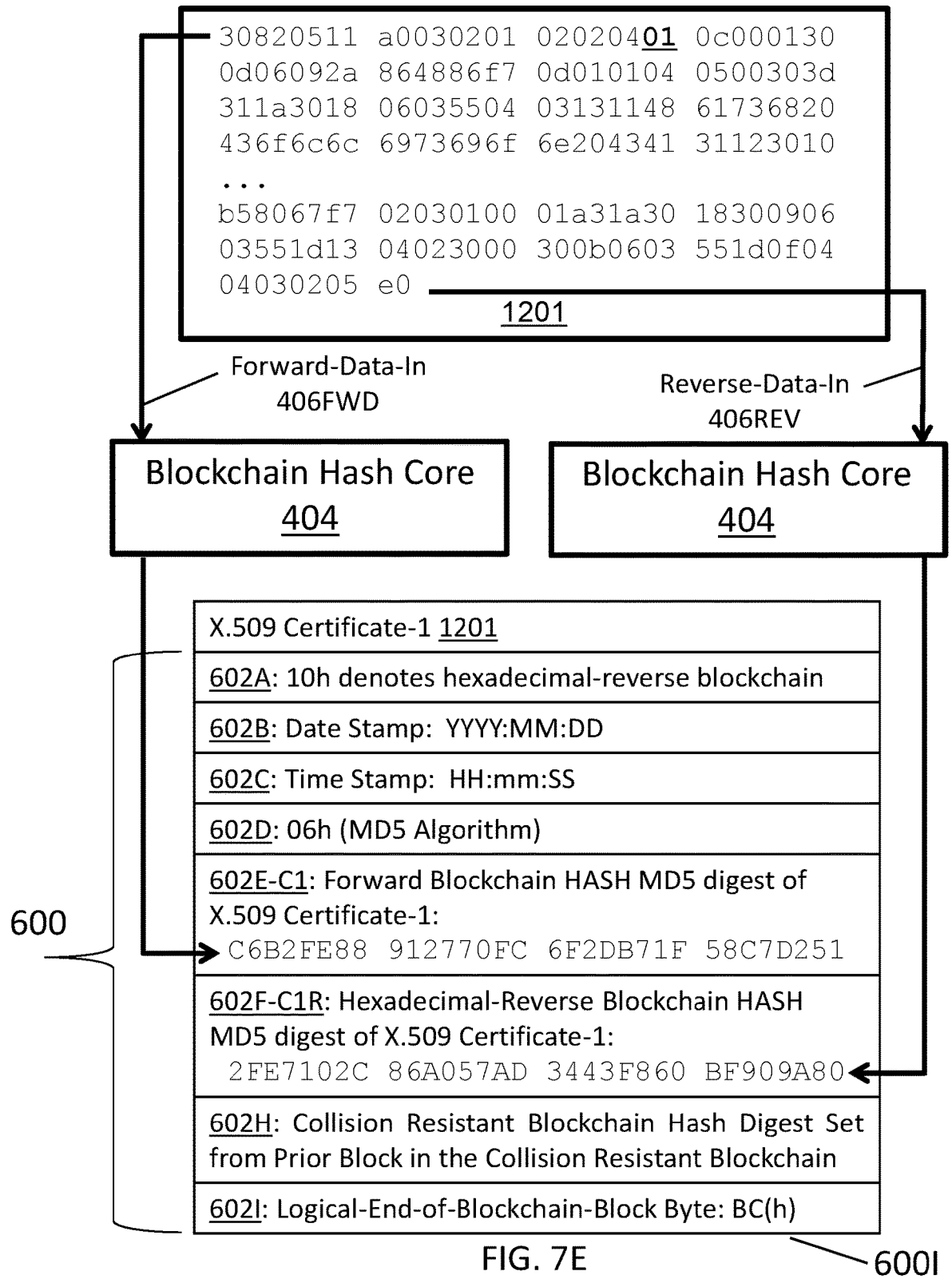

FIGS. 7A-F demonstrates a third collision between two different 1301-Byte messages, a pair of X.509 certificates, with MD5 hashing the message front-to-back and how no corresponding collision occurs when those two different messages are hashed with MD5 back-to-front. FIG. 7A shows a first 1301-Byte X.509 Certificate-1 1201 known in the prior art. FIG. 7B shows a second 1301-Byte X.509 Certificate-2 1202 also known in the prior art. Each of these X.509 Certificate has the same MD5 blockchain hash digest when MD5 is applied to the two certificates message data when read in the forward direction, thereby resulting in a collision. These colliding forward hash digests are shown as 602E-C1, FIG. 7E, and 602E-C2, FIG. 7F. Thus, these two certificates provide a third example of a collision. Sixty-two bytes are different in each of these two X.509 certificates shown in FIGS. 7A and 7B. Unlike FIGS. 1A and 6A, entire bytes may differ in these two X.509 certificates shown in FIGS. 7A and 7B, or just a nibble therein.

In cryptography, X.509 is a standard defining the format of public key certificates. X.509 certificates are used in many Internet protocols. including; TLS/SSL which is the basis for HTTPS, the secure protocol for browsing the web. They are also used in offline applications, like electronic signatures. An X.509 certificate contains a public key and an identity (a hostname, or an organization, or an individual), and is either signed by a certificate authority or self-signed. When a certificate is signed by a trusted certificate authority, or validated by other means, someone holding that certificate can rely on the public key it contains to establish secure communications with another party, or validate documents digitally signed by the corresponding private key. X.509 also defines certificate revocation lists, which are a means to distribute information about certificates that have been deemed invalid by a signing authority, as well as a certification path validation algorithm, which allows for certificates to be signed by intermediate CA (certificate authority) certificates, which are, in turn, signed by other certificates, eventually reaching a trust anchor. X.509 is defined by the International Telecommunication Union's (ITC) Standardization sector (ITU-T), and is based on ASN.1, another ITU-T standard, X.509 is documented in standard "X.509: Information technology—Open Systems Interconnection—The Directory: Public-key and attribute certificate frameworks," https://www.itu.int/rec/T-REC-X.509, which is hereby incorporated by reference in its entirety. X.509 is also documented in RFC (Request for Comments) 5280, "Internet X.509 Public Key Infrastructure Certificate and Certificate Revocation List (CRL) Profile," https://tools.ietf.org/html/rfc5280, which is hereby incorporated by reference in its entirety.

As described in "Chosen-prefix Collisions for MD5 and Colliding X.509 Certificates for Different Identities," by Marc Stevens, Arjen Lenstra, and Benne de Weger, first 1301-Byte X.509 Certificate-1 1201 and second 1301-Byte X.509 Certificate-2 1202 are special in that these two certificates have different public keys and different distinguished name fields. The problem is that one of the certificates could be used to make malware look acceptable to a computer because the MD5 hash digest is identical with another certificate, such as a trust anchor. The collision therefore is a substantial security risk.

FIG. 7C illustrates a PERL program 308X509-C1 for converting ASCII characters to hexadecimal and then to binary and then calculating MD5 hash digests for a first 1301-Byte message 1201: once front-to-back (forward), and once back-to-front (reverse) by hexadecimal number. FIG. 7D illustrates a PERL program 308X509-C2 for converting ASCII characters to hexadecimal and then to binary and then calculating MD5 hash digests for a second 1301-Byte message 1202: once front-to-back (forward), and once back-to-front (reverse) by hexadecimal number. Perl programs 308X509-C1, FIG. 7C, and Perl program 308C2, FIG. 7D are used to calculate the hexadecimal-reverse hash digest 602F-C1R, FIG. 7E, and 602F-C2R, FIG. 7F. FIG. 7C is the program X509-C1.pl referred to in step 308 of FIG. 3A, expanded to 308X509-C1, for messages C1 and C1R, FIG. 7E. FIG. 7D is the program X509-C2.pl, also referred to in step 308 of FIG. 3A, expanded to 308X509-C2, for messages C2 and C2R, FIG. 7F. In FIG. 7C, two sets of instructions are used to create binary files for message C1 and hexadecimal-reversed message C1R, namely C1.bin and C1R.bin. Also, in FIG. 7D, two sets of instructions are used to create binary files for message C2 and hexadecimal-reversed message C2R, namely C2.bin and C2R.bin. At this point in FIGS. 7C and 7D, the hash digest may be calculated two ways, as a check. One way is to use the binary files C1.bin and C1R.bin, as well as C2.bin and C2R.bin, as manual input to http://onlinemd5.com to calculate the desired hash digests. A second way is the PERL statement, use Digest::MD5 qw(md5_hex), to initialize the MD5 hash process, $hash=md5_hex($hex), to calculate the hash digests of the contents of message C1 in hexadecimal form (not ASCII), then printf ("md5_C1:% s\n",$hash), to print the hash digest, C1 in this case, to the PERL workspace.

FIG. 7E illustrates an exemplary data structure 600I for a blockchain block that includes message data 1201 and a metadata wrapper 600 for a first 1301-Byte message 1201 with a forward blockchain hash MD5 digest 602E-C1 and a hexadecimal-reverse blockchain hash digest 602F-C1R. Data structure 600I is shown being constructed from a message 1201 that is being processed by a pair of parallel blockchain hash cores 404. Blockchain hash core 404 on the left gets input Forward-Data-In "406FWD" where Message 1201 is read from front-to-back. Blockchain hash core 404 on the right gets input Reverse-Data-In "406REV" where Message 1201 is read from back-to-front. 406FWD is input to one blockchain hash core 404 and, in parallel, 406REV is input to a second blockchain hash core 404. The forward blockchain hash MD5 digest of the Forward-Data-In of Message 1201 is stored as 602E-C1. The hexadecimal-reverse blockchain hash MD5 digest of 1201 is stored in 602F-C1R. In this manner using multiple hash cores 404 in parallel simultaneously, it is possible to generate the forward and hexadecimal-reverse blockchain hash digests without additional computational time. Data structure 600I provides an exemplary blockchain data structure for an individual blockchain block of a collision resistant blockchain Data structure 600I begins with X.509 Certificate "C1" 1201. Message 1201 is appended with metadata wrapper 600. Metadata wrapper includes metadata 602A, which is shown having a value of 10h, indicating the use of a single reverse blockchain, namely the hexadecimal-reverse blockchain. Metadata 602B, the Date Stamp YYYY:MM:DD and metadata 602C Time Stamp HH:mm:SS follow. Metadata 602D has a value of 06h to denote the use of the MD5 hash algorithm. The forward blockchain hash MD5 digest of the Forward-Data-In of Certificate "C1" 1201 is stored as 602E-C1. The hexadecimal-reverse blockchain hash MD5 digest of Certificate "C1" 1201 is stored in 602F-C1R. Metadata 602H provides the collision resistant blockchain hash digest pair from the prior block in the collision resistant blockchain to chain the two blocks together. Metadata wrapper 600I concludes with logical-end-of-blockchain byte BC(h), 602I.

Figure 7F:
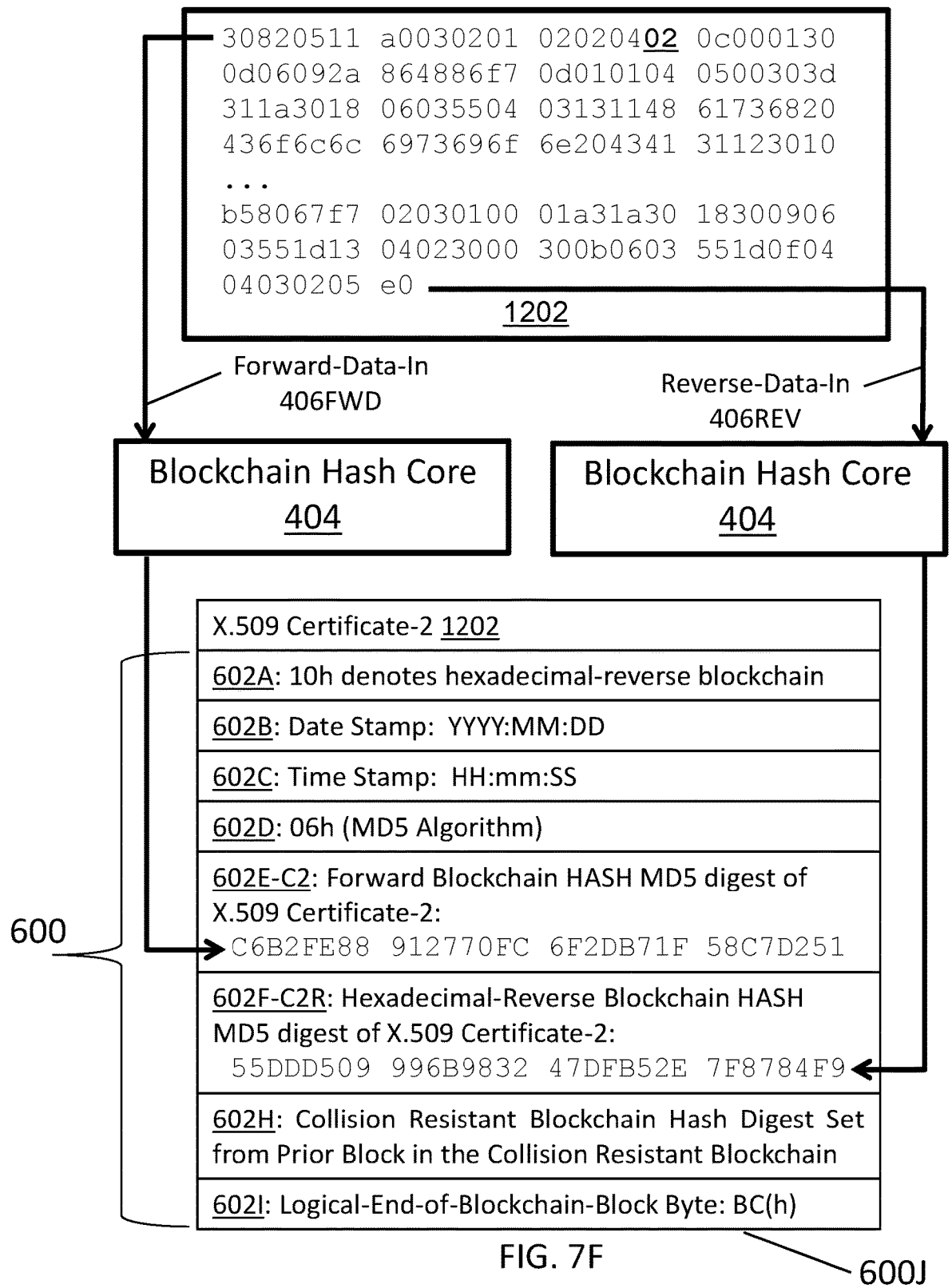

FIG. 7F illustrates an exemplary data structure 600J for a blockchain block that includes message data 1202 and a metadata wrapper 600 for a second 1301-Byte message 1202 with a forward blockchain hash MD5 digest 602E-C2 and a hexadecimal-reverse blockchain hash digest 602F-C2R. Data structure 600J is shown being constructed from a message 1202 that is being processed by a pair of parallel blockchain hash cores 404. Blockchain hash core 404 on the left gets input Forward-Data-In "406FWD" where Message 1202 is read from front-to-back. Blockchain hash core 404 on the right gets input Reverse-Data-In "406REV" where Message 1202 is read from back-to-front. 406FWD is input to one blockchain hash core 404 and, in parallel, 406REV is input to a second blockchain hash core 404. The forward blockchain hash MD5 digest of the Forward-Data-In of Message 1202 is stored as 602E-C2. The hexadecimal-reverse blockchain hash MD5 digest of 1201 is stored in 602F-C2R. In this manner using multiple hash cores 404 in parallel simultaneously, it is possible to generate the forward and hexadecimal-reverse blockchain hash digests without additional computational time. Data structure 600J provides an exemplary blockchain data structure for an individual blockchain block of a collision resistant blockchain Data structure 600J begins with X.509 Certificate "C2" 1202. Message 1202 is appended with metadata wrapper 600. Metadata wrapper includes metadata 602A, which is shown having a value of 10h, indicating the use of a single reverse blockchain, namely the hexadecimal-reverse blockchain. Metadata 602B, the Date Stamp YYYY:MM:DD and metadata 602C Time Stamp HH:mm:SS follow. Metadata 602D has a value of 06h to denote the use of the MD5 hash algorithm. The forward blockchain hash MD5 digest of the Forward-Data-In of Certificate "C2" 1202 is stored as 602E-C2. The hexadecimal-reverse blockchain hash MD5 digest of Certificate "C2" 1202 is stored in 602F-C2R. Metadata 602H provides the collision resistant blockchain hash digest pair from the prior block in the collision resistant blockchain to chain the two blocks together. Metadata wrapper 600J concludes with logical-end-of-blockchain byte BC(h), 602I. As shown in FIGS. 7E and 7F, the combination of the forward MD5 hash digest 602E-C1 and hexadecimal-reverse MD5 hash digest 602F-C1R in FIG. 7E, as well as the combination of the forward MD5 hash digest 602E-C2 and hexadecimal-reverse MD5 hash digest 602F-C2R in FIG. 7F, shows that the two X.509 certificates can now be distinguished and a collision avoided through the use of a collision resistant blockchain hash digest pair, the use of both the forward and reverse blockchain hash digests. Therefore, the collision resistant blockchain hash digest pair has voided the previous problem of a collision successfully.

Figure 8A:
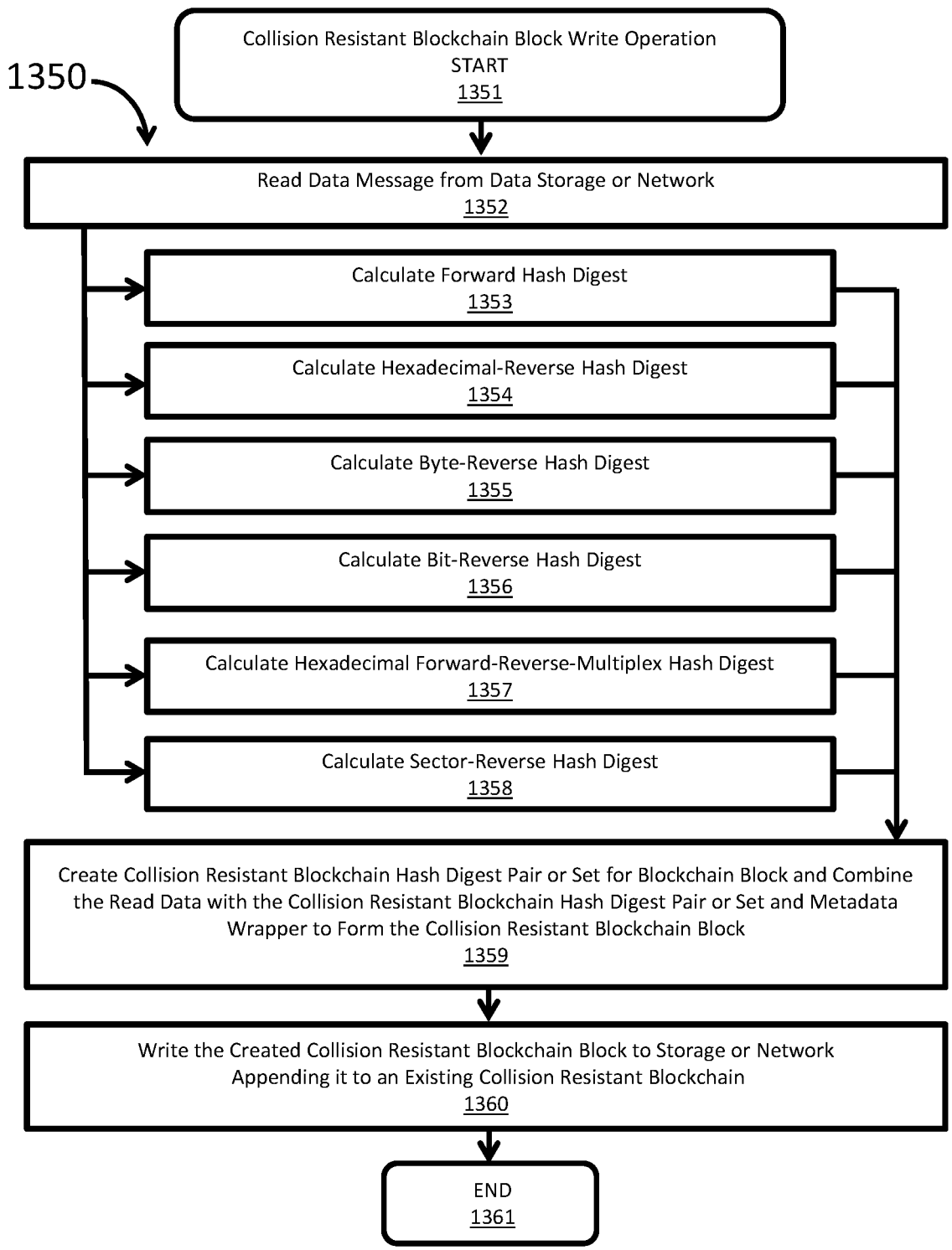
FIGS. 8A and 8B depict processes for creation collision resistant blockchains and data verification of collision resistant blockchains.
Figure 8B:
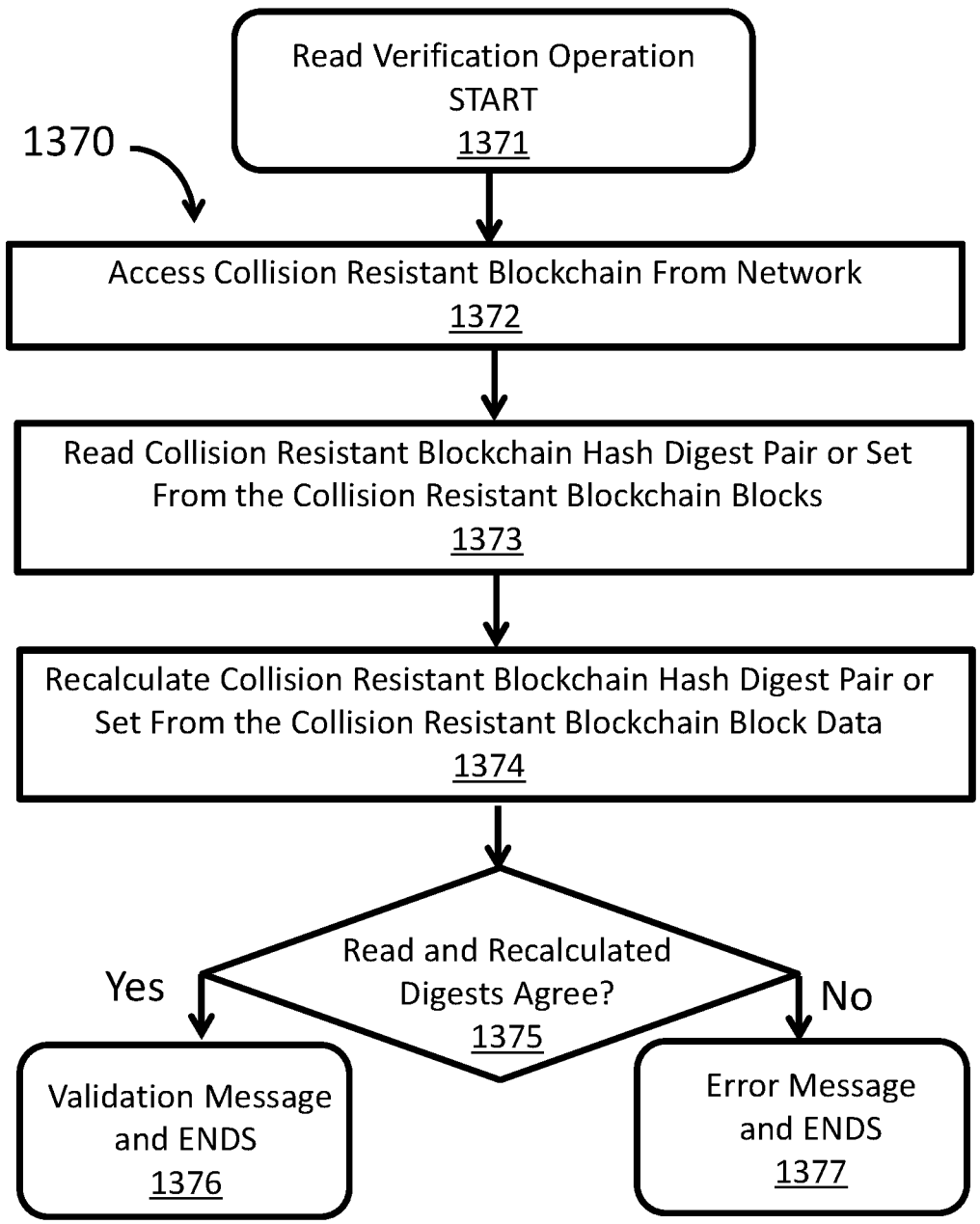

FIGS. 8A and 8B depict processes for creation collision resistant blockchains and data verification of collision resistant blockchains 10 and 20 shown in FIGS. 5G and 5H. FIG. 8A illustrates a flowchart 1350 that depicts a process for generating a collision resistant blockchain block through a write operation. The process STARTS with step 1351. In step 1352, a collision resistant blockchain appliance 1002, shown in FIG. 10B, accesses data storage or network to acquire a data message that is to be formed into a collision resistant blockchain block. In step 1353, a hash core 404 calculates the forward hash digest of the acquired data message. In steps 1354, 1355, 1356, 1357, and 1358, reverse hash digests of the acquired data message are calculated with hash cores 404. Steps 1353, 1354, 1355, 1356, 1357, and 1358 may all be performed simultaneously in parallel by parallel hash cores 404. When creating the collision resistant blockchain block, any one of steps 1354, 1355, 1356, 1357, and 1358 may be used in combination with step 1353 to create a collision resistant blockchain hash digest pair in step 1359. Alternatively, when creating the collision resistant blockchain block, any combination of steps 1354, 1355, 1356, 1357, and 1358 may be used together with step 1353 to create a collision resistant blockchain hash digest set in step 1359. Step 1354 is the process by which a hash core 404 calculates a hexidecimal-reverse hash digest. Step 1355 is the process by which a hash core 404 calculates a byte-reverse hash digest. Step 1356 is the process by which a hash core 404 calculates a bit-reverse hash digest. Step 1357 is the process by which a hash core 404 calculates a hexadecimal forward-reverse-multiplex hash digest. Step 1358 is the process by which a hash core 404 calculates a sector-reverse hash digest. Steps 1353, 1354, 1355, 1356, and 1357 are the processed by which hash cores generate the hash digests. In step 1359, the collision resistant blockchain appliance 1002 generates collision resistant blockchain hash digest pairs (one forward hash digest combined with one reverse hash digest) or collision resistant hash digest sets (one forward hash digest combined with two or more reverse hash digests). Further in step 1359, the collision resistant blockchain appliance 1002 combines the read data message with the generated collision resistant blockchain hash digest pairs or sets with metadata wrapper 600 to form the collision resistant blockchain block. In step 1360, collision resistant blockchain appliance 1002 writes the created collision resistant blockchain block to storage or a network node by appending it to an existing collision resistant blockchain, or by starting a new collision resistant blockchain. The process ENDS in step 1361.

A process for data verification of collision resistant blockchains 10 and 20 shown in FIGS. 5G and 5H is depicted in flowchart 1370 in FIG. 8B. This process provides a means for accessing a created collision resistant blockchain and verifying the integrity of that collision resistant blockchain against tampering or data corruption. The process begins with START in step 1371. In step 1372, the process accesses collision resistant blockchains 10 and 20 from a network node or other storage device. In step 1373, the process reads the collision resistant blockchain hash digest pair or set from the individual blocks of the collision resistant blockchain 10 or 20. In step 1374, the process recalculates the collision resistant hash digest pair or set values from the collision resistant blockchain block data. In step 1375, the process compares the read collision resistant blockchain hash digest pairs or sets to the recalculated collision resistant blockchain hash digest pairs or sets to determine if they agree or not. If they do agree, the process issues a validation message and ENDS with step 1376. If they do not agree, the process sends and error message and ENDS in step 1377.

FIG. 9A illustrates the preimage attack and security claim (birthday attack) for MD5, SHA-1, SHA-256, and SHA-512 through table 1500. Column 1501 lists the hash algorithms examined for the preimage attack and security claim (birthday attack), which are MD5, SHA-1, SHA-256, and SHA-512. Column 1502 lists the digest length in bits and (bytes) for each of the respective hash algorithms, which in this case is 128b (16B) for MD5, 160b (20B) for SHA-1, 256b (32B) for SHA-256, and 215b (64B) for SHA-512. The security strength of each of the hash algorithms in column 1501 is examined in columns 1503, 1504, and 1505. Column 1503 provides the preimage attack $2^L$ which for MD5 is $2^{128}$, for SHA-1 is $2^{160}$, for SHA-256 is $2^{256}$, and for SHA-512 is $2^{512}$. The security claim (birthday attack) shown in column 1504 is given by $2^{L/2}$, which for MD5 is $2^{64}$, for SHA-1 is $2^{80}$, for SHA-256 is $2^{128}$, and for SHA-512 is $2^{256}$. The best known attack on MD5 is shown in column 1505 at being $2^{18}$. The best known attack on SHA-1 is $2^{6.31}$. On 23 Feb. 2017, the CWI (Centrum Wiskunde & Informatica) and Google announced the SHAttered attack, in which they generated two different PDF files with the same SHA-1 hash in roughly 263.1 SHA-1 evaluations. This attack is about 100,000 times faster than brute forcing a SHA-1 collision with a birthday attack, which was estimated to take $2^{80}$ SHA-1 evaluations. The attack required "the equivalent processing power of 6,500 years of single-CPU computations and 110 years of single-GPU computations". (https://en.wikipedia.org/wiki/SHA-1) The strength of MD5, SHA-1, SHA-256, and SHA-512 as shown in table 1500 is based solely upon the use of a single forward blockchain hash digest. The use of one or more reverse hash digests as discussed in FIGS. 1-8 improves the robustness of the hashing from the low value of the best-known attack 1505 up to security claim 1504 and preimage attack 1503 levels.

FIG. 9B illustrates the improvements on preimage attack for MD5, SHA-1, SHA-256, and SHA-512 when they are used with R reverse hash digests as shown in table 1510. Column 1510 lists the hash algorithms MD5, SHA-1, SHA-256, and SHA-512 examined with the use of additional reverse blockchain hash digests in conformance with FIGS. 1-8. Column 1512 lists the number of reverse hash digests "R" each having a length "L" examined in table 1510. Column 1512 shows MD5, SHA-1, SHA-256, and SHA-512 each having zero reverse blockchain hash digests identical to the prior art shown in FIG. 9A, one reverse blockchain hash digest, two reverse blockchain hash digests, three reverse blockchain hash digests, and four reverse blockchain hash digests. The total digest length of the collision resistant blockchain hash digest pairs and sets is given in column 1513 by the equation:

TOTAL DIGEST LENGTH=$(1+R)*L$

In the case of MD5 with zero reverse blockchain hash digests, its total digest length is 128 bits/16 bytes. In the case of MD5 with one reverse blockchain hash digests, its total digest length is 256 bits/32 bytes. In the case of MD5 with two reverse blockchain hash digests, its total digest length is 384 bits/48 bytes. In the case of MD5 with three reverse blockchain hash digests, its total digest length is 512 bits/64 bytes. In the case of MD5 with zero reverse blockchain hash digests, its total digest length is 640 bits/80 bytes. In the case of SHA-1 with zero reverse blockchain hash digests, its total digest length is 160 bits/20 bytes. In the case of SHA-1 with one reverse blockchain hash digests, its total digest length is 320 bits/40 bytes. In the case of SHA-1 with two reverse blockchain hash digests, its total digest length is 480 bits/60 bytes. In the case of SHA-1 with three reverse blockchain hash digests, its total digest length is 640 bits/80 bytes. In the case of SHA-1 with four reverse blockchain hash digests, its total digest length is 800 bits/100 bytes. In the case of SHA-256 with zero reverse blockchain hash digests, its total digest length is 256 bits/32 bytes. In the case of SHA-256 with one reverse blockchain hash digests, its total digest length is 512 bits/64 bytes. In the case of SHA-256 with two reverse blockchain hash digests, its total digest length is 768 bits/96 bytes. In the case of SHA-256 with three reverse blockchain hash digests, its total digest length is 1024 bits/128 bytes. In the case of SHA-256 with four reverse blockchain hash digests, its total digest length is 1280 bits/160 bytes. In the case of SHA-512 with zero reverse blockchain hash digests, its total digest length is 512 bits/64 bytes. In the case of SHA-512 with one reverse blockchain hash digests, its total digest length is 1024 bits/128 bytes. In the case of SHA-512 with two reverse blockchain hash digests, its total digest length is 1536 bits/192 bytes. In the case of SHA-512 with zero reverse blockchain hash digests, its total digest length is 2048 bits/256 bytes. In the case of SHA-512 with zero reverse blockchain hash digests, its total digest length is 2560 bits/320 bytes. The preimage attack for collision resistant blockchain hash digests is given by the equation:

$$\text{Preimage Attack} = 2^{(1+R)*L}$$

For MD5 with zero reverse blockchain hash digests, the attack strength is the same as shown in FIG. 9A, $2^{128}$. For MD5 with a collision resistant blockchain pair having one reverse blockchain hash digest, the attack strength is $2^{256}$. For MD5 with a collision resistant blockchain set having two reverse blockchain hash digests, the attack strength is $2^{384}$. For MD5 with a collision resistant blockchain set having three reverse blockchain hash digests, the attack strength is $2^{512}$. For MD5 with a collision resistant blockchain set having four reverse blockchain hash digests, the attack strength is $2^{640}$. For SHA-1 with zero reverse blockchain hash digests, the attack strength is $2^{160}$, as shown in FIG. 9A. For SHA-1 with a collision resistant blockchain pair having one reverse blockchain hash digest, the attack strength is $2^{320}$. For SHA-1 with a collision resistant blockchain set having two reverse blockchain hash digests, the attack strength is $2^{480}$. For SHA-1 with a collision resistant blockchain set having three reverse blockchain hash digests, the attack strength is $2^{640}$. For SHA-1 with a collision resistant blockchain set having four reverse blockchain hash digests, the attack strength is $2^{800}$. For SHA-256 with zero reverse blockchain hash digests, the attack strength is $2^{256}$, as shown in FIG. 9A. For SHA-256 with a collision resistant blockchain pair having one reverse blockchain hash digest, the attack strength is $2^{512}$. For SHA-256 with a collision resistant blockchain set having two reverse blockchain hash digests, the attack strength is $2^{768}$. For SHA-256 with a collision resistant blockchain set having three reverse blockchain hash digests, the attack strength is $2^{1024}$. For SHA-256 with a collision resistant blockchain set having four reverse blockchain hash digests, the attack strength is $2^{1280}$. For SHA-512 with zero reverse blockchain hash digests, the attack strength is $2^{512}$, as shown in FIG. 9A. For SHA-512 with a collision resistant blockchain pair having one reverse blockchain hash digest, the attack strength is $2^{1024}$. For SHA-512 with a collision resistant blockchain set having two reverse blockchain hash digests, the attack strength is $2^{1536}$. For SHA-512 with a collision resistant blockchain set having three reverse blockchain hash digests, the attack strength is $2^{2048}$. For SHA-512 with a collision resistant blockchain set having four reverse blockchain hash digests, the attack strength is $2^{2560}$. The security claim for MD5 with no reverse hash digests is $2^{60}$, the same as in FIG. 9B. The security claim for MD5 with a collision resistant blockchain pair having one reverse hash digest is $2^{128}$. The security claim for MD5 with a collision resistant blockchain set having two reverse hash digests is $2^{192}$. The security claim for MD5 with a collision resistant blockchain set having three reverse hash digests is $2^{256}$. The security claim for MD5 with a collision resistant blockchain set having four reverse hash digests is $2^{320}$. The security claim for SHA-1 with no reverse hash digests is $2^{80}$, the same as in FIG. 9A. The security claim for SHA-1 with a collision resistant blockchain pair having one reverse hash digest is $2^{160}$. The security claim for SHA-1 with a collision resistant blockchain set having two reverse hash digests is $2^{240}$. The security claim for SHA-1 with a collision resistant blockchain set having three reverse hash digests is $2^{320}$. The security claim for SHA-1 with a collision resistant blockchain set having four reverse hash digests is $2^{400}$. The security claim for SHA-256 with no reverse hash digests is $2^{128}$, the same as in FIG. 9A. The security claim for SHA-256 with a collision resistant blockchain pair having one reverse hash digest is $2^{256}$. The security claim for SHA-256 with a collision resistant blockchain set having two reverse hash digests is $2^{384}$. The security claim for SHA-256 with a collision resistant blockchain set having three reverse hash digests is $2^{512}$. The security claim for SHA-256 with a collision resistant blockchain set having four reverse hash digests is $2^{640}$. The security claim for SHA-512 with no reverse hash digests is $2^{256}$, the same as in FIG. 9A. The security claim for SHA-512 with a collision resistant blockchain pair having one reverse hash digest is $2^{512}$. The security claim for SHA-512 with a collision resistant blockchain set having two reverse hash digests is $2^{768}$. The security claim for SHA-512 with a collision resistant blockchain set having three reverse hash digests is $2^{1024}$. The security claim for SHA-512 with a collision resistant blockchain set having four reverse hash digests is $2^{1280}$. As can be seen from table 1510, collision resistant blockchain pairs and sets dramatically increase the preimage attack and security claim values, thereby enhancing the security value of the MD5, SHA-1, SHA-256, and SHA-512 algorithms making them more resistant to hacking and other malicious threats.

Figure 10A:
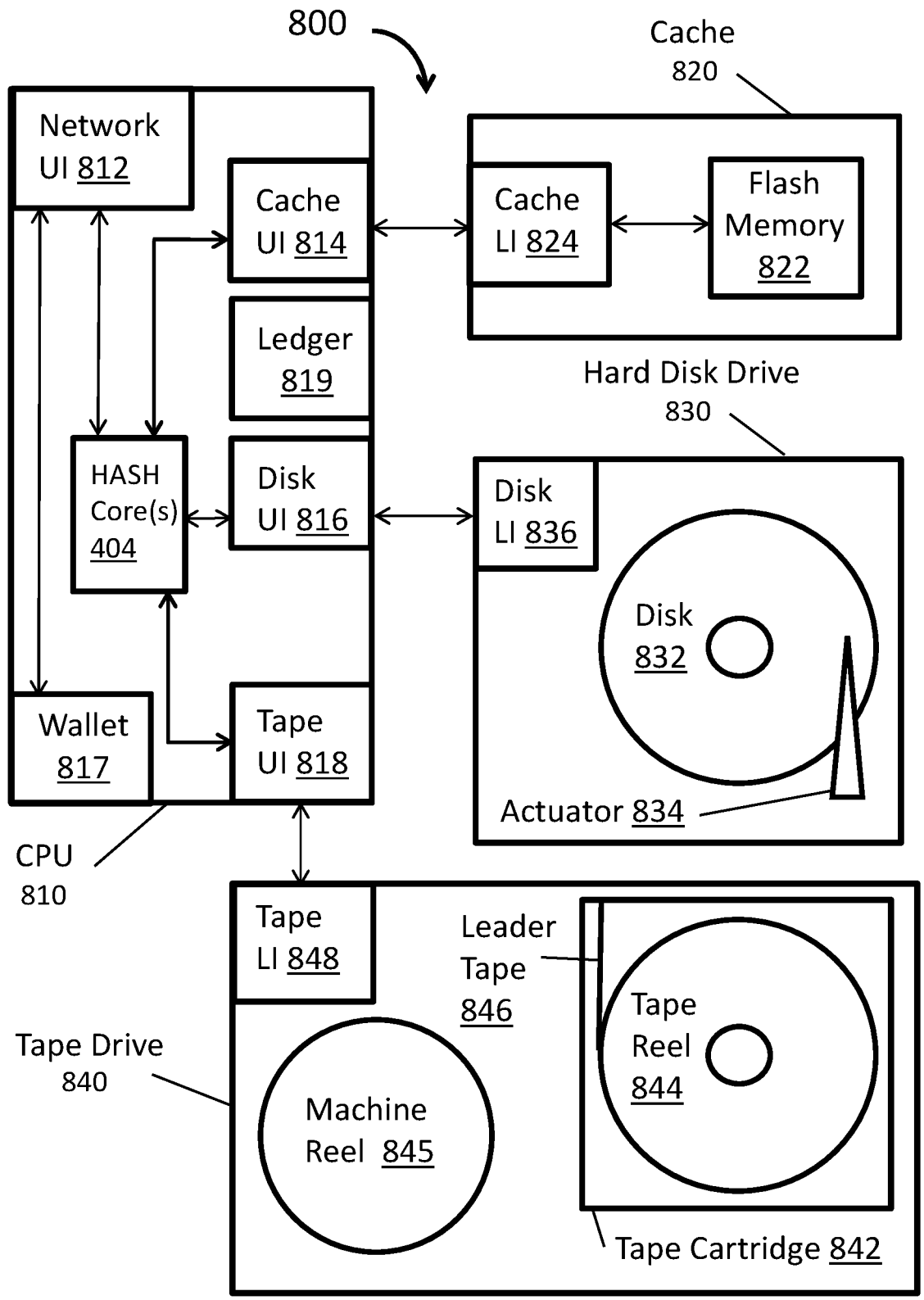
FIGS. 10A-10D depict a collision resistant blockchain appliance and its connection with a distributed network with software modules and processes to generate and distribute collision resistant blockchains.

FIGS. 10A-10D depict a collision resistant blockchain appliance 1002 and its connection with a distributed network 1032 with software modules and processes to generate and distribute collision resistant blockchains 10 and 20 shown in FIGS. 5G and 5H. FIG. 10A illustrates a block diagram of a collision resistant blockchain appliance 800 in communication with a cache-tier 820, a disk-tier 830, and a tape tier 840. Central Processing Unit (CPU) 810 has a network upper-interface (UI) 812, such as for attaching to network 1032, FIG. 10C. CPU 810 also has a cache UI 814 for bidirectional communications with cache lower-interface (LI) 824 of cache 120, disk UI 816 for bidirectional communications with disk LI 836 of hard disk drive 830, and tape UI 818 for bidirectional communications with tape LI 848 of tape drive 840. CPU 810 also has one or more hash cores, such as hash core 404 of FIG. 10D, a wallet 817 for the security credentials of users, such as X.509 certificates, and a blockchain ledger 819 for storing data-pointers, to include data pointers for data deduplication. Cache 820 contains flash memory 822 that is electrically or optically connected to cache LI 824. While EEPROMs had to be completely erased before being rewritten, NAND-type flash memory may be written and read in blocks (or pages) that are generally much smaller than the entire device. NOR-type flash allows a single machine word (byte) to be written, to an erased location, or read independently. Flash memory 822 may be one or more chips attached to a motherboard, or chips within a solid-state drive (SSD). When SSDs are used as cache 820, cache UI 814 and cache LI 824 may communicate via one of these communication protocols: SATA (Serial Advanced Technology Attachment), FC (Fibre Channel), SAS (Serial Attached SCSI), ATA/IDE (Advanced Technology Attachment/Integrated Drive Electronics), PCIe (Peripheral Component Interconnect Express), USB (Universal Serial Bus), IEEE-1394 (Firewire), and the like. Hard disk drive 830 also contains one or more rotating disks 832 which are accessed via a rotary actuator 834. At the tip of this rotary actuator is a giant magneto-resistive (GMR) read head and a thin-film write head. Disk UI 816 and disk LI 836 may communicate via one of these communication protocols: SATA (Serial Advanced Technology Attachment), PATA (Parallel Advanced Technology Attachment), SCSI (Small Computer System Interface), SAS (Serial Attached SCSI), FC (Fibre Channel), NAS (Network Attached Storage), and the like. Hard disk drive 830 has a slower access time than cache 820 because of the seek time of the rotary actuator to the desired data track and the latency time before the disk rotates into position for I/O. Tape drive 840 houses removable tape cartridge 842. Tape cartridge 842 houses a single tape reel 844. Tape drive 840 threads leader tape 846 across a read-write head (not shown) to an awaiting machine reel 845 that are both permanent parts of tape drive 840. Tape cartridge 840 may be a Linear Tape Open (LTO) Ultrium, an IBM® 3592, or an Oracle® StorageTek T10000 or T10000-T2 single-reel tape cartridge. Tape UI 818 and tape LI 848 may communicate via one of these communication protocols: SATA (Serial Advanced Technology Attachment), SCSI (Small Computer System Interface), SAS (Serial Attached SCSI), FC (Fibre Channel), IEEE-1394 (Firewire), FICON (IBM Fibre Connection), and the like. The robotic picker in a tape library may take 10 seconds to load tape cartridge 842 into tape drive 840, and the seek time to locate data on the tape may take a minute or more. Thus, tape is slower than hard disk 830, although tape cartridge consumes zero power once I/O is completed with it. Disk 832 of hard drive 830 may rotate at 7200 RPM, giving a latency of 4.16 milliseconds (time for ½ revolution) and have a seek time of 8 milliseconds (time for ⅓ stroke of the actuator), giving an access time of 12.16 milliseconds, which is much faster than tape, but is much more expensive than tape to provide. The access time for flash cache might be measured in microseconds or faster, but that flash cache costs more than hard disk and hard disk costs more than tape. So, there are price-performance tradeoffs and that is why there are three storage tiers in FIG. 8.

Figure 10B:
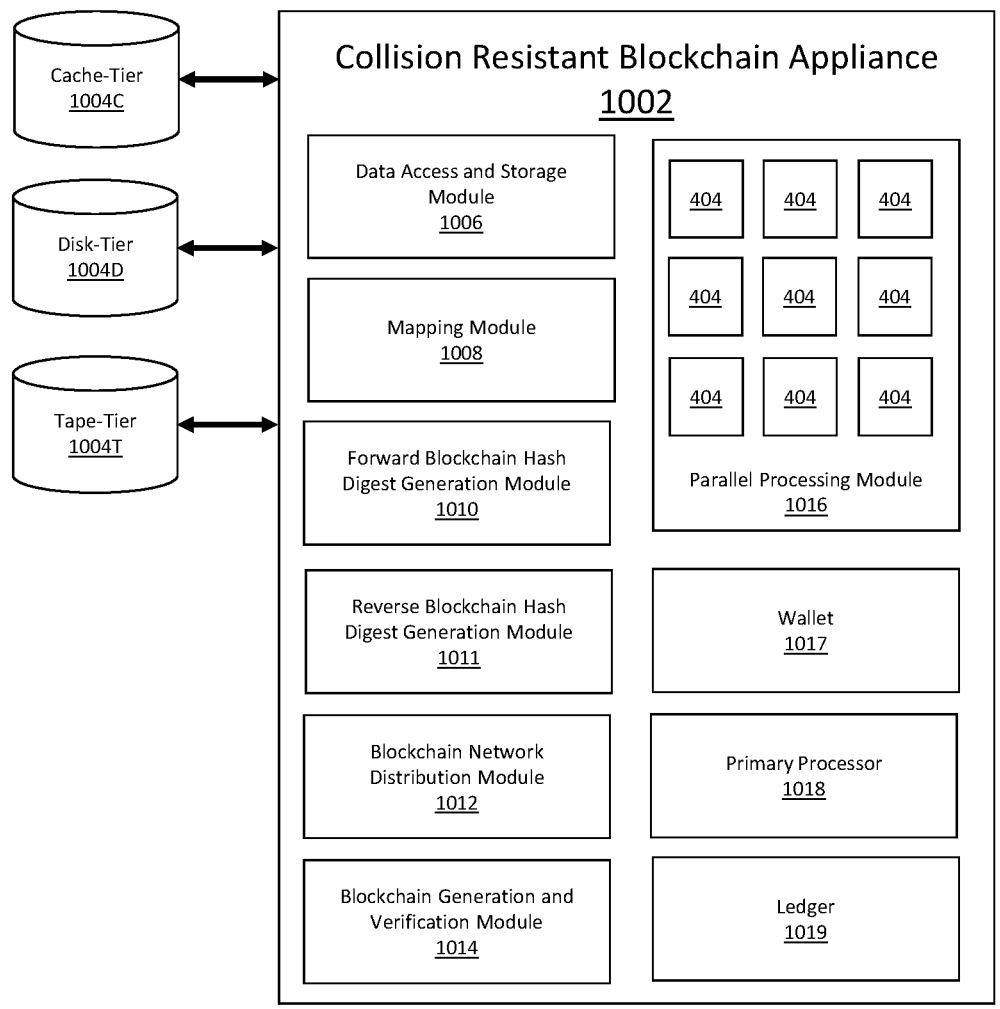

FIG. 10B illustrates a software block diagram of a collision resistant blockchain appliance 1002. Collision resistant blockchain appliance 1002 provides the software modules that interact and manage the hardware of the collision resistant blockchain appliance 800 shown in FIG. 10A. Collision resistant blockchain appliance 1002 is coupled to cache-tier storage 1004C, disk-tier storage 1004D, and tape-tier storage 1004T. Collision resistant blockchain appliance 1002 uses cache-tier storage 1004C, disk-tier storage 1004D, and tape-tier storage 1004T to store data used to build collision resistant blockchains and store subsequently created collision resistant blockchains. Collision resistant blockchain appliance 1002 includes Data Access and Storage Module 2006 that manages the storage of data used to build collision resistant blockchains and built collision resistant blockchains on cache-tier storage 1004C, disk-tier storage 1004D, and tape-tier storage 1004T. The management of storage includes the reading and writing of data, as well as the migration of data between cache-tier storage 1004C, disk-tier storage 1004D, and tape-tier storage 1004T based on storage tier management procedures for the migration of data within a tiered storage system. Mapping module 1008 stores a map or ledger recording the creation of all collision resistant blockchains and their constituent blocks and where they are stored globally on any network including cache-tier storage 1004C, disk-tier storage 1004D, and tape-tier storage 1004T, nodes 1032 on distributed network 1032 shown in FIG. 10C, satellite 1022 shown in FIG. 10C, or terminal 1030 shown in FIG. 10C. Forward Blockchain Hash Digest Generation Module 1010 accesses data from cache-tier storage 1004C, disk-tier storage 1004D, and tape-tier storage 1004T and generates a forward blockchain hash digest using a hash core 404 from Parallel Processing Module 1016 using a hash algorithm such as MD5, SHA-1, SHA-224, SHA-512/224, SHA-256, SHA-512/256, SHA-384, SHA-512, and SHA-3 as shown in FIGS. 2B and 2D for example. Reverse Blockchain Hash Digest Generation Module 1012 accesses data from cache-tier storage 1004C, disk-tier storage 1004D, and tape-tier storage 1004T and generates a reverse blockchain hash digest using a hash core 404 from Parallel Processing Module 1016 using a hash algorithm such as MD5, SHA-1, SHA-224, SHA-512/224, SHA-256, SHA-512/256, SHA-384, SHA-512, and SHA-3 as shown in FIGS. 2B and 2D for example. Reverse hash digest processes include hexadecimal-reverse, byte-reverse, bit-reverse, hard-disk-drive sector reverse, or forward-reverse multiplex. The forward blockchain hash digest and reverse blockchain hash digest are formed simultaneously in parallel by hash cores 404 in Parallel Processing Module 1016. Blockchain Network Distribution Module 1011 executes the transmission and redundant storage of collision resistant blockchain blocks across distributed network 1032. Blockchain Generation and Verification Module 1014 executes the process of building metadata wrapper 600 and including the forward and reverse blockchain hash digests in it and wrapping a data message with it to create a collision resistant blockchain block pursuant to the process shown in FIG. 8A. Blockchain Generation and Verification Module 1014 then executes a process to verify the contents of a collision resistant blockchain block at any time pursuant to a process shown in FIG. 8B. Wallet 1017 contains all password and public keys necessary for users to access appliance 1002, such as X.509 certificates, and for appliance 1002 to function within the networked environment 1000 shown in FIG. 10C. Primary processor 1018, which includes CPU 810 shown in FIG. 10A, functions to control all of the operations of collision resistant blockchain appliance 1002 pursuant to the processes shown in FIGS. 1-11. Ledger 1019 contains a record of all collision resistant blockchains and their constituent blocks along with their associated metadata and storage locations. Ledger 1019 may also include data pointers for data deduplication. Parallel Processing Module 1016 contains a plurality of hash cores 404 to simultaneously and in parallel process forward and reverse hash digests according to steps 1353, 1354, 1355, 1356, 1357, and 1358 shown in FIG. 8A.

Figure 10C:
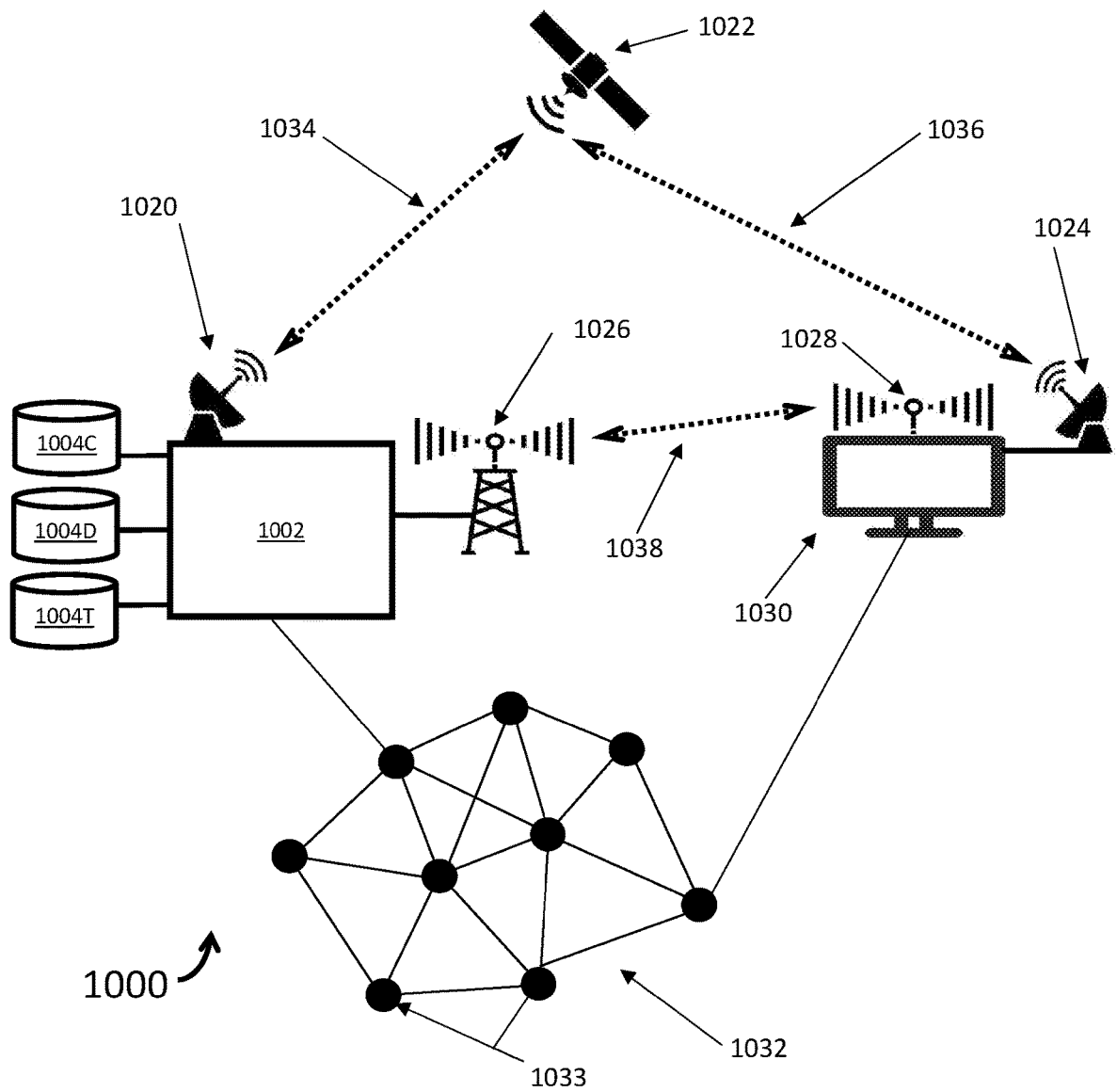

FIG. 10C illustrates an exemplary distributed network 1000 for a collision resistant blockchain including Network Attached Storage (NAS) 1004C, 1004D, and 1004T, a network connected collision resistant blockchain appliance 1002, and a network connected terminal 1030 that can all communicate with each other via satellite communications links 1034 and 1036, wireless terrestrial communications links 1038, and communications links provided by the distributed network 1032. Appliance 1002 is shown having Network Attached Storage (NAS) 1004C, 1004D, and 1004T. Appliance 1002 has a satellite communication device 1020 allowing it to communicate with satellite 1022 through channel 1034. Appliance 1002 also includes a radio antenna 1026 allowing it to communicate wirelessly over channel 1038 with terminal 1030. Appliance 1002 can communicate with terminal 1030 through distributed network 1032 made up of a plurality of nodes 1033. Satellite 1022 may communicate with terminal 1030 through channel 1036 coupled to satellite communication device 1024 coupled to terminal 1030. Terminal 1030 includes a wireless antenna 1028 that may communicate across channel 1038 with appliance 1002. In this environment, appliance 1002 may access data to generate collision resistant blockchains blocks from any storage device in communication with appliance 1002 in networked environment 1000. Similarly, appliance 1002 may store the collision resistant blockchain blocks on any storage device in communication with appliance 1002 in networked environment 1000.

Figure 10D:
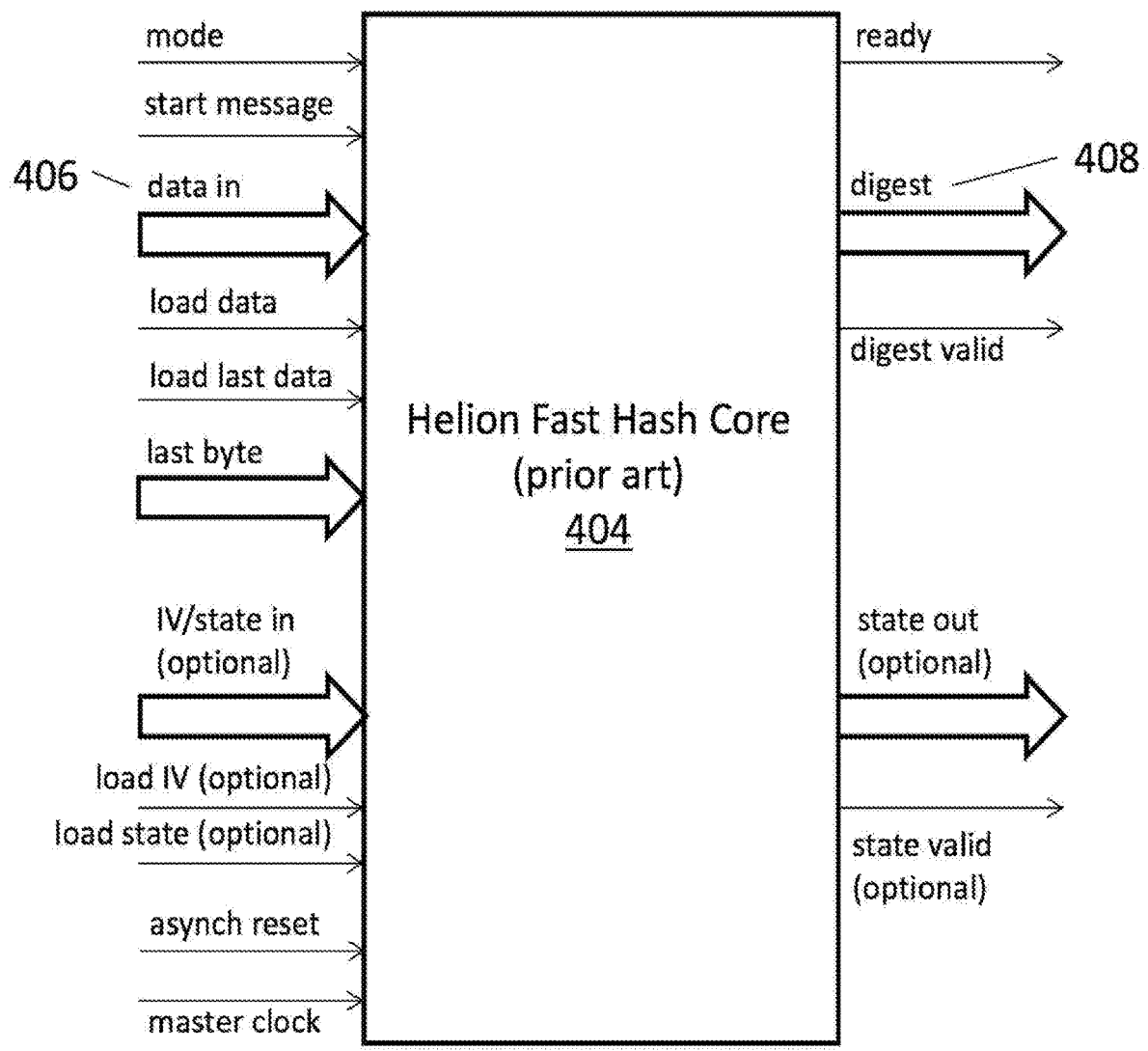

FIG. 10D illustrates a prior-art diagram of the Helion Fast Hash Core Application Specific Integrated Circuit (ASIC) 404, which may be resident in CPU 810, FIG. 10A. The Helion Fast Hash Core family implements the NIST approved SHA-1, SHA-224, SHA-256, SHA-384 and SHA-512 secure hash algorithms to FIPS 180-3 and the legacy MD5 hash algorithm to RFC 1321. These are high performance cores that are available in single or multi-mode versions and have been designed specifically for ASIC. Data to be blockchained into a collision resistant blockchain is fed into this ASIC at 406 and the resulting blockchain hash digest output is 408. Such dedicated hash core ASICs have faster performance than software running in a cloud, or computer memory under an operating system. One hash core 404 could calculate the forward blockchain hash digest, and in parallel, a second hash core 404 calculate the reverse blockchain, as shown in FIGS. 2B and 2D, 5C and 5D, 6F and 6G, as well as 7E and 7F.

Figure 11A:
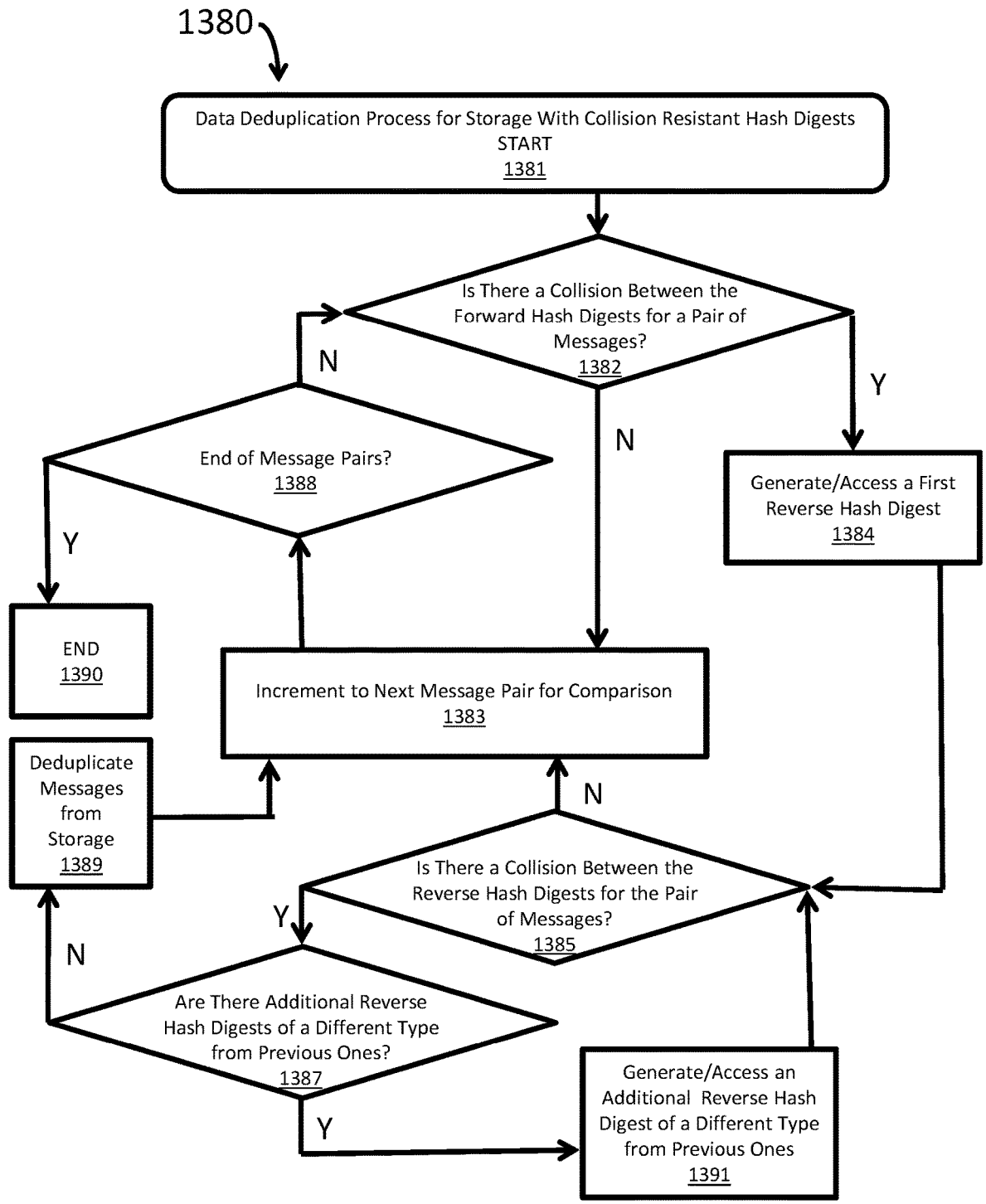

FIGS. 11A-11D illustrate the application of pairs of hash digests formed of forward blockchain hash digests and reverse blockchain hash digests to data deduplication. FIG. 11A illustrates a flowchart 1380 depicting a process for data deduplication using collision resistant hash digests. The process begins with START 1381 for a process of data deduplication for storage with collision resistant hash digests. In step 1382, the process determines whether there is a collision between the forward hash digests for a pair of messages. If there is no collision, the messages in the pair are different and are not duplicates. The process then proceeds to step 1383 where it increments to the next message pair for comparison. Then in step 1388, the process determines if it has reached the end of examining message pairs for data deduplication. If the process has examined the last message pair for data deduplication, the process then ENDS at step 1390. However, if the process has not reached the end of comparing message pairs, the process then returns to step 1382. If in step 1382, the process finds a collision between the forward hash digest pairs, the process proceeds to step 1384 to generate or access a first hash digest on the message pursuant to a process such as hexadecimal-reverse, byte-reverse, bit-reverse, hard-disk-drive sector reverse, or forward-reverse multiplex. The process then proceeds to step 1385 where it determines if there is a collision in the reverse hash digests for the pair of messages. If there is no collision between the reverse hash digests, the two messages in the pair are different and are not duplicates and the process proceeds to step 1383. However, if there is a collision between the reverse hash digests, the process determines in step 1387 if there are other types of reverse hash digests available different from the type of reverse hash digest created in step 1384. If there are additional types of reverse hash digests available, the process accesses or generates those different additional reverse hash digests in step 1391 and compares those new different additional reverse hash digests in step 1385. If in step 1385, the process determines there is a collision in reverse hash digests and the process determines in step 1387 that there are no additional reverse hash digests available of a different type than those already used, then the messages in the pair are duplicates of each other. One of the messages is deleted as a duplicate and a data pointer pointing to the remaining undeleted message is stored in place of the duplicate message to reduce the amount of duplicate storage used.

Figure 11B:
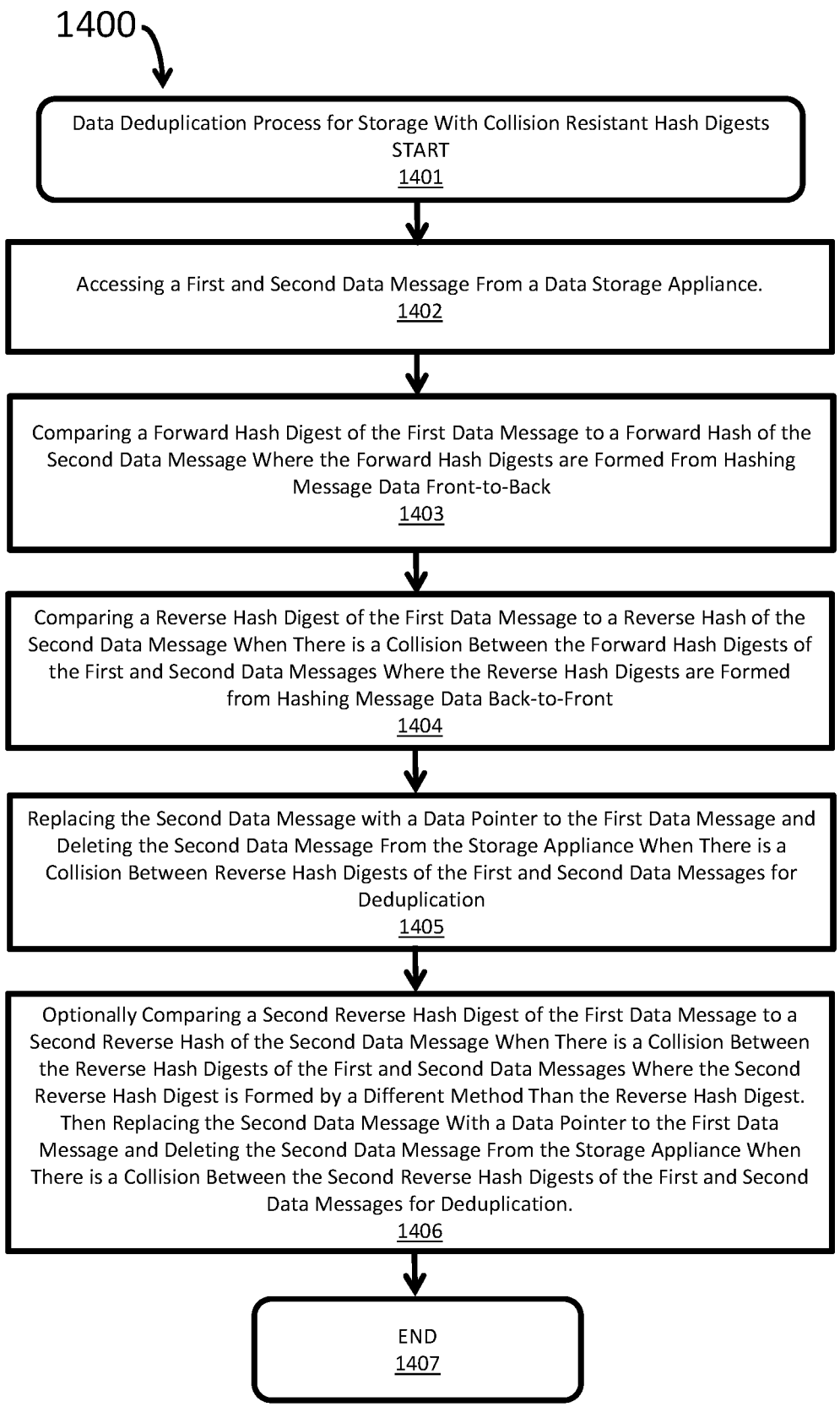

FIG. 11B illustrates a process 1400 for data deduplication for storage using collision resistant hash digests. The process accesses a first data message from a data storage appliance in step 1402. The process also accesses a second data message from the data storage appliance in step 1402. The process then compares a forward hash digest of the first data message to a forward hash of the second data message in step 1403. The forward hash digests are formed from hashing message data front-to-back. The process then compares a reverse hash digest of the first data message to a reverse hash of the second data message when there is a collision between the forward hash digests of the first and second data messages in step 1404. The reverse hash digests are formed from hashing message data back-to-front. The process then replaces the second data message with a data pointer to the first data message and deletes the second data message from the storage appliance when there is a collision between the forward and reverse hash digests of the first and second data messages for deduplication in step 1405. The second data message is not deduplicated when there is no collision between the forward hash digests of the first and second data messages, or when there is no collision between the reverse hash digests of the first and second data messages. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and hashing the new reverse message with a hash algorithm. The hash algorithms include MD5, SHA-1, SHA-224, SHA-512/224, SHA-256, SHA-512/256, SHA-384, SHA-512, and SHA-3. The forward and reverse hash digests are computer simultaneously in parallel by a pair of hash core processors 404. The process may further include comparing a second reverse hash digest of the first data message to a second reverse hash of the second data message when there is a collision between the reverse hash digests of the first and second data messages in step 1406. The second reverse hash digest is formed by a different method than the reverse hash digest. The process then replaces the second data message with a data pointer to the first data message and deletes the second data message from the storage appliance when there is a collision between the second reverse hash digests of the first and second data messages for deduplication in step 1406. The process ENDS in step 1407.

Figure 11C:
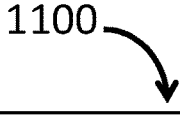

FIG. 11C illustrates the loss of information that can occur during data deduplication when hash digest collisions exist for both a pair of 128-Byte and a pair of 64-Byte messages. Table 1100 of FIG. 11C indicates how collisions of non-identical files with identical hash digests can lead to problems when data deduplication is practiced. The hash digest is shown in column 1101 and the stored contents are shown in column 1102. The MD5 hash digest of Message M1 "1103" is associated with the contents of Message M3 104. However, since the MD5 hash digest of Message M2 "1105" is identical to the MD5 hash digest of Message M1 "1103," the original contents of Message M2 106 (FIG. 1A) are erased (deduplicated) and a data-pointer link 1106 to Message M1 is inserted so that anyone looking to access Message M2 will be redirected to the contents of Message M1 104. Similarly, the MD5 hash digest of Message M3 "1107" is associated with the contents of Message M3 704.

However, since the MD5 hash digest of Message M4 "1108" is identical to the MD5 hash digest of Message M3 "1107," the original contents 706 (FIG. 6A) of Message M4 are erased (deduplicated) and a data-pointer link 1109 to Message M3 is inserted so that anyone looking to access Message M4 will be redirected to the contents of Message M3 "704" by the data-pointer link. Thus, table 1100 shows that the contents of Messages M3 and M4 are permanently lost, and worse yet, Messages M1 and M3 are left mimicking Messages M2 and M4, respectively.

Figure 11E:
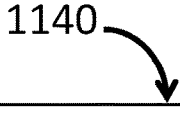
FIG. 11E illustrates how information is preserved during data deduplication for a pair 64-Byte messages when a forward blockchain hash digest and a hexadecimal-reverse blockchain hash digest are used in combination.

FIG. 11D illustrates how information is preserved during data deduplication for a pair 128-Byte messages when a forward blockchain hash digest and a hexadecimal-reverse blockchain hash digest are used in combination. FIG. 11E illustrates how information is preserved during data deduplication for a pair 64-Byte messages when a forward blockchain hash digest and a hexadecimal-reverse blockchain hash digest are used in combination. FIGS. 11D and 11E show the solution to the problem identified in FIG. 11C. In FIG. 11D, Table 1120 has hash digest column 1121 and stored contents 1122. The contents of Message M1 104 now have Forward Hash Digest and Hexadecimal-Reverse Hash Digest 1123, such as shown in FIG. 5C, and the contents of Message M2 106 now have Forward Hash Digest and Hexadecimal-Reverse Hash Digest 1125, such as shown in FIG. 5D. The combination of forward and hexadecimal-reverse hash digests distinguishes Message M1 and Message M2, and no errant data deduplication occurs. Similarly, in FIG. 11C, Table 1140 has hash digest column 1141 and stored contents 1142. The contents of Message M3 704 now has Forward Hash Digest and Hexadecimal-Reverse Hash Digest 1143, such as shown in FIG. 6F, and the contents of Message M4 706 now has Forward Hash Digest and Hexadecimal-Reverse Hash Digest 1145, such as shown in FIG. 6G. The combination of forward and hexadecimal-reverse hash digests distinguishes Message M3 and Message M4, and no errant data deduplication occurs. Thus, FIGS. 11D and 11E show the value of collision avoidance for the application of data deduplication, by augmenting today's forward hash digests with reverse hash digests.

Figure 11F:
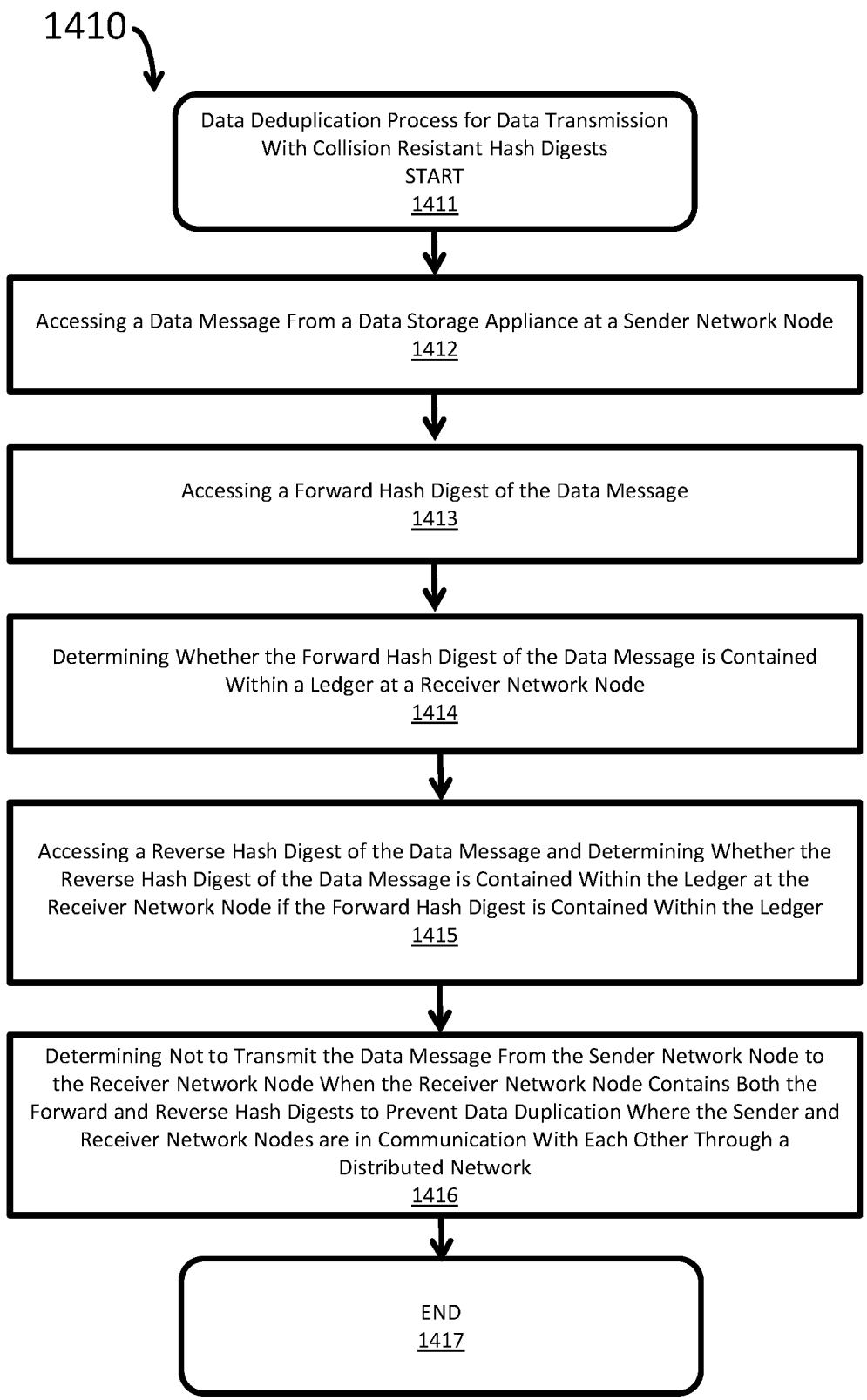
FIG. 11F illustrates a process for data deduplication for data transmission and restore using collision resistant hash digests.

FIG. 11F illustrates a flow chart 1410 depicting a process for data deduplication for data transmission and restore using collision resistant hash digests. The data deduplication process for file transmission based on collision resistant hash digests begins with START 1411. The process includes accessing a data message from data storage appliance at a sender network node in step 1412 and accessing a forward hash digest of the data message in step 1413. The process then determines whether the forward hash digest of the data message is contained within a ledger at a receiver network node in step 1414. The process then accesses a reverse hash digest of the data message and determines whether the reverse hash digest of the data message is contained within the ledger at the receiver network node if the forward hash digest is contained within the ledger in step 1415. Finally, the process then determines not to transmit the data message from the sender network node to the receiver network node when the receiver network node contains both the forward and reverse hash digests to prevent data duplication, where the sender and receiver network nodes are in communication with each other through a distributed network in step 1416. The process then ENDS in step 1417. The forward hash digest is formed from hashing the data message front-to-back. The reverse hash digest is formed from hashing the data message back-to-front. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and then hashing the new reverse message with a hash algorithm. The hash algorithm for the forward and reverse hash digests is one of MD5, SHA-1, SHA-224, SHA-512/224, SHA-256, SHA-512/256, SHA-384, SHA-512, and SHA-3.

Figure 11G:
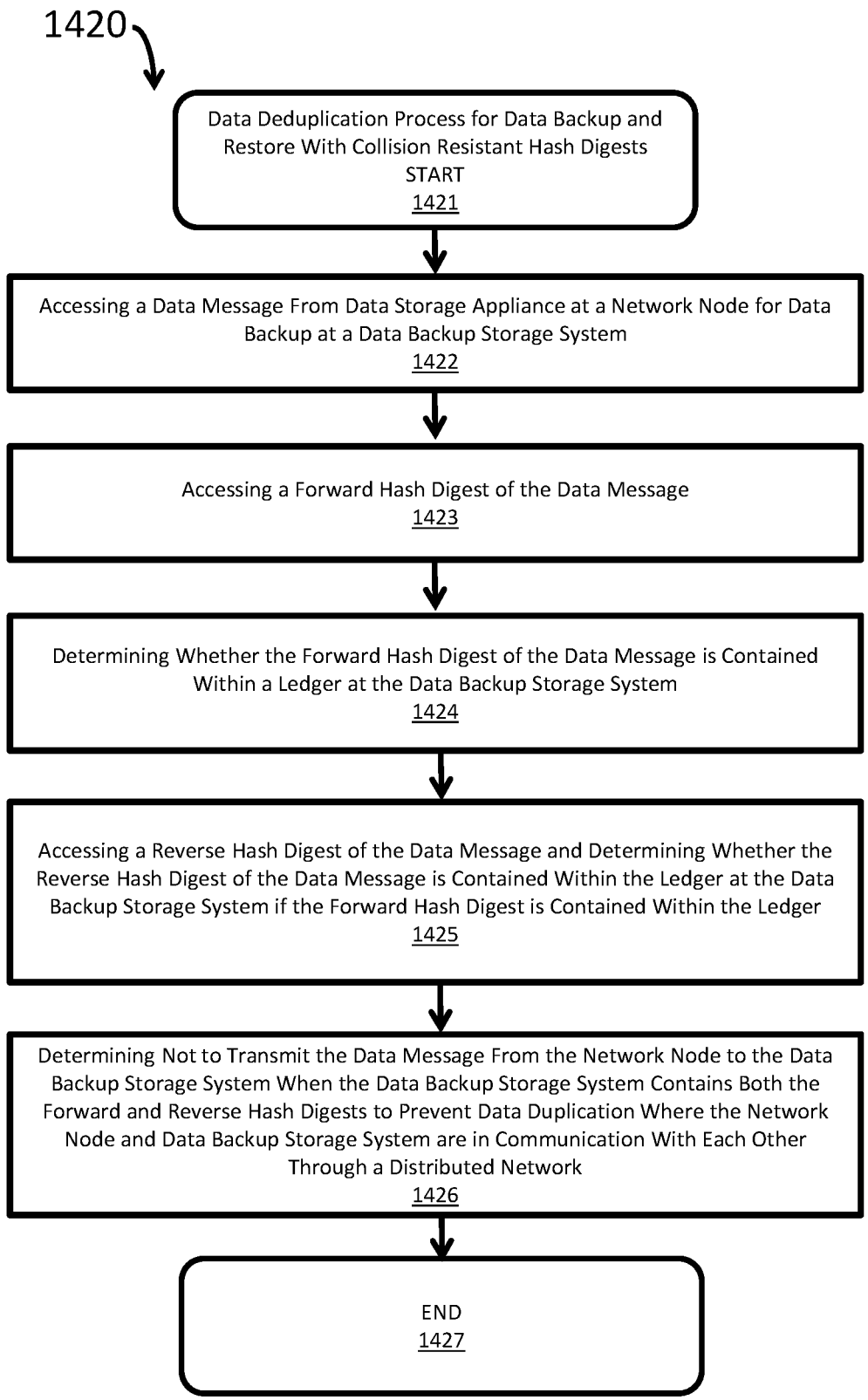
FIG. 11G illustrates a process for data deduplication for data backup and restore using collision resistant hash digests.

FIG. 11G illustrates a flowchart 1420 depicting a process for data deduplication for data backup and restore using collision resistant hash digests. The data deduplication process for data backup and restore based on collision resistant hash digests begins with START 1421. The process accesses a data message from data storage appliance at a network node for data backup at a data backup storage system in step 1422. The process then accesses a forward hash digest of the data message in step 1423 and determines whether the forward hash digest of the data message is contained within a ledger that stores records of hash digests stored within the data backup storage system at the data backup storage system in step 1424. The system then accesses a reverse hash digest of the data message and determines whether the reverse hash digest of the data message is contained within the ledger at the data backup storage system if the forward hash digest is contained within the ledger in step 1425. The process then determines not to transmit the data message from the network node to the data backup storage system when the data backup storage system contains both the forward and reverse hash digests to prevent data duplication in step 1426. The network node and the data backup storage system are in communication with each other through a distributed network. The process ENDS in step 1427. The forward hash digest is formed from hashing the data message front-to-back. The reverse hash digest is formed from hashing the data message back-to-front. The reverse hash digest is formed by reversing the hexadecimal data within a data message to form a new reverse message by a process such as hexadecimal-reverse, byte-reverse, bit-reverse, hard-disk-drive sector reverse, or forward-reverse multiplex and hashing the new reverse message with a hash algorithm. The hash algorithm for the forward and reverse hash digests is selected from a group consisting of MD5, SHA-1, SHA-224, SHA-512/224, SHA-256, SHA-512/256, SHA-384, SHA-512, and SHA-3.

While the invention has been shown and described with reference to a particular embodiment thereof, it will be understood to those skilled in the art, that various changes in form and details may be made therein without departing from the spirit and scope of the invention.

The invention claimed is:

1. A non-transitory computer tangible medium containing instructions for executing data deduplication for storage based on a collision resistant hash digest process, comprising:
   comparing a first data message to a second data message using initial hash digests based on those data messages for data deduplication;
   comparing the first data message to the second data message using alternate hash digests based on those data messages when the initial hash digests are the same for both messages, wherein the initial and alternate hash digests are formed differently using a common hash algorithm by reading a data message into a hash processor for processing by the hash algorithm in different orders; and
   replacing the second data message with a data pointer to the first data message and deleting the second data message from memory for deduplication when the alternate hash digests for the first and second data messages are the same indicating they are duplicate messages.

2. The non-transitory computer tangible medium containing instructions for executing data deduplication for storage based on a collision resistant hash digest process of claim 1, whereby collisions that occur when two different data messages are hashed by reading them into the hash processor for hashing by the hash algorithm in one order do not reoccur when those two different sets of data messages are also read into the hash processor for processing by the hash algorithm in a different order thereby separating duplicate files from collisions.

3. The non-transitory computer tangible medium containing instructions for executing data deduplication for storage based on a collision resistant hash digest process of claim 1, wherein the second data message is not deduplicated when the alternate hash digests are not same between both data messages indicating that the same value for the initial hash digest between both data messages is the result of a collision and that the data messages are different.

4. The non-transitory computer tangible medium containing instructions for executing data deduplication for storage based on a collision resistant hash digest process of claim 1, wherein the initial hash digests are formed by hashing the message data front-to-back and the alternate hash digests are formed by hashing the message data back-to-front.

5. The non-transitory computer tangible medium containing instructions for executing data deduplication for storage based on a collision resistant hash digest process of claim 4, wherein message data is hashed back-to-front via hexadecimal-reverse, byte-reverse, bit-reverse, hard-disk-drive sector reverse, or forward-reverse multiplex, wherein the hash algorithms are selected from a group consisting of MD5, SHA-1, SHA-224, SHA-512/224, SHA-256, SHA-512/256, SHA-384, SHA-512, and SHA-3.

6. The non-transitory computer tangible medium containing instructions for executing data deduplication for storage based on a collision resistant hash digest process of claim 5, wherein the initial and alternate hash digests are computed simultaneously in parallel by a pair of hash core processors.

7. The non-transitory computer tangible medium containing instructions for executing data deduplication for storage based on a collision resistant hash digest process of claim 6, further comprising comparing second alternate hash digests based on the first and second data messages when there is a collision between the alternate hash digests, wherein the second alternate hash digests and alternate hash digests are formed differently using a common hash algorithm by reading the data messages into the hash processor for processing by the hash algorithm in different orders; and replacing the second data message with a data pointer to the first data message and deleting the second data message from memory for deduplication when there is a collision between the second alternate hash digests of the first and second data messages.

8. A non-transitory computer tangible medium containing instructions for executing data deduplication for file transmission based on collision resistant hash digest sets, comprising:
    determining if a receiver already has a copy of a data message by accessing a collision resistant hash digest set based on the data message and comparing it to a ledger at the receiver that records hash digests of data messages stored at the receiver, wherein the collision resistant hash digest set has two or more hash digests that are formed differently using a common hash algorithm by reading the data message into a hash processor for processing by the hash algorithm in different orders; and
    determining not to transmit the data message to the receiver to prevent duplication when the ledger contains all of the hash digests within the collision resistant hash digest set.

9. The non-transitory computer tangible medium containing instructions for executing data deduplication for file transmission based on collision resistant hash digest sets of claim 8, whereby collisions that occur when two different data messages are hashed by reading them into the hash processor for hashing by the hash algorithm in one order do not reoccur when those two different sets of data messages are also read into the hash processor for processing by the hash algorithm in a different order thereby separating duplicate files from collisions.

10. The non-transitory computer tangible medium containing instructions for executing data deduplication for file transmission based on collision resistant hash digest sets of claim 9, wherein the collision resistant hash digest set includes a hash digest formed from hashing the data message front-to-back and a hash digest formed from hashing the data message back-to-front.

11. The non-transitory computer tangible medium containing instructions for executing data deduplication for file transmission based on collision resistant hash digest sets of claim 10, wherein the hash digest formed from hashing the data message back-to-front is made through hexadecimal-reverse, byte-reverse, bit-reverse, hard-disk-drive sector reverse, or forward-reverse multiplex.

12. The non-transitory computer tangible medium containing instructions for executing data deduplication for file transmission based on collision resistant hash digest sets of claim 11, wherein the hash algorithm for is selected from a group consisting of MD5, SHA-1, SHA-224, SHA-512/224, SHA-256, SHA-512/256, SHA-384, SHA-512, and SHA-3.

13. The non-transitory computer tangible medium containing instructions for executing data deduplication for file transmission based on collision resistant hash digest sets of claim 8, wherein the data message is transmitted to the receiver if any one of the hash digests for the collision resistant hash digest set for that data message is not present within the ledger at the receiver, thereby indicating that the data messages are not the same and that the commonality of other hash digests is the result of a collision.

14. A non-transitory computer tangible medium containing instructions for executing data deduplication for data backup and restore based on collision resistant hash digest sets, comprising:
    identifying a data message with a collision resistant hash digest set having two or more hash digests that are formed differently using a common hash algorithm by reading the data message into a hash processor for processing by the hash algorithm in different orders;
    backing up the data message to a data backup storage system when any one of the hash digests in the collision resistant hash digest set are not present within a ledger stored at the data backup storage system; and
    preventing backup of the data message to the data backup storage system as a duplicate file when all of the hash digests in the collision resistant hash digest set are present within the ledger.

15. The non-transitory computer tangible medium containing instructions for executing data deduplication for data backup and restore based on collision resistant hash digest sets of claim 14, whereby collisions that occur when two different data messages are hashed by reading them into the hash processor for hashing by the hash algorithm in one order do not reoccur when those two different sets of data messages are also read into the hash processor for processing by the hash algorithm in a different order thereby separating duplicate files from collisions.

16. The non-transitory computer tangible medium containing instructions for executing data deduplication for data backup and restore based on collision resistant hash digest sets of claim 15, wherein the collision resistant hash digest set includes a hash digest formed from hashing the data message front-to-back and a hash digest formed from hashing the data message back-to-front.

17. The non-transitory computer tangible medium containing instructions for executing data deduplication for data backup and restore based on collision resistant hash digest sets of claim 16, wherein the hash digest formed from hashing the data message back-to-front is made through hexadecimal-reverse, byte-reverse, bit-reverse, hard-disk-drive sector reverse, or forward-reverse multiplex.

18. The non-transitory computer tangible medium containing instructions for executing data deduplication for data backup and restore based on collision resistant hash digest sets of claim 17, wherein the hash algorithm for is selected from a group consisting of MD5, SHA-1, SHA-224, SHA-512/224, SHA-256, SHA-512/256, SHA-384, SHA-512, and SHA-3.

19. The non-transitory computer tangible medium containing instructions for executing data deduplication for data backup and restore based on collision resistant hash digest sets of claim 14, wherein the data message is backed up to the data backup storage system if any one of the hash digests for the collision resistant hash digest set for that data message is not present within the ledger at the data backup storage system, thereby indicating that the data messages are not the same and that the commonality of other hash digests is the result of a collision.

\* \* \* \* \*